United States Patent
Wang et al.

(10) Patent No.: US 12,224,822 B2
(45) Date of Patent: *Feb. 11, 2025

(54) METHOD FOR INDICATING PRECODING VECTOR, METHOD FOR DETERMINING PRECODING VECTOR, AND COMMUNICATIONS APPARATUS

(71) Applicant: HUAWEI TECHNOLOGIES CO., LTD., Guangdong (CN)

(72) Inventors: Xiaohan Wang, Shanghai (CN); Huangping Jin, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,785

(22) Filed: Nov. 6, 2023

(65) Prior Publication Data

US 2024/0072858 A1 Feb. 29, 2024

Related U.S. Application Data

(63) Continuation of application No. 17/900,501, filed on Aug. 31, 2022, now Pat. No. 11,848,729, which is a
(Continued)

(30) Foreign Application Priority Data

Oct. 16, 2018 (CN) .......................... 201811205381.1
Oct. 30, 2018 (CN) .......................... 201811281059.7

(51) Int. Cl.
*H04B 7/0456* (2017.01)
*H04B 7/06* (2006.01)
*H04L 5/00* (2006.01)

(52) U.S. Cl.
CPC ......... *H04B 7/0469* (2013.01); *H04B 7/0626* (2013.01); *H04L 5/0003* (2013.01)

(58) Field of Classification Search
CPC .. H04B 7/0469; H04B 7/0626; H04B 7/0478; H04B 7/0456; H04B 7/0417; H04B 7/0639; H04L 5/0003
See application file for complete search history.

(56) References Cited

U.S. PATENT DOCUMENTS

| 10,790,888 B2 | 9/2020 | Park et al. |
| 2005/0265290 A1 | 12/2005 | Hochwald et al. |

(Continued)

FOREIGN PATENT DOCUMENTS

| CN | 101771510 A | 7/2010 |
| CN | 101944985 A | 1/2011 |

(Continued)

OTHER PUBLICATIONS

Machine translation of JP-2018510530-A. (Year: 2018).*
(Continued)

*Primary Examiner* — Jean B Corrielus
(74) *Attorney, Agent, or Firm* — Fish & Richardson P.C.

(57) ABSTRACT

This disclosure provides methods and apparatuses for precoding in wireless communications. In an implementation, a method includes: receiving, from a terminal device, first indication information, wherein the first indication information indicates $L_1$ space domain vectors in a space domain vector set, $K_1$ frequency domain vectors in a frequency domain vector set, and $T_1$ space-frequency component matrices, wherein a precoding vector of one or more frequency domain units is determined by a weighted sum of the $T_1$ space-frequency component matrices, wherein the $L_1$ space domain vectors and the $K_1$ frequency domain vectors correspond to $M_1$ space-frequency component matrices that (Continued)

comprise the $T_1$ space-frequency component matrices, and determining the precoding vector of the one or more frequency domain units based on the first indication information.

43 Claims, 4 Drawing Sheets

Related U.S. Application Data continuation of application No. 17/230,523, filed on Apr. 14, 2021, now Pat. No. 11,456,786, which is a continuation of application No. PCT/CN2019/110342, filed on Oct. 10, 2019.

(56) References Cited

U.S. PATENT DOCUMENTS

| | | | |
|---|---|---|---|
| 2017/0302353 | A1 | 10/2017 | Rahman et al. |
| 2019/0273537 | A1 | 9/2019 | Rahman et al. |

FOREIGN PATENT DOCUMENTS

| | | | |
|---|---|---|---|
| CN | 102271031 | A | 12/2011 |
| CN | 102763447 | A | 10/2012 |
| CN | 106130614 | A | 11/2016 |
| CN | 110474665 | A | 2/2021 |
| CN | 112636802 | A | 4/2021 |
| EP | 2314009 | B1 | 1/2014 |
| EP | 3737052 | A1 | 11/2020 |
| EP | 3748866 | A1 | 12/2020 |
| JP | 2013201788 | A | 10/2013 |
| JP | 2016140086 | A | 8/2016 |
| JP | 2017011723 | A | 1/2017 |
| JP | 2017139804 | A | 8/2017 |
| WO | 2016051792 | A1 | 4/2016 |
| WO | 2017020680 | A1 | 2/2017 |
| WO | 2018127061 | A1 | 7/2018 |
| WO | 2018127110 | A1 | 7/2018 |

OTHER PUBLICATIONS

3GPP TR 38.900 V0.3.0 (May 2016), "3rd Generation Partnership Project; Technical Specification Group Radio Access Network; Channel model for frequency spectrum above 6 GHz (Release 14)," May 2016, 63 pages.

3GPP TS 38.214 V15.3.0 (Sep. 2018), "3rd Generation Partnership Project; Technical Specification Group Radio Access Network; NR; Physical layer procedures for data (Release 15)," Sep. 2018, 55 pages.

Extended European Search Report issued in European Application No. 19872662 on Nov. 12, 2021, 12 pages.

Huawei, HiSilicon, "Discussion on CSI enhancement for MU-MIMO," 3GPP TSG RAN WG1 Meeting #94bis, R1-1810103, Chengdu, China, Oct. 8-12, 2018, 10 pages.

Huawei, HiSilicon, "Enhancements on CSI reporting and codebook design," 3GPP TSG RAN WG1 Meeting #94, R1-1808949, Gothenburg, Sweden, Aug. 20-24, 2018, 7 pages.

Intel Corporation, "Type II CSI feedback compression," 3GPP TSG RAN WG1 Ad-Hoc Meeting 1901, R1-1900501, Taipei, Taiwan, Jan. 21-25, 2019, 15 pages.

Office Action in Chinese Appln. No. 201811281059.7, dated Feb. 10, 2023, 6 pages.

Office Action issued in Chinese Application No. 202011379346.9 on Jul. 21, 2021, 6 pages.

Office Action issued in Japanese Application No. 2021-521259 on Jun. 20, 2022, 10 pages (with English translation).

PCT International Search Report and Written Opinion issued in International Application No. PCT/CN2019/110342 on Jan. 6, 2020, 13 pages (with English translation).

Qualcomm Incorporated, "CSI Enhancement for MU-MIMO Support," 3GPP TSG RAN WG1 Meeting #NR AH1901, R1-1900904, Jan. 21-25, 2019, 15 pages.

Samsung, "SLS evaluation on Type II overhead reduction," 3GPP TSG RAN WG1 Meeting #95, R1-1813007, Spokane, USA, Nov. 12-16, 2018, 6 pages.

* cited by examiner

METHOD FOR INDICATING PRECODING VECTOR, METHOD FOR DETERMINING PRECODING VECTOR, AND COMMUNICATIONS APPARATUS

CROSS-REFERENCE TO RELATED APPLICATIONS

This application is a continuation of U.S. patent application Ser. No. 17/900,501, filed on Aug. 31, 2022, now U.S. Pat. No. 11,848,729, which is a continuation of U.S. patent application Ser. No. 17/230,523, filed on Apr. 14, 2021, now U.S. Pat. No. 11,456,786, which is a continuation of International Application No. PCT/CN2019/110342, filed on Oct. 10, 2019, which claims priority to Chinese Patent Application No. 201811205381.1, filed on Oct. 16, 2018, and Chinese Patent Application No. 201811281059.7, filed on Oct. 30, 2018. All of the afore-mentioned patent applications are hereby incorporated by reference in their entireties.

TECHNICAL FIELD

This application relates to the wireless communications field, and more specifically, to a method for indicating a precoding vector, a method for determining a precoding vector, and a communications apparatus.

BACKGROUND

In a massive multiple-input multiple-output (massive multiple-input multiple-output, Massive MIMO) technology, a network device may reduce interference between a plurality of users and interference between a plurality of signal streams of a same user by precoding. This helps improve signal quality, implement spatial multiplexing, and improve spectrum utilization.

A terminal device may determine a precoding vector in ways such as channel measurement to get feedback, so that the network device obtains a precoding vector that is the same as or similar to the precoding vector determined by the terminal device. In an implementation, the terminal device may indicate the precoding vector to the network device by using two levels of feedback: wideband feedback and sub-band feedback. Specifically, the terminal device may indicate, based on each transport layer, selected beam vectors and a quantized value of a wideband amplitude coefficient of each beam vector by using the wideband feedback, and may indicate, by using the sub-band feedback, a quantized value of a combination coefficient that can be used for each sub-band, where the combination coefficient may include, for example, a sub-band amplitude coefficient and a sub-band phase coefficient. The network device may restore precoding vectors corresponding to the sub-bands by using both information in the wideband feedback and information in the sub-band feedback. For a specific method used by the terminal device to indicate the precoding vector to the network device by using the two levels of feedback: the wideband feedback and the sub-band feedback, refer to a type II (type II) codebook feedback manner defined in the new radio (new radio, NR) protocol TS 38.214.

However, as a quantity of transport layers increases, feedback overheads brought by the foregoing feedback mode multiply. A larger quantity of subbands leads to a greater increase in the feedback overheads.

SUMMARY

This application provides a method for indicating a precoding vector, a method for determining a precoding vector, and a communications apparatus, to reduce feedback overheads.

According to a first aspect, a method for indicating a precoding vector is provided. The method may be performed by a terminal device, or may be performed by a chip disposed in a terminal device.

Specifically, the method includes: generating first indication information; and sending the first indication information. The first indication information is used to indicate $L_1$ beam vectors in a beam vector set, $K_1$ frequency domain vectors in a frequency domain vector set, and $T_1$ space-frequency component matrices, and a weighted sum of the $T_1$ space-frequency component matrices is used to determine a precoding vector of one or more frequency domain units, where the $L_1$ beam vectors and the $K_1$ frequency domain vectors correspond to $M_1$ space-frequency component matrices, the $T_1$ space-frequency component matrices are a part of the $M_1$ space-frequency component matrices, each of the $M_1$ space-frequency component matrices is uniquely determined by one of the $L_1$ beam vectors and one of the $K_1$ frequency domain vectors, and $M_1 = L_1 \times K_1$; the $L_1$ beam vectors are a part of beam vectors in the beam vector set, and/or the $K_1$ frequency domain vectors are a part of frequency domain vectors in the frequency domain vector set; and $M_1$, $L_1$, $K_1$, and $T_1$ are all positive integers.

According to a second aspect, a method for determining a precoding vector is provided. The method may be performed by a network device, or may be performed by a chip disposed in a network device.

Specifically, the method includes: receiving first indication information, where the first indication information is used to indicate $L_1$ beam vectors in a beam vector set, $K_1$ frequency domain vectors in a frequency domain vector set, and $T_1$ space-frequency component matrices, and a weighted sum of the $T_1$ space-frequency component matrices is used to determine a precoding vector of one or more frequency domain units, where the $L_1$ beam vectors and the $K_1$ frequency domain vectors correspond to $M_1$ space-frequency component matrices, the $T_1$ space-frequency component matrices are a part of the $M_1$ space-frequency component matrices, each of the $M_1$ space-frequency component matrices is uniquely determined by one of the $L_1$ beam vectors and one of the $K_1$ frequency domain vectors, and $M_1 = L_1 \times K_1$; the $L_1$ beam vectors are a part of beam vectors in the beam vector set, and/or the $K_1$ frequency domain vectors are a part of frequency domain vectors in the frequency domain vector set; and $M_1$, $L_1$, $K_1$, and $T_1$ are all positive integers; and determining a precoding vector of one or more frequency domain units based on the first indication information.

In an implementation, the $T_1$ space-frequency component matrices are selected from the $M_1$ space-frequency component matrices, and the $M_1$ space-frequency component matrices are determined based on the $L_1$ beam vectors and the $K_1$ frequency domain vectors. In another implementation, the $T_1$ space-frequency component matrices are determined by $T_1$ space-frequency vector pairs in $M_1$ space-frequency vector pairs, the $M_1$ space-frequency vector pairs are obtained by combining the $L_1$ beam vectors and the $K_1$ frequency domain vectors, and each space-frequency vector pair is uniquely determined by one of the $L_1$ beam vectors and one of the $K_1$ frequency domain vectors. In still another implementation, the $T_1$ space-frequency component matrices may be represented as $T_1$ space-frequency vector pairs obtained by combining $T_1$ beam vectors and $T_1$ frequency domain vectors, and the $T_1$ space-frequency vector pairs are selected from $M_1$ space-frequency vector pairs obtained by combining the $L_1$ beam vectors and the $K_1$ frequency domain vectors.

Based on the foregoing technical solutions, the terminal device indicates a small quantity of beam vectors, frequency domain vectors, and space-frequency component matrices to the network device to help the network device restore a precoding vector. The frequency domain vector may be used to describe different change rules of a channel in frequency domain. The terminal device may simulate a change of a channel in frequency domain through linear superposition of one or more frequency domain vectors, so that a relationship between frequency domain units is fully explored, continuity of frequency domain is utilized, and a change rule on a plurality of frequency domain units is described by using a relatively small quantity of frequency domain vectors. Compared with the current technology, this application does not require that a weighting coefficient be independently reported based on each frequency domain unit, and an increase in frequency domain units does not cause multiplication of feedback overheads. Therefore, feedback overheads can be greatly reduced while feedback precision is ensured.

However, because the beam vector set may include a relatively large quantity of beam vectors, and the frequency domain vector set may include a relatively large quantity of frequency domain vectors, if a relatively small quantity of beam vectors and a relatively small quantity of frequency domain vectors are directly indicated in the beam vector set and the frequency domain vector set, relatively high bit overheads may be caused, or the terminal device and the network device need to predefine a large quantity of correspondences between beam vector combinations and indexes and a large quantity of correspondences between frequency domain vector combinations and indexes.

However, in the embodiments of this application, the terminal device narrows a selection range of the space-frequency component matrices that are used for weighted summation to a range of the $M_1$ space-frequency component matrices constructed by using the $L_1$ beam vectors and the $K_1$ frequency domain vectors. That is, the terminal device first selects a relatively small range of vectors from an existing vector set, and then selects $T_1$ space-frequency component matrices from the range and indicates the $T_1$ space-frequency component matrices. On one hand, relatively high feedback overheads caused by directly indicating the $T_1$ space-frequency component matrices can be avoided. On the other hand, the terminal device and the network device may not need to store a large quantity of correspondences.

It needs to be noted that the $T_1$ beam vectors are a part of beam vectors selected from the $L_1$ beam vectors, but it does not mean that $T_1$ is necessarily smaller than $L_1$, and some or all of the $T_1$ beam vectors may be reused. Therefore, a quantity of beam vectors used for combination to obtain $T_1$ beam vector pairs is $T_1$. Likewise, the $T_1$ frequency domain vectors are a part of frequency domain vectors selected from the $K_1$ frequency domain vectors, but it does not mean that $T_1$ is necessarily smaller than $K_1$, and some or all of the $T_1$ frequency domain vectors may be reused. Therefore, a quantity of frequency domain vectors used for combination to obtain $T_1$ frequency domain vector pairs is $T_1$. For brevity, descriptions of a same or similar case are omitted below.

With reference to the first aspect, in some implementations of the first aspect, the method further includes: receiving second indication information, where the second indication information is used to indicate a value or values of one or more of $M_1$, $L_1$, and $K_1$.

Correspondingly, with reference to the second aspect, in some implementations of the second aspect, the method further includes: sending second indication information, where the second indication information is used to indicate a value or values of one or more of $M_1$, $L_1$, and $K_1$.

That is, the value or the values of the one or more of $M_1$, $L_1$, and $K_1$ may be indicated by the network device.

With reference to the first aspect, in some implementations of the first aspect, the method further includes: sending second indication information, where the second indication information is used to indicate a value or values of one or more of $M_1$, $L_1$, and $K_1$.

Correspondingly, with reference to the second aspect, in some implementations of the second aspect, the method further includes: receiving second indication information, where the second indication information is used to indicate a value or values of one or more of $M_1$, $L_1$, and $K_1$.

That is, the value or the values of the one or more of $M_1$, $L_1$, and $K_1$ may be determined by the terminal device and reported to the network device.

It should be understood that the value or the values of the one or more of $M_1$, $L_1$, and $K_1$ may be alternatively predefined, for example, defined in a protocol. This is not limited in this application.

With reference to the first aspect, in some implementations of the first aspect, the method further includes: receiving third indication information, where the third indication information is used to indicate a value of $T_1$.

In other words, the value of $T_1$ may be indicated by the network device.

With reference to the first aspect, in some implementations of the first aspect, the method further includes: sending third indication information, where the third indication information is used to indicate a value of $T_1$.

In other words, the value of $T_1$ may be determined by the terminal device and reported by the terminal device to the network device.

It should be understood that the value of $T_1$ may be alternatively predefined, for example, defined in a protocol. This is not limited in this application.

With reference to the first aspect or the second aspect, in some implementations, the first indication information includes location information of the $L_1$ beam vectors in the beam vector set and location information of the $K_1$ frequency domain vectors in the frequency domain vector set.

In other words, because the $L_1$ beam vectors and the $K_1$ frequency domain vectors correspond to the $M_1$ space-frequency component matrices, the $M_1$ space-frequency component matrices may be determined by indicating the $L_1$ beam vectors and the $K_1$ frequency domain vectors. In other words, the $M_1$ space-frequency component matrices may be indicated by using a two-dimensional index.

With reference to the first aspect or the second aspect, in some implementations, the $M_1$ space-frequency component matrices are selected from a space-frequency component matrix set or a subset of a space-frequency component matrix set, the space-frequency component matrices are determined by beam vectors in the beam vector set and frequency domain vectors in the frequency domain vector set, and each space-frequency component matrix in the space-frequency component matrix set is uniquely determined by one beam vector in the beam vector set and one frequency domain vector in the frequency domain vector set; and the first indication information includes location information of the $M_1$ space-frequency component matrices in the space-frequency component matrix set or location information of the $M_1$ space-frequency component matrices in the subset of the space-frequency component matrix set.

In other words, the $M_1$ space-frequency component matrices may be indicated by using a one-dimensional index.

It needs to be noted that a concept of the $M_1$ space-frequency component matrices is introduced in this specification only for ease of understanding. This does not mean that the terminal device definitely generates the $M_1$ space-frequency component matrices. Alternatively, the terminal device may obtain the $M_1$ space-frequency vector pairs by combining the $L_1$ beam vectors and the $K_1$ frequency domain vectors. However, it may be understood that the $M_1$ space-frequency component matrices may be constructed by using the $L_1$ beam vectors and the $K_1$ frequency domain vectors, or by using the $M_1$ space-frequency vector pairs. In other words, the $M_1$ space-frequency vector pairs and the $M_1$ space-frequency component matrices may be mutually converted. Therefore, it may be considered that the $M_1$ space-frequency component matrices correspond to the $L_1$ beam vectors and the $K_1$ frequency domain vectors.

Optionally, each of the $M_1$ space-frequency component matrices is determined by a product of one of the $L_1$ beam vectors and a conjugate transpose of one of the $K_1$ frequency domain vectors.

Optionally, each of the $M_1$ space-frequency component matrices is determined by a Kronecker product of one of the $K_1$ frequency domain vectors and one of the $L_1$ beam vectors.

In the embodiments, for ease of understanding, an example in which both the beam vector and the frequency domain vector are column vectors is used to describe a relationship between the $M_1$ space-frequency component matrices and the $L_1$ beam vectors and between the $M_1$ space-frequency component matrices and the $K_1$ frequency domain vectors. However, this should not constitute any limitation on this application. For example, the frequency domain vector may alternatively be a row vector. In this case, each space-frequency component matrix may be determined by a product of one beam vector and one frequency domain vector. For another example, each space-frequency component matrix may be determined by a Kronecker product of one beam vector and one frequency domain vector. This is not limited in this application.

With reference to the first aspect or the second aspect, in some implementations, the first indication information may be used to indicate the $T_1$ space-frequency component matrices (or the $T_1$ space-frequency vector pairs) in any one of the following manners:

Manner 1: The $T_1$ space-frequency component matrices in the $M_1$ space-frequency component matrices are indicated by using a bitmap (bitmap).

Manner 2: An index of a combination of the $T_1$ space-frequency component matrices in the $M_1$ space-frequency component matrices is indicated.

Manner 3: A location, in the $L_1$ beam vectors, of a beam vector corresponding to each of the $T_1$ space-frequency component matrices and a location, in the $K_1$ frequency domain vectors, of a frequency domain vector corresponding to each of the $T_1$ space-frequency component matrices are indicated.

Manner 4: An index, in the $M_1$ space-frequency component matrices, of each of the $T_1$ space-frequency component matrices is indicated.

The selection range of the $T_1$ space-frequency component matrices can be narrowed by indicating the $T_1$ space-frequency component matrices in the $M_1$ space-frequency component matrices, so that the feedback overheads of the $T_1$ space-frequency component matrices can be reduced.

With reference to the first aspect or the second aspect, in some implementations, the weighted sum of the $T_1$ space-frequency component matrices is used to determine a precoding vector of one or more frequency domain units at a first transport layer.

The first transport layer may be one transport layer, or may be a plurality of transport layers.

With reference to the first aspect, in some possible implementations, the method further includes: generating fourth indication information, where the fourth indication information is used to indicate $L_2$ beam vectors in the beam vector set, $K_2$ frequency domain vectors in the frequency domain vector set, and $T_2$ space-frequency component matrices, and a weighted sum of the $T_2$ space-frequency component matrices is used to determine a precoding vector of one or more frequency domain units at a second transport layer, where the $L_2$ beam vectors and the $K_2$ frequency domain vectors correspond to $M_2$ space-frequency component matrices, the $T_2$ space-frequency component matrices are a part of the $M_2$ space-frequency component matrices, each of the $M_2$ space-frequency component matrices is uniquely determined by one of the $L_2$ beam vectors and one of the $K_2$ frequency domain vectors, and $M_2=L_2 \times K_2$; the $L_2$ beam vectors are a part of beam vectors in the beam vector set, and/or the $K_2$ frequency domain vectors are a part of frequency domain vectors in the frequency domain vector set; and $M_2$, $L_2$, $K_2$, and $T_2$ are all positive integers; and sending the fourth indication information.

With reference to the second aspect, in some possible implementations, the method further includes: receiving fourth indication information, where the fourth indication information is used to indicate $L_2$ beam vectors in the beam vector set and $T_2$ space-frequency component matrices, and a weighted sum of the $T_2$ space-frequency component matrices is used to determine a precoding vector of one or more frequency domain units at a second transport layer, where the $L_2$ beam vectors and the $K_2$ frequency domain vectors correspond to $M_2$ space-frequency component matrices, the $T_2$ space-frequency component matrices are a part of the $M_2$ space-frequency component matrices, each of the $M_2$ space-frequency component matrices is uniquely determined by one of the $L_2$ beam vectors and one of the $K_2$ frequency domain vectors, and $M_2=L_2 \times K_2$; the $L_2$ beam vectors are a part of beam vectors in the beam vector set, and/or the $K_2$ frequency domain vectors are a part of frequency domain vectors in the frequency domain vector set; and $M_2$, $L_2$, $K_2$, and $T_2$ are all positive integers; and determining the precoding vector of the one or more frequency domain units at the second transport layer based on the fourth indication information.

The second transport layer may be one or more transport layers other than the first transport layer in a plurality of transport layers.

Based on the fourth indication information, the terminal device may indicate, to the network device, the determined precoding vector of the one or more frequency domain units at the second transport layer.

With reference to the first aspect or the second aspect, in some implementations, $L_1=L_2$, $K_1=K_2$, and $T_1=T_2$.

With reference to the first aspect or the second aspect, in some implementations, $L_1>L_2$, $K_1>K_2$, or $T_1>T_2$.

According to a third aspect, a communications apparatus is provided, and includes modules or units configured to perform the method according to any possible implementation of the first aspect.

According to a fourth aspect, a communications apparatus is provided, and includes a processor. The processor is coupled to a memory, and may be configured to read and execute an instruction in the memory, to implement the method according to any possible implementation of the first aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip disposed in a terminal device. When the communications apparatus is the chip disposed in the terminal device, the communications interface may be an input/output interface.

Optionally, the transceiver may be a transceiver circuit. Optionally, the input/output interface may be an input/output circuit.

According to a fifth aspect, a communications apparatus is provided, and includes modules or units configured to perform the method according to any possible implementation of the second aspect.

According to a sixth aspect, a communications apparatus is provided, and includes a processor. The processor is coupled to a memory, and may be configured to read and execute an instruction in the memory, to implement the method according to any possible implementation of the second aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver or an input/output interface.

In another implementation, the communications apparatus is a chip disposed in a network device. When the communications apparatus is the chip disposed in the network device, the communications interface may be an input/output interface.

Optionally, the transceiver may be a transceiver circuit. Optionally, the input/output interface may be an input/output circuit.

According to a seventh aspect, a processor is provided, and includes an input circuit, an output circuit, and a processing circuit. The processing circuit is configured to: receive an input signal via the input circuit, and output a signal via the output circuit, so that the processor performs the method according to any one of the first aspect, the possible implementations of the first aspect, the second aspect, or the possible implementations of the second aspect.

In a specific implementation process, the processor may be a chip, the input circuit may be an input pin, the output circuit may be an output pin, and the processing circuit may be a transistor, a gate circuit, a trigger, various logic circuits, or the like. The input signal received by the input circuit may be received and input by, for example, but not limited to, a receiver, the signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in the embodiments of this application.

According to an eighth aspect, a processing apparatus is provided, and includes a processor and a memory. The processor is configured to: read an instruction stored in the memory, receive a signal via a receiver, and transmit a signal via a transmitter, to perform the method according to any one of the first aspect, the possible implementations of the first aspect, the second aspect, or the possible implementations of the second aspect.

Optionally, there are one or more processors and one or more memories.

Optionally, the memory may be integrated into the processor, or the memory and the processor may be separately disposed.

In a specific implementation process, the memory may be a non-transitory (non-transitory) memory, for example, a read-only memory (read only memory, ROM). The memory and the processor may be integrated on a same chip, or may be separately disposed on different chips. A type of the memory and a manner of disposing the memory and the processor are not limited in the embodiments of this application.

It should be understood that a related data communication process, for example, sending indication information, may be a process of outputting the indication information from the processor, and receiving capability information, may be a process of receiving the input capability information by the processor. Specifically, data output by the processor may be output to the transmitter, and input data received by the processor may be from the receiver. The transmitter and the receiver may be collectively referred to as a transceiver.

The processing apparatus according to the eighth aspect may be one or more chips. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. The memory may be integrated into the processor, or may be located outside the processor and exist independently.

According to a ninth aspect, a computer program product is provided. The computer program product includes a computer program (also referred to as code or an instruction). When the computer program is run, a computer is enabled to perform the method according to any one of the first aspect, the possible implementations of the first aspect, the second aspect, or the possible implementations of the second aspect.

According to a tenth aspect, a computer-readable medium is provided. The computer-readable medium stores a computer program (also referred to as code or an instruction). When the computer program is run on a computer, the computer is enabled to perform the method according to any one of the first aspect, the possible implementations of the first aspect, the second aspect, or the possible implementations of the second aspect.

According to an eleventh aspect, a communications system is provided, and includes the foregoing network device and terminal device.

DESCRIPTION OF EMBODIMENTS

The following describes technical solutions of this application with reference to the accompanying drawings.

The technical solutions of the embodiments of this application may be applied to various communications systems, such as a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD), a universal mobile telecommunications system (universal mobile telecommunication system, UMTS), a worldwide interoperability for microwave access (worldwide interoperability for microwave access, WiMAX) communications system, a 5th generation (5th generation, 5G) system, or a new radio (new radio, NR) system.

Figure 1:
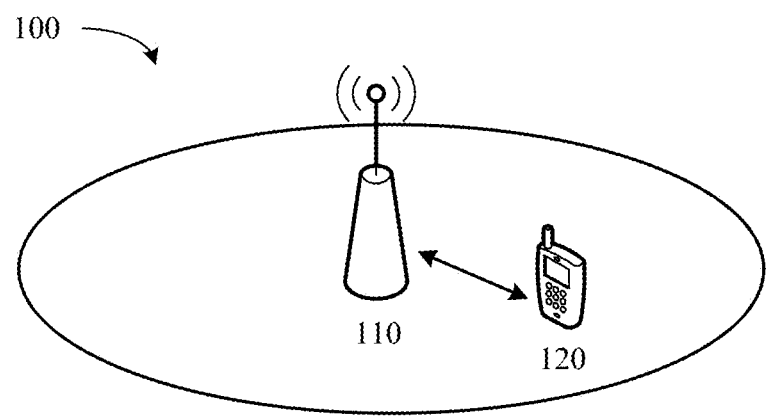
FIG. 1 is a schematic diagram of a communications system to which a method for indicating a precoding vector and a method for determining a precoding vector provided in an embodiment of this application is applicable.

First, for ease of understanding of the embodiments of this application, a communications system shown in FIG. 1 is used as an example to describe in detail a communications system to which the embodiments of this application are applicable. FIG. 1 is a schematic diagram of a communications system 100 to which a method for indicating a precoding vector in an embodiment of this application is applicable. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 and the terminal device 120 may communicate with each other through a wireless link. A plurality of antennas may be configured for each communications device such as the network device 110 or the terminal device 120. For each communications device in the communications system 100, the configured plurality of antennas may include at least one transmit antenna configured to send a signal and at least one receive antenna configured to receive a signal. Therefore, communications devices in the communications system 100, for example, the network device 110 and the terminal device 120, may communicate with each other by using a multi-antenna technology.

It should be understood that the network device in the communications system may be any device that has a wireless transceiver function. The network device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home NodeB (for example, a home evolved NodeB, or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission point, TP), a transmission and reception point (transmission and reception point, TRP), or the like. Alternatively, the network device may be a gNB or a transmission point (TRP or TP) in a 5G system such as an NR system, may be one antenna panel or a group (including a plurality of antenna panels) of antenna panels of a base station in a 5G system, or may be a network node, such as a baseband unit (BBU) or a distributed unit (distributed unit, DU), that constitute a gNB or a transmission point.

In some deployments, the gNB may include a centralized unit (centralized unit, CU) and a DU. The gNB may further include a radio frequency unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the RU. It may be understood that the network device may be a CU node, a DU node, or a device including a CU node and a DU node. In addition, the CU may be a network device in an access network (radio access network, RAN), or may be a network device in a core network (core network, CN). This is not limited in this application.

It should be further understood that the terminal device in the wireless communications system may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone (mobile phone), a tablet computer (pad), a computer with a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application.

It should be further understood that FIG. 1 is only a simplified schematic diagram of an example for ease of understanding. The communications system 100 may further include another network device or another terminal device, which is not shown in FIG. 1.

For ease of understanding of the embodiments of this application, the following briefly describes a processing process of a downlink signal at a physical layer before the downlink signal is sent. It should be understood that the processing process of the downlink signal described below may be performed by the network device, or may be performed by a chip disposed in the network device. For ease of description, the network device and the chip disposed in the network device are collectively referred to as a network device below.

The network device may process a codeword (code word) on a physical channel. The codeword may be a coded bit obtained through coding (for example, including channel coding). A codeword is scrambled (scrambling) to generate a scrambling bit. Modulation mapping (modulation mapping) is performed on the scrambling bit, to obtain a modulation symbol. The modulation symbol is mapped to a plurality of layers (layer), through layer mapping (layer mapping). The layer is also referred to as a transport layer. A modulation symbol obtained through the layer mapping is precoded (precoding), to obtain a precoded signal. The precoded signal is mapped to a plurality of resource elements (resource element, RE) through RE mapping. These REs are then transmitted through an antenna port (antenna port) after orthogonal frequency division multiplexing (orthogonal frequency division multiplexing, OFDM) modulation is performed on the REs.

It should be understood that the processing process of the downlink signal described above is merely an example for description, and should not constitute any limitation on this application. For a specific processing process of the downlink signal, refer to the current technology. For brevity, a detailed description of the specific process is omitted herein.

To facilitate understanding of the embodiments of this application, the following first briefly describes terms used in the embodiments of this application.

1. Precoding technology: When a channel state is known, a network device may process a to-be-sent signal by using a precoding matrix that matches a channel, so that a precoded to-be-sent signal adapts to the channel, to reduce complexity of eliminating inter-channel impact by a receive device. Therefore, after the to-be-sent signal is precoded, quality (for example, a signal to interference plus noise ratio (signal to interference plus noise ratio, SINR)) of a received signal is improved. Therefore, transmission between a transmit device and a plurality of receive devices can be implemented on a same time-frequency resource by using the precoding technology. That is, multi-user multiple-input multiple-output (multiple user multiple input multiple output, MU-MIMO) is implemented. It should be noted that related descriptions of the precoding technology are merely examples for ease of understanding, and are not intended to limit the protection scope of the embodiments of this application. In a specific implementation process, the transmit device may further perform precoding in another manner. For example, when channel information (for example, but not limited to a channel matrix) cannot be learned, precoding is performed by using a preset precoding matrix or through weighted processing. For brevity, specific content of the precoding manner is not further described in this specification.

2. Precoding matrix indicator (precoding matrix indicator, PMI): A precoding matrix indicator may be used to indicate a precoding matrix. The precoding matrix may be, for example, a precoding matrix determined by a terminal device based on a channel matrix for each subband. The channel matrix may be determined by the terminal device through channel estimation or the like or based on channel reciprocity. However, it should be understood that a specific method for determining the precoding matrix by the terminal device is not limited to the foregoing description. For a specific implementation, refer to the current technology. For brevity, details are not exhaustively described herein.

For example, the precoding matrix may be obtained by performing singular value decomposition (singular value decomposition, SVD) on a channel matrix or a covariance matrix of a channel matrix, or may be obtained by performing eigenvalue decomposition (eigenvalue decomposition, EVD) on a covariance matrix of a channel matrix. This is not limited in this application. It should be understood that the foregoing enumerated manner of determining the precoding matrix is merely an example, and should not constitute any limitation on this application. For the manner of determining the precoding matrix, refer to the current technology. For brevity, detailed descriptions of a specific process of determining the precoding matrix are omitted herein.

The terminal device may quantize a precoding matrix for each subband, and may send a quantized value to the network device by using a PMI, so that the network device determines, based on the PMI, a precoding matrix that is the same as or similar to the precoding matrix determined by the terminal device. For example, the network device may directly determine the precoding matrix for each subband based on the PMI, or may determine the precoding matrix for each subband based on the PMI and then perform further processing, for example, perform orthogonalization processing on precoding matrices of different users, to determine a finally used precoding matrix. Therefore, the network device can determine a precoding matrix that adapts to a channel for each subband, to perform precoding processing on a to-be-sent signal. It should be understood that for a specific method for determining, by the network device based on the PMI, the precoding matrix used for each subband, refer to the current technology. This is merely an example for ease of understanding, and should not constitute any limitation on this application.

In conclusion, the precoding matrix determined by the terminal device may be understood as a to-be-fed-back precoding matrix. The terminal device may indicate the to-be-fed-back precoding matrix by using the PMI, so that the network device restores the precoding matrix based on the PMI. It may be understood that the precoding matrix restored by the network device based on the PMI may be the same as or similar to the to-be-fed-back precoding matrix.

A simple example of a precoding matrix fed back by using two levels when a rank (rank) is 1 is shown below.

$$W = W_1 W_2 = \begin{bmatrix} a_0 v_0 & a_1 v_1 & a_2 v_2 & a_3 v_3 & & & & \\ & & & & a_4 v_0 & a_5 v_1 & a_6 v_2 & a_7 v_3 \end{bmatrix} \begin{bmatrix} c_0 \\ c_1 \\ c_2 \\ c_3 \\ c_4 \\ c_5 \\ c_6 \\ c_7 \end{bmatrix} =$$

$$\begin{bmatrix} a_0 c_0 v_0 + a_1 c_1 v_1 + a_2 c_2 v_2 + a_3 c_3 v_3 \\ a_4 c_4 v_0 + a_5 c_5 v_1 + a_6 c_6 v_2 + a_7 c_7 v_3 \end{bmatrix}.$$

W represents a precoding matrix to be fed back at one transport layer, on one subband, and in two polarization directions. $W_1$ may be fed back by using a wideband, and $W_2$ may be fed back by using a subband. $v_0$ to $v_3$ are beam vectors included in $W_1$, and the plurality of beam vectors may be indicated by using, for example, an index of a combination of the plurality of beam vectors. In the precoding matrix shown above, beam vectors in the two polarization directions are the same, and the beam vectors $v_0$ to $v_3$ are used in both of the two polarization directions. $a_0$ to $a_7$ are wideband amplitude coefficients included in $W_1$, and may be indicated by using quantized values of the wideband amplitude coefficients. $c_0$ to $c_7$ are subband coefficients included in $W_2$, and each subband coefficient may include a subband amplitude coefficient and a subband phase coefficient. For example, $c_0$ to $c_7$ may include subband amplitude coefficients $\alpha_0$ to $\alpha_7$ and subband phase coefficients $\varphi_0$ to $\varphi_7$, respectively, and may be indicated by using quantized values of the subband amplitude coefficients $\alpha_0$ to $\alpha_7$ and quantized values of the subband phase coefficients $\varphi_0$ to $\varphi_7$, respectively. It can be learned that the to-be-fed-back precoding matrix may be considered as a weighted sum of the plurality of beam vectors.

It should be understood that the precoding matrix shown above is obtained based on feedback at one transport layer, and therefore may also be referred to as a precoding vector. When a quantity of transport layers increases, the terminal device may separately perform feedback based on each transport layer. A precoding matrix of one subband may be constructed based on a precoding vector obtained through the feedback at each transport layer. For example, if there are four transport layers, the precoding matrix may include four precoding vectors that are respectively corresponding to the four transport layers.

As the quantity of transport layers increases, feedback overheads of the terminal device also increase. For example, when there are four transport layers, feedback overheads for $a_0$ to $a_7$ and $c_0$ to $c_7$ are at most four times those at one transport layer. In other words, if the terminal device performs the foregoing wideband feedback and subband feedback based on each transport layer, feedback overheads multiply as the quantity of transport layers increases. A larger quantity of subbands leads to a greater increase in the feedback overheads. Therefore, it is expected to provide a method that can reduce PMI feedback overheads.

It should be understood that the foregoing enumerated manner of feeding back the precoding matrix by using the PMI is merely an example, and should not constitute any limitation on this application. For example, alternatively, the terminal device may feed back a channel matrix to the network device by using the PMI, and the network device may determine the channel matrix based on the PMI, to determine a precoding matrix. This is not limited in this application.

3. Precoding vector: In the embodiments of this application, a precoding vector may be determined by a vector, for example, a column vector, in the precoding matrix. To be specific, the precoding matrix may include one or more column vectors, and each column vector may be used to determine one precoding vector. When a precoding matrix includes only one column vector, the precoding matrix may also be referred to as a precoding vector.

A precoding matrix may be determined by a precoding vector or precoding vectors at one or more transport layers, and each vector in the precoding matrix may correspond to one transport layer. It is assumed that the precoding vector may have a dimension of $N_1 \times 1$. If a quantity of transport layers is R (R is a positive integer), the precoding matrix may have a dimension of $N_1 \times R$. The quantity of transport layers may be indicated by using a rank indicator (rank indicator, RI), $N_1$ may represent a quantity of antenna ports, and $N_1$ is a positive integer.

When a plurality of polarization directions are configured for a transmit antenna, a precoding vector may alternatively be a component of a precoding matrix at one transport layer in one polarization direction. It is assumed that a quantity of polarization directions is P (P is a positive integer), and a quantity of antenna ports in one polarization direction is $N_2$. In this case, a dimension of a precoding vector corresponding to one transport layer is $(P \times N_2) \times 1$, and a dimension of a precoding vector in one polarization direction may be $N_2 \times 1$, where $N_2$ is a positive integer.

Therefore, the precoding vector may correspond to one transport layer, may correspond to one polarization direction at one transport layer, or may correspond to another parameter. This is not limited in this application.

4. Antenna port: An antenna port may be referred to as a port for short. The antenna port may be understood as a transmit antenna identified by a receive device, or a transmit antenna that can be distinguished in space. One antenna port may be configured for each virtual antenna, each virtual antenna may be a weighted combination of a plurality of physical antennas, and each antenna port may correspond to one reference signal. Therefore, each antenna port may be referred to as a reference signal port, for example, a CSI-RS port or a sounding reference signal (sounding reference signal, SRS) port.

5. Beam and beam vector: A beam may be understood as a distribution of signal strength formed in a direction in space. A technology of beam forming may be a beamforming (or referred to as beamforming) technology or another technology. The beamforming technology may be specifically a digital beamforming technology, an analog beamforming technology, or a hybrid digital/analog beamforming technology. In the embodiments of this application, a beam may be formed by using a digital beamforming technology.

A beam vector may correspond to the beam, and may be a precoding vector in a precoding matrix, or may be a beamforming vector. Each element in the beam vector may represent a weight of each antenna port. Weighted signals at different antenna ports are superimposed to form an area with relatively strong signal strength.

In the embodiments of this application, the beam vector may also be referred to as a spatial vector. Optionally, a length (or a dimension) of the beam vector is a quantity of antenna ports in one polarization direction.

It is assumed that the length of the beam vector is $N_s$. The beam vector may be a column vector having a dimension of $N_s \times 1$, or may be a row vector having a dimension of $1 \times N_s$. This is not limited in this application.

6. Frequency domain unit: A frequency domain unit is a unit of a frequency domain resource, and may represent different frequency domain resource granularities. The frequency domain unit may include, but is not limited to, a subband, a resource block (resource block, RB), a subcarrier, a resource block group (resource block group, RBG), a precoding resource block group (precoding resource block group, PRG), and the like.

7. Frequency domain vector: A frequency domain vector is a vector that is proposed in the embodiments of this application and that is used to indicate a change rule of a channel in frequency domain. The frequency domain vector may be specifically used to represent a change rule of a weighting coefficient of each beam vector on each frequency domain unit. This change rule may be related to a multipath delay. When a signal is transmitted on a radio channel, there may be different transmission delays on different propagation paths. Therefore, different frequency domain vectors may be used to represent a change rule of delays on different propagation paths.

A dimension of a frequency domain vector may be a quantity of frequency domain units on which CSI measurement needs to be performed. Because quantities of frequency domain units on which CSI measurement needs to be performed may be different at different moments, a dimension of a frequency domain vector may also change. In other words, the dimension of the frequency domain vector is variable.

Optionally, a length (or the dimension) of the frequency domain vector is a quantity of frequency domain units included in a frequency domain occupation bandwidth of a CSI measurement resource.

The frequency domain occupation bandwidth of the CSI measurement resource may be a bandwidth used to transmit a reference signal. The reference signal herein may be a reference signal, for example, a CSI-RS, used for channel measurement. The frequency domain occupation bandwidth of the CSI measurement resource may be, for example, less than or equal to a pilot transmission bandwidth (or referred to as a measurement bandwidth). In an NR system, signaling used to indicate the frequency domain occupation bandwidth of the CSI measurement resource may be, for example, a CSI-frequency occupation range (CSI-Frequency Occupation).

It should be understood that the frequency domain occupation bandwidth of the CSI measurement resource is named only for ease of description, and should not constitute any limitation on this application. This application does not exclude a possibility of expressing a same meaning by using another name.

Optionally, the length of the frequency domain vector is a length of signaling used to indicate a quantity of to-be-reported frequency domain units and locations of the to-be-reported frequency domain units.

In the NR system, the signaling used to indicate the quantity of the to-be-reported frequency domain units and the locations of the to-be-reported frequency domain units may be a reporting band (reporting band). For example, the signaling may be used to indicate the quantity of the to-be-reported frequency domain units and the locations of the to-be-reported frequency domain units by using a bitmap. Therefore, the dimension of the frequency domain vector may be a quantity of bits in the bitmap. It should be understood that the reporting band is merely a possible name of the signaling, and should not constitute any limitation on this application. This application does not exclude a possibility of naming the signaling by using another name to implement a same or similar function.

Optionally, the length of the frequency domain vector is a quantity of to-be-reported frequency domain units.

For example, the quantity of to-be-reported frequency domain units may be indicated by using the foregoing signaling of reporting band. The quantity of to-be-reported frequency domain units may be all or some of frequency domain units in the frequency domain occupation bandwidth of the CSI measurement resource. Alternatively, the quantity of to-be-reported frequency domain units may be the same as a signaling length of the reporting band, or may be less than a signaling length of the reporting band. This is not limited in this application.

When it is defined in a protocol that the length of the frequency domain vector is one of the foregoing enumerated items, it may be considered that either the signaling used to indicate the frequency domain occupation bandwidth of the CSI measurement resource or signaling used to indicate the quantity of the to-be-reported frequency domain units and the locations of the to-be-reported frequency domain units is used to implicitly indicate the length of the frequency domain vector. For ease of differentiation and description, indication information used for the length of the frequency domain vector is denoted as fifth indication information. The fifth indication information may be the signaling used to indicate the frequency domain occupation bandwidth of the CSI measurement resource, may be the signaling used to indicate the quantity of the to-be-reported frequency domain units and the locations of the to-be-reported frequency domain units, or may be signaling newly added in a future protocol. This is not limited in this application.

Assuming that the length of the frequency domain vector is $N_f$, the frequency domain vector may be a column vector having a dimension of $N_f \times 1$, or may be a row vector having a dimension of $1 \times N_f$. This is not limited in this application.

8. Space-frequency matrix and space-frequency component matrix: For ease of description, it is assumed in the following that a quantity of polarization directions of a transmit antenna is 1.

If the transmit antenna has one polarization direction, a space-frequency matrix in the polarization direction may be constructed by using precoding vectors on different frequency domain units at one transport layer.

In the embodiments of this application, for example, the terminal device may determine a to-be-fed-back precoding matrix on each frequency domain unit through channel measurement or the like. The to-be-fed-back precoding matrix on each frequency domain unit is processed, to obtain a space-frequency matrix corresponding to each transport layer. For example, for one transport layer, to-be-fed-back precoding vectors on all frequency domain units may be combined to obtain a space-frequency matrix. The space-frequency matrix may be referred to as a to-be-fed-back space-frequency matrix. The terminal device may indicate the to-be-fed-back space-frequency matrix by using a weighted sum of one or more space-frequency component matrices. In other words, the to-be-fed-back space-frequency matrix may be approximately the weighted sum of the one or more space-frequency component matrices. The one or more space-frequency component matrices may be selected from a predefined space-frequency component matrix set, or may be determined based on a beam vector in a predefined beam vector set and a frequency domain vector in a predefined frequency domain vector set. This is not limited in this application.

In a possible design, the space-frequency matrix may be a matrix having a dimension of $N_s \times N_f$. That is, the space-frequency matrix may include $N_f$ column vectors whose lengths are $N_s$. The $N_f$ column vectors may correspond to $N_f$ frequency domain units, and each column vector may be used to determine a precoding vector of a corresponding frequency domain unit.

For example, the space-frequency matrix may be denoted as H, where $H=[h_0 \ h_1 \ \ldots \ h_{N_f-1}]$. $h_0$ To $h_{N_f-1}$ are the $N_f$ column vectors corresponding to the $N_f$ frequency domain units, and each column vector may have a length of $N_s$. The $N_f$ column vectors may be respectively used to determine precoding vectors of the $N_f$ frequency domain units.

The space-frequency matrix may be approximately a weighted sum of one or more space-frequency component matrices.

In the embodiments, one space-frequency component matrix may be uniquely determined by one beam vector and one frequency domain vector. For example, when both the beam vector and the frequency domain vector are column vectors, one space-frequency component matrix may be a product of one beam vector and a conjugate transpose of one frequency domain vector. When the beam vector is a column vector and the frequency domain vector is a row vector, one space-frequency component matrix may be a product of one beam vector and one frequency domain vector. Therefore, each space-frequency component matrix may also be a matrix having a dimension of $N_s \times N_f$.

In another possible design, the space-frequency matrix may be a matrix having a dimension of $(N_s \times N_f) \times 1$, or the space-frequency matrix may be a vector having a length of $N_s \times N_f$. In other words, the space-frequency matrix may include only one column vector having a length of $N_s \times N_f$. In this case, the space-frequency matrix may also be referred to as a space-frequency vector.

For example, the space-frequency matrix may be denoted as H, where $H=[h_0^T \ h_1^T \ \ldots \ h_{N_f-1}^T]^T$. Vectors in the matrix have been described in detail above. For brevity, details are not described herein again.

The space-frequency vector may be approximately a weighted sum of one or more space-frequency component vectors.

In the embodiments, one space-frequency component vector may be uniquely determined by one beam vector and one frequency domain vector. For example, when both the beam vector and the frequency domain vector are column vectors, one space-frequency component vector may be a Kronecker product of one beam vector and one frequency domain vector, or may be a Kronecker product of one frequency domain vector and one beam vector. Therefore, each space-frequency component vector may also be a vector having a length of $N_s \times N_f$. In this case, the space-frequency component matrix may also be referred to as a space-frequency component vector.

If a space-frequency component vector is determined by a Kronecker product of a frequency domain vector and a beam vector, a space-frequency vector determined by a weighted sum of a plurality of space-frequency component vectors may be obtained by sequentially connecting $N_f$ column vectors each having a length of N. The $N_f$ column vectors may correspond to $N_f$ frequency domain units, and each column vector may be used to determine a precoding vector of a corresponding frequency domain unit.

If a space-frequency component vector is determined by a Kronecker product of a beam vector and a frequency domain vector, a space-frequency vector determined by a weighted sum of a plurality of space-frequency component vectors may be obtained by sequentially connecting $N_s$ column vectors each having a length of $N_f$. $N_f$ elements in each column vector may correspond to $N_f$ frequency domain units. $n_f^{th}$ elements in all of the $N_s$ column vectors may be sequentially connected to obtain a vector having a length of $N_s$, and the vector may be used to determine a precoding vector of an $n_f^{th}$ frequency domain unit. $0 \leq n_f \leq N_f-1$, and $n_f$ is an integer.

It should be understood that the foregoing merely describes, for ease of understanding, several possible forms of a space-frequency matrix in one polarization direction, for example, a matrix having a dimension of $N_s \times N_f$ or a vector having a length of $N_s \times N_f$. However, this should not constitute any limitation on this application. When a quantity of polarization directions is greater than 1, the space-frequency matrix can still be represented in the several forms enumerated above, but a dimension of the space-frequency matrix may vary with the quantity of polarization directions. For example, when the quantity of polarization directions is 2, the space-frequency matrix may be a matrix having a dimension of $2N_s \times N_f$, or may be a vector having a length of $2N_s \times N_f$. 2 indicates that there are two polarization directions.

However, the space-frequency component matrix may still be a matrix having a dimension of $N_s \times N_f$ or a vector having a length of $N_s \times N_f$. Therefore, a space-frequency matrix in each polarization direction may be represented by a weighted sum of a plurality of space-frequency component matrices. In other words, a space-frequency matrix in each polarization direction may be approximately represented as a weighted sum of a plurality of space-frequency component matrices. A plurality of space-frequency component matrices used for different polarization directions may be the same, or a plurality of polarization directions may share a plurality of same space-frequency component matrices. In other words, space-frequency matrices or space-frequency vectors in a plurality of polarization directions at a same transport layer may be constructed by using a same group of beam vectors and a same group of frequency domain vectors. However, weighting coefficients of space-frequency component matrices in different polarization directions may be different.

In the embodiments of this application, a basic unit that may be obtained by performing an operation on a beam vector and a frequency domain vector may be a space-frequency base unit, for example, a space-frequency component matrix or a space-frequency component vector. The space-frequency base unit may correspond to one polarization direction. A weighted sum of base units can be spliced to form a space-frequency matrix in a plurality of polarization directions.

It should be further understood that a specific form of the space-frequency matrix is not limited to the foregoing examples. For brevity, examples are not further listed one by one herein. With reference to the two forms in which the space-frequency component matrix is the product of the beam vector and the conjugate transpose of the frequency domain vector and the space-frequency component matrix is the Kronecker product of the frequency domain vector and the beam vector, specific processes in which the terminal device indicates a precoding vector and the network device determines a precoding vector are described in detail in the following embodiments. However, this should not constitute any limitation on this application. Based on a same concept, a person skilled in the art may perform equivalent deformation or replacement on the space-frequency component matrix. Any equivalent deformation and replacement shall fall within the protection scope of this application.

As described above, in downlink channel measurement, higher approximation between a precoding matrix determined by the network device based on the PMI and a precoding matrix determined by the terminal device indicates that the precoding matrix determined by the network device for data transmission is more adaptable to a channel state. In this way, signal receive quality can be improved.

To improve spectrum resource utilization and improve a data transmission capability of a communications system, a network device may transmit data to a terminal device by using a plurality of transport layers. However, when a quantity of transport layers increases, overheads caused by feedback performed by the terminal device based on each transport layer multiply. A larger quantity of subbands leads to a greater increase in the feedback overheads. Therefore, it is expected to provide a method that can reduce feedback overheads.

In view of this, this application provides a method for indicating and determining a precoding vector, to reduce PMI feedback overheads.

For ease of understanding of the embodiments of this application, the following descriptions are provided.

First, in the embodiments of this application, it is assumed that a quantity of polarization directions of a transmit antenna is P (P≥1 and P is an integer), and a quantity of transport layers is R (R≥1 and R is an integer).

In the embodiments, for ease of description, when numbering is involved, numbers may be consecutive and start from 0. For example, the R transport layers may include a $0^{th}$ transport layer to an $(R-1)^{th}$ transport layer, and the P polarization directions may include a $0^{th}$ polarization direction to a $(P-1)^{th}$ polarization direction. Certainly, specific implementation is not limited thereto. For example, numbers may be consecutive and start from 1. It should be understood that the foregoing descriptions are all provided for ease of describing the technical solutions provided in the embodiments of this application, but are not intended to limit the scope of this application.

Second, in the embodiments of this application, transformation of a matrix and a vector is involved in many places, and therefore, for ease of understanding, a unified description is provided herein. A superscript T indicates transposition. For example, $A^T$ represents a transpose of a matrix (or a vector) A. A superscript * represents a conjugate transpose. For example, A* represents a conjugate transpose of a matrix (or a vector) A. For brevity, descriptions of a same or similar case are omitted below.

Third, in the following embodiments, an example in which both a beam vector and a frequency domain vector are column vectors is used to describe the embodiments provided in this application. However, this should not constitute any limitation on this application. Based on a same concept, a person skilled in the art may further figure out more possible representations.

Fourth, a Kronecker (Kronecker) product operation of matrices is involved in the embodiments of this application. In the embodiments of this application, the Kronecker product operation may be represented by ⊗. For example, a Kronecker product of matrices A and B may be expressed as A⊗B.

A Kronecker product is a block matrix obtained by multiplying all elements in a matrix by another matrix. For example, a kp×ql-dimensional matrix is obtained through a Kronecker product of a k×l-dimensional matrix A and a p×q-dimensional matrix B. Details are as follows:

$$A \otimes B = \begin{bmatrix} a_{11}B & \cdots & a_{1l}B \\ \vdots & \ddots & \vdots \\ a_{k1}B & \cdots & a_{kl}B \end{bmatrix}.$$

For a specific definition of the Kronecker product, refer to the current technology. For brevity, details are not further described in this specification.

Fifth, in the embodiments of this application, projection between vectors is involved in many places. For example, projecting a vector a to a vector b may be understood as calculating an inner product of the vector a and the vector b.

Sixth, in the embodiments of this application, "used to indicate" may include "used to directly indicate" and "used to indirectly indicate". For example, when that a piece of indication information is used to indicate information I is described, the indication information may be used to directly indicate I or indirectly indicate I. This does not mean that the indication information definitely carries I.

The information indicated by the indication information is referred to as to-be-indicated information. In a specific implementation process, there are many manners of indicating the to-be-indicated information. For example, the to-be-indicated information, such as the to-be-indicated information itself or an index of the to-be-indicated information, may be directly indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or agreed on in advance. For example, specific information may also be indicated by using a pre-agreed (for example, stipulated in a protocol) arrangement sequence of various pieces of information, to reduce indication overheads to some extent. In addition, a common part of all pieces of information may be further identified and indicated in a unified manner, to reduce indication overheads caused by separately indicating same information. For example, a person skilled in the art may understand that a precoding matrix is formed by precoding vectors, and each precoding vector in the precoding matrix may have a same part in terms of composition or another attribute.

In addition, a specific indication manner may alternatively be various existing indication manners, for example, but not limited to, the foregoing indication manners and various combinations thereof. For details of various indication manners, refer to the current technology. Details are not further described in this specification. It can be learned from the foregoing descriptions that, for example, when a plurality of pieces of information of a same type need to be indicated, manners of indicating different information may be different. In a specific implementation process, a required indication manner may be selected according to a specific requirement. The selected indication manner is not limited in the embodiments of this application. In this way, the indication manner involved in the embodiments of this application should be understood as covering various methods that can enable a to-be-indicated party to learn of the to-be-indicated information.

In addition, the to-be-indicated information may exist in another equivalent form. For example, a row vector may be represented as a column vector, a matrix may be represented by using a transposed matrix of the matrix or a matrix may also be represented in a form of a vector or an array, where the vector or array may be formed by connecting row vectors or column vectors of the matrix, and a Kronecker product of two vectors may also be represented in a form such as a product of a vector and a transposed vector of another vector. The technical solutions provided in the embodiments of this application should be understood as covering various forms. For example, some or all features involved in the embodiments of this application should be understood as covering various representations of the features.

The to-be-indicated information may be sent as a whole, or may be divided into a plurality of pieces of sub-information for separate sending. In addition, sending periodicities and/or sending occasions of the sub-information may be the same or may be different. A specific sending method is not limited in this application. The sending periodicities and/or the sending occasions of the sub-information may be predefined, for example, predefined according to a protocol, or may be configured by a transmit end device by sending configuration information to a receive end device. The configuration information may include, for example, but not limited to, one of or a combination of at least two of radio resource control signaling, for example, RRC signaling, MAC layer signaling, for example, MAC-CE signaling, and physical layer signaling, for example, downlink control information (downlink control information, DCI).

Seventh, definitions of many features (for example, a Kronecker product, a PMI, a frequency domain unit, a beam, a beam vector, and a weighting coefficient of a beam vector) in this application are merely used to explain functions of the features by using examples. For detailed content of the features, refer to the current technology.

Eighth, the terms "first", "second", "third", and "fourth", and various sequence numbers in the following embodiments are merely used for differentiation for ease of description, and are not used to limit the scope of the embodiments of this application. For example, the sequence numbers are used to distinguish between different indication information or different transport layers.

Ninth, in the following embodiments, "obtained in advance" may include being indicated by signaling of the network device or being predefined, for example, defined in a protocol. The foregoing "predefinition" may be implemented by prestoring corresponding code or a corresponding table in a device (for example, including the terminal device and the network device) or in another manner that can be used to indicate related information. A specific implementation of the foregoing "predefinition" is not limited in this application.

Tenth, storage involved in the embodiments of this application may be storage in one or more memories. The one or more memories may be separately disposed, or may be integrated into an encoder or a decoder, a processor, or a communications apparatus. Alternatively, a part of the one or more memories may be separately disposed, and a part of the one or more memories are integrated into a decoder, a processor, or a communications apparatus. The memory may be a storage medium in any form. This is not limited in this application.

Eleventh, the "protocol" involved in the embodiments of this application may be a standard protocol in the communications field, for example, may include an LTE protocol, an NR protocol, and a related protocol applied to a future communications system. This is not limited in this application.

Twelfth, "at least one" indicates one or more, and "a plurality of" indicates two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression means any combination of the items, including any combination of singular items (pieces) or plural items (pieces). For example, at least one of a, b, and c may represent: a, b, c, a and b, a and c, b and c, or a, b, and c. a, b, and c each may be singular or plural.

The following describes in detail, with reference to the accompanying drawings, the method for indicating and determining a precoding vector provided in the embodiments of this application.

It should be understood that the method provided in the embodiments of this application may be applied to a system in which communication is performed by using a multi-antenna technology, for example, the communications system 100 shown in FIG. 1. The communications system may include at least one network device and at least one terminal device. The network device and the terminal device may communicate with each other by using a multi-antenna technology.

It should be further understood that a specific structure of an execution body of the method provided in the embodiments of this application is not particularly limited in the following embodiments, provided that a program that records code of the method provided in the embodiments of this application can be run to perform communication according to the method provided in the embodiments of this application. For example, the execution body of the method provided in the embodiments of this application may be the terminal device or the network device, or a functional module that is in the terminal device or the network device and that can invoke and execute the program.

Without loss of generality, interaction between the network device and the terminal device is used as an example below to describe in detail the method for indicating and determining a precoding vector provided in the embodiments of this application.

Figure 2:
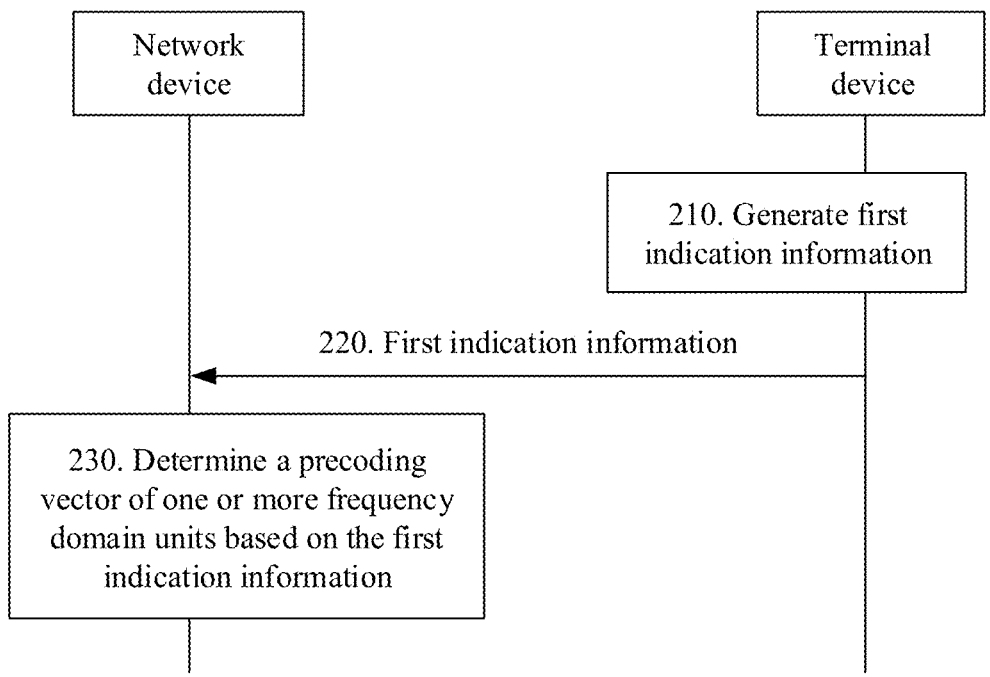
FIG. 2 is a schematic flowchart of a method for indicating and determining a precoding vector according to an embodiment of this application.

FIG. 2 is a schematic flowchart of a method 200, from a perspective of device interaction, for indicating and determining a precoding vector according to an embodiment of this application. As shown in the figure, the method 200 may include step 210 to step 230. The following describes each step in the method 200 in detail.

For ease of understanding, a specific process in which a terminal device indicates a precoding vector based on one of one or more transport layers and one of one or more polarization directions at the transport layer, and a network device determines the precoding vector is first described in detail. It should be understood that a quantity of transport layers and a quantity of polarization directions of a transmit antenna are not limited in this application. In the following example, one transport layer may be any one of one or more transport layers, and one polarization direction may be any one of one or more polarization directions.

In step 210, the terminal device generates first indication information, where the first indication information is used to indicate $L_1$ ($L_1 \geq 1$ and $L_1$ is an integer) beam vectors in a beam vector set, $K_1$ ($K_1 \geq 1$ and $K_1$ is an integer) frequency domain vectors in a frequency domain vector set, and $T_1$ ($T_1 \geq 1$ and $T_1$ is an integer) space-frequency component matrices in $L_1 \times K_1$ space-frequency component matrices corresponding to the $L_1$ beam vectors and the $K_1$ frequency domain vectors. The $T_1$ space-frequency component matrices may be determined in $M_1$ ($M_1 = L_1 \times K_1$) space-frequency component matrices corresponding to the $L_1$ beam vectors and the $K_1$ frequency domain vectors. In other words, the $T_1$ space-frequency component matrices may be a subset of the $M_1$ space-frequency component matrices. The $M_1$ space-frequency component matrices herein may be obtained by separately traversing the $L_1$ beam vectors and the $K_1$ frequency domain vectors.

It is assumed that the selected $L_1$ beam vectors in the beam vector set are denoted as $v_s^0, v_s^1, \ldots,$ and $v_s^{L_1-1}$, and the selected $K_1$ frequency domain vectors in the frequency domain vector set are denoted as $v_f^0, v_f^1, \ldots,$ and $v_f^{K_1-1}$.

The terminal device may first traverse all beam vectors in a range from 0 to $L_1-1$, and then traverse all frequency domain vectors in a range from 0 to $K_1-1$, to obtain the $M_1$ space-frequency component matrices.

Using a product of a beam vector and a conjugate transpose of a frequency domain vector as an example, the $M_1$ space-frequency component matrices may include $v_s^0(v_f^0)^*$, $v_s^1(v_f^0)^*, \ldots, v_s^{L_1-1}(v_f^0)^*, v_s^0(v_f^1)^*, v_s^1(v_f^1)^*, \ldots, v_s^{L_1-1}(v_f^1)^*, \ldots, v_s^0(v_f^{K_1-1})^*, v_s^1(v_f^{K_1-1})^*, \ldots,$ and $v_s^{L_1-1}(v_f^{K_1-1})^*$.

Alternatively, the terminal device may first traverse all frequency domain vectors in a range from 0 to $K_1-1$, and then traverse all beam vectors in a range from 0 to $L_1-1$, to obtain the $M_1$ space-frequency component matrices.

Still using the product of the beam vector and the conjugate transpose of the frequency domain vector as an example, the $M_1$ space-frequency component matrices may include $v_s^0(v_f^0)$, $v_s^0(v_f^1)^*, \ldots, v_s^0(v_f^{K_1-1})^*, v_s^1(v_f^1)^*, \ldots, v_s^1(v_f^{K_1-1})^*, \ldots, v_s^{L_1-1}(v_f^0)^*, v_s^{L_1-1}(v_f^1)^*, \ldots,$ and $v_s^{L_1-1}(v_f^{K_1-1})^*$.

It should be understood that the foregoing enumerated forms of the space-frequency component matrices are merely examples, and should not constitute any limitation on this application. Based on the foregoing rule, the $M_1$ space-frequency component matrices may alternatively be obtained by using a Kronecker product of a frequency domain vector and a beam vector.

It can be learned that each of the $M_1$ space-frequency component matrices may be uniquely determined by using one beam vector and one frequency domain vector, and $M_1 = L_1 \times K_1$.

When the first indication information is used to indicate the $T_1$ space-frequency component matrices, the first indication information may be used to indicate relative locations (for example, relative indexes or relative numbers) of the $T_1$ space-frequency component matrices in the $M_1$ space-frequency component matrices. For example, the terminal device may indicate the $T_1$ space-frequency component matrices by using a bitmap, an index of a combination of the $T_1$ space-frequency component matrices in the $M_1$ space-frequency component matrices, an index of each of the $T_1$ space-frequency component matrices in the $M_1$ space-frequency component matrices, or the like.

If the terminal device indicates the $T_1$ space-frequency component matrices by using a bitmap, $M_1$ bits may be used to indicate relative locations of the $T_1$ space-frequency component matrices in the $M_1$ space-frequency component matrices. In addition, the terminal device may further indicate the $L_1$ beam vectors by using $\lceil \log_2 C_{L_0}^{L_1} \rceil$ bits, and indicate the $K_1$ frequency domain vectors by using $\lceil \log_2 C_{K_0}^{K_1} \rceil$ bits. Therefore, the terminal device may indicate the $T_1$ space-frequency component matrices by using $\lceil \log_2 C_{L_0}^{L_1} \rceil + \lceil \log_2 C_{K_0}^{K_1} \rceil + M_1$ bits.

However, if the $T_1$ space-frequency component matrices are directly indicated in the beam vector set and the frequency domain vector set, caused overheads are different. For example, the beam vector set includes $L_0$ beam vectors, and the frequency domain vector set includes $K_0$ frequency domain vectors, where $L_0 \geq L_1$, $K_0 \geq K_1$, and $L_0 \times K_0 > L_1 \times K_1$. The $L_0$ beam vectors and the $K_0$ frequency domain vectors may correspond to $L_0 \times K_0$ space-frequency component matrices.

If the terminal device directly indicates relative locations of the $T_1$ space-frequency component matrices in the $L_0 \times K_0$ space-frequency component matrices, $\lceil \log_2 L_0 \rceil + \lceil \log_2 K_0 \rceil$ bits may be required if each space-frequency component matrix is separately indicated. If a bitmap is used for indication, $L_0 \times K_0$ bits may be used.

In some cases, for example, when a value of $L_1$ and/or a value of $K_1$ are/is relatively small, feedback overheads can be greatly reduced.

For example, it is assumed that the beam vector set includes 16 beam vectors, the frequency domain vector set includes 10 frequency domain vectors, and 15 space-frequency component matrices are selected from 160 space-frequency component matrices constructed by using the beam vector set and the frequency domain vector set.

In the current technology, if each space-frequency component matrix is separately indicated, $\lceil \log_2 16 \rceil + \lceil \log_2 10 \rceil$ bits, that is, 8 bits, are required for each space-frequency vector matrix, and 120 bits are required for feedback of the 15 space-frequency vector matrices. If the 15 space-frequency component matrices are indicated by using a bitmap, 160 bits are required for feedback.

If an index of a combination of the 15 space-frequency component matrices is to be fed back, because vectors in the beam vector set and the frequency domain vector set may be combined in pairs, the terminal device and the network device may need to prestore a large quantity of one-to-one correspondences between combinations and indexes.

However, in this embodiment, a part of relatively strong beam vectors and a part of relatively strong frequency domain vectors may be first indicated in the 16 beam vectors and the 10 frequency domain vectors, and then 15 space-frequency component matrices may be selected from the part of relatively strong beam vectors and the part of relatively strong frequency domain vectors.

For example, assuming that eight beam vectors and five frequency domain vectors are selected, the eight beam vectors and the five frequency domain vectors may be fed back by using $\lceil \log_2 C_{16}^8 \rceil$ bits and $\lceil \log_2 C_{10}^5 \rceil$ bits respectively, that is, 14 bits and 8 bits respectively. In 40 space-frequency component matrices obtained by combining the eight beam vectors and the five frequency domain vectors, the terminal device may further indicate the selected 15 space-frequency component matrices. If the terminal device indicates the 15 space-frequency component matrices by using a bitmap, 40 bits may be used for indication. In this case, the 15 space-frequency component matrices may be fed back by using 62 bits. Compared with the foregoing manner, this manner can greatly reduce overheads.

It should be understood that a quantity of beam vectors, a quantity of frequency domain vectors, and a quantity of space-frequency component matrices that are enumerated above, and caused bit overheads are merely examples, and should not constitute any limitation on this application.

It should be further understood that the foregoing enumerated methods for indicating the $T_1$ space-frequency vector pairs are merely examples, and should not constitute any limitation on this application. A specific method for indicating the $T_1$ space-frequency vector pairs by the terminal device is not limited in this application.

In this embodiment, a weighted sum of the $T_1$ space-frequency component matrices may be used to determine a precoding vector of one or more frequency domain units. Specifically, the weighted sum of the $T_1$ space-frequency component matrices may be used to construct a space-frequency matrix. The space-frequency matrix may include one or more column vectors corresponding to the one or more frequency domain units, and each column vector may be used to determine a precoding vector of a corresponding frequency domain unit. The foregoing has described in detail the relationship between the space-frequency matrix and the precoding vector. For brevity, details are not described herein again.

The space-frequency matrix may be approximately the weighted sum of the $T_1$ space-frequency component matrices. For example, the space-frequency matrix may be denoted as H, where $$H \approx \sum_{t_1=0}^{T_1-1} a_{t_1} U_{t_1} \cdot U_{t_1}$$

represents a $t_1^{th}$ space-frequency component matrix in the $T_1$ space-frequency component matrices, and $a_{t_1}$ represents a weighting coefficient of the $t_1^{th}$ space-frequency component matrix $U_{t_1}$.

The terminal device may predetermine the $T_1$ space-frequency component matrices, or may predetermine space-frequency vector pairs used to generate the $T_1$ space-frequency component matrices, and then may further determine weights of the $T_1$ space-frequency component matrices or the $T_1$ space-frequency vector pairs. The terminal device may indicate the $T_1$ space-frequency component matrices and the weights of the space-frequency component matrices to the network device, or indicate the $T_1$ space-frequency vector pairs and the weights of the space-frequency vector pairs to the network device, so that the network device restores the precoding vector of the one or more frequency domain units.

Therefore, the $T_1$ space-frequency component matrices indicated by the first indication information may be used to determine the precoding vector with reference to the weights of the space-frequency component matrices. The weights of the space-frequency component matrices each may be indicated by using the first indication information, or may be indicated by using other information. This is not limited in this application. For a specific method for indicating a weight of each space-frequency component matrix, refer to the current technology.

In this embodiment, each of the $T_1$ space-frequency component matrices may be uniquely determined by one beam vector and one frequency domain vector in the $T_1$ space-frequency vector pairs. Therefore, the terminal device may directly indicate the $T_1$ space-frequency component matrices, may indirectly indicate the $T_1$ space-frequency component matrices by indicating the $T_1$ space-frequency vector pairs, or may directly indicate the $T_1$ space-frequency vector pairs. The $T_1$ space-frequency vector pairs may be considered as an equivalent form of the $T_1$ space-frequency component matrices.

In an implementation, the $T_1$ space-frequency component matrices are selected from the $M_1$ space-frequency component matrices corresponding to the $L_1$ beam vectors and the $K_1$ frequency domain vectors. The $M_1$ space-frequency component matrices are determined by using the $L_1$ beam vectors and the $K_1$ frequency domain vectors, each space-frequency component matrix may be uniquely determined by using one beam vector and one frequency domain vector, and $M_1 = L_1 \times K_1$.

Therefore, the $T_1$ space-frequency component matrices may be determined based on the $L_1$ beam vectors in the beam vector set and the $K_1$ frequency domain vectors in the frequency domain vector set. The terminal device may indicate the $T_1$ space-frequency component matrices based on the $L_1$ beam vectors and the $K_1$ frequency domain vectors.

In another implementation, the $T_1$ space-frequency vector pairs may be selected from $M_1$ space-frequency vector pairs obtained by combining the $L_1$ beam vectors and the $K_1$ frequency domain vectors. Each of the $M_1$ space-frequency vector pairs may be uniquely determined by using one beam vector and one frequency domain vector, and $M_1 = L_1 \times K_1$.

Therefore, the $T_1$ space-frequency vector pairs may be selected from the $M_1$ space-frequency vector pairs obtained by combining the $L_1$ beam vectors in the beam vector set and the $K_1$ frequency domain vectors in the frequency domain vector set. The $T_1$ space-frequency vector pairs may be a part of space-frequency vector pairs in the $M_1$ space-frequency vector pairs. The terminal device may indicate the $T_1$ space-frequency vector pairs based on the $L_1$ beam vectors and the $K_1$ frequency domain vectors, or based on the $M_1$ space-frequency vector pairs.

The $L_1$ beam vectors may be a part of beam vectors in the beam vector set, and/or the $K_1$ frequency domain vectors may be a part of frequency domain vectors in the frequency domain vector set. To be specific, when the $L_1$ beam vectors are all beam vectors in the beam vector set, the $K_1$ frequency domain vectors are only a part of frequency domain vectors in the frequency domain vector set; when the $K_1$ frequency domain vectors are all frequency domain vectors in the frequency domain vector set, the $L_1$ beam vectors are only a part of beam vectors in the beam vector set; when the $L_1$ beam vectors are a part of beam vectors in the beam vector set, the $K_1$ frequency domain vectors may be a part or all of frequency domain vectors in the frequency domain vector set; when the $K_1$ frequency domain vectors are a part of frequency domain vectors in the frequency domain vector set, the $L_1$ beam vectors may be a part or all of beam vectors in the beam vector set.

It is assumed that the beam vector set includes $L_0$ beam vectors, and the frequency domain vector set includes $K_0$ frequency domain vectors. In this case, $L_0 \geq L_1$, $K_0 \geq K_1$, and $L_0$, $L_1$, $K_0$, and $K_1$ do not satisfy $L_0 = L_1$ and $K_0 = K_1$ at the same time.

When the $L_1$ beam vectors are a part of beam vectors in the beam vector set, the $L_1$ beam vectors may be $L_1$ relatively strong beam vectors selected from the beam vector set. When the $K_1$ frequency domain vectors are a part of frequency domain vectors in the frequency domain vector set, the $K_1$ frequency domain vectors may be $K_1$ relatively strong frequency domain vectors selected from the frequency domain vector set. The $L_1$ relatively strong beam vectors may be understood as $L_1$ beam vectors with relatively large weighting coefficients, and the $K_1$ relatively strong frequency domain vectors may be understood as $K_1$ beam vectors with relatively large weighting coefficients. This is because a beam vector and a frequency domain vector with relatively large weighting coefficients occupy a relatively large weight in a linear combination, and also have a relatively large impact on approximate precision of the precoding vector. The following describes in detail the $L_1$ relatively strong beam vectors and the $K_1$ relatively strong frequency domain vectors with reference to specific implementations. Detailed descriptions of the $L_1$ beam vectors and the $K_1$ frequency domain vectors are temporarily omitted herein.

In conclusion, the terminal device may pre-determine the $L_1$ beam vectors in the beam vector set and the $K_1$ frequency domain vectors in the frequency domain vector set, narrow a selection range of the $T_1$ space-frequency component matrices used for weighted summation to a range of the $M_1$ space-frequency component matrices constructed by using the $L_1$ beam vectors and the $K_1$ frequency domain vectors, select the $T_1$ space-frequency component matrices from the $M_1$ space-frequency component matrices, and indicate the $T_1$ space-frequency component, thereby helping reduce feedback overheads of the $T_1$ space-frequency component matrices.

It should be noted that a concept of the $M_1$ space-frequency component matrices is introduced herein only for ease of understanding. This does not mean that the terminal device definitely generates the $M_1$ space-frequency component matrices. Alternatively, the terminal device may obtain the $M_1$ space-frequency vector pairs by combining the $L_1$ beam vectors and the $K_1$ frequency domain vectors. However, it may be understood that the $M_1$ space-frequency component matrices may be constructed by using the $L_1$ beam vectors and the $K_1$ frequency domain vectors, or by using the $M_1$ space-frequency vector pairs. In other words, the $M_1$ space-frequency vector pairs and the $M_1$ space-frequency component matrices may be mutually converted. Therefore, it may be considered that the $M_1$ space-frequency component matrices correspond to the $L_1$ beam vectors and the $K_1$ frequency domain vectors. $M_1$ is introduced only to reflect a correspondence between the $M_1$ space-frequency component matrices (space-frequency component vectors or space-frequency vector pairs) and the $L_1$ beam vectors and between the $M_1$ space-frequency component matrices and the $K_1$ frequency domain vectors, and should not constitute any limitation on this application.

Values of $L_1$, $K_1$, and $T_1$ may be indicated by the network device, or may be predefined, for example, may be defined in a protocol, or may be determined by the terminal device and then reported to the network device, or may be configured by combining the foregoing enumerated methods.

If the values of $L_1$ and $K_1$ are indicated by the network device, optionally, the method further includes: The terminal device receives second indication information, where the second indication information is used to indicate values of at least two of $L_1$, $K_1$, and $M_1$. Correspondingly, the network device sends the second indication information.

Optionally, the second indication information is carried in higher layer signaling, for example, an RRC message.

If the values of $L_1$ and $K_1$ are determined and reported by the terminal device, optionally, the method further includes: The terminal device sends second indication information, where the second indication information is used to indicate a value or values of one or more of $L_1$, $K_1$, and $M_1$. Correspondingly, the network device receives the second indication information.

Optionally, the second indication information is carried in uplink control information (uplink control information, UCI), for example, CSI.

Because $L_1$, $K_1$, and $M_1$ satisfy $M_1=L_1 \times K_1$, when values of any two of $L_1$, $K_1$, and $M_1$ are determined, the value of the other one can also be determined.

It should be understood that information used to indicate the values of $L_1$, $K_1$, and $M_1$ may be same information, or may be different information. This is not limited in this application.

Optionally, the value of either $L_1$ or $K_1$ may be predefined, for example, defined in a protocol, and the value of the other one of $L_1$ or $K_1$ is indicated by the network device by using signaling.

For example, the value of $L_1$ may be indicated by the network device by using signaling, and the value of $K_1$ may be defined in a protocol. The value of $K_1$ is not limited in this application.

For another example, the value of $L_1$ may be indicated by the network device by using signaling, and a calculation formula of $K_1$ or that the value of $K_1$ is a value of a parameter may be defined in a protocol. For example, the value of $K_1$ being a length $N_f$ of a frequency domain vector, or the calculation formula of $K_1$, for example, $K_1=\lceil N_f/2 \rceil$, $K_1=\lfloor N_f/2 \rfloor$, or $K_1=[N_f/2]$, may be defined in the protocol. In this case, it may be understood that the value of $K_1$ is implicitly indicated by using the fifth indication information. $\lceil \, \rceil$ indicates rounding up, $\lfloor \, \rfloor$ indicates rounding down, and $[ \, ]$ indicates rounding off.

For still another example, the value of $K_1$ may be indicated by the network device by using signaling, and the value of $L_1$ may be defined in a protocol. The value of $L_1$ is not limited in this application.

For yet another example, the value of $K_1$ may be indicated by the network device by using signaling, and the value of $L_1$ being a value of a parameter or a calculation formula of $L_1$ may be defined in a protocol. For example, the value of $L_1$ being a quantity $N_s$ of antenna ports in one polarization direction, or the calculation formula of $L_1$, for example, $L_1=\lceil N_s/2 \rceil$, $L_1=\lfloor N_s/2 \rfloor$, or $L_1=[N_s/2]$, may be defined in the protocol. In this case, the value of $L_1$ may be understood as being implicitly indicated by using indication information used to indicate a quantity of antenna ports in a single polarization direction.

It should be understood that the foregoing enumerated values and calculation formulas of $L_1$ or $K_1$ that are defined in the protocol are merely examples, and should not constitute any limitation on this application.

Optionally, the value of either $L_1$ or $K_1$ may be predefined, for example, defined in a protocol, and the value of the other one of $L_1$ and $K_1$ is determined by the terminal device and reported by the terminal device by using signaling.

The foregoing has described in detail the process of determining $L_1$ and $K_1$ with reference to the manner of definition in the protocol and the manner of indication by the network device. A process of determining $L_1$ and $K_1$ with reference to a manner of definition in a protocol and a manner of indication by the terminal device is similar. For brevity, details are not described herein again.

Because one of $L_1$ and $K_1$ may be defined in a protocol or may be defined as a value of a parameter in a protocol, or a calculation formula of $L_1$ and $K_1$ may be defined in a protocol, the second indication information may be used to indicate a value of the other one of $L_1$ and $K_1$. For example, the value of $K_1$ is defined in the protocol, and the second indication information is used to indicate only the value of $L_1$. Alternatively, the value of $L_1$ is defined in the protocol, and the second indication information is used to indicate only the value of $K_1$.

Because $L_1$, $K_1$, and $M_1$ satisfy $M_1=L_1 \times K_1$, when values of any two of $L_1$, $K_1$, and $M_1$ are determined, the value of the other one can also be determined. For example, when $K_1$ is defined in a protocol, the second indication information may also be used to indirectly indicate the value of $L_1$ by indicating a value of $M_1$. When $L_1$ is defined in a protocol, the second indication information may also be used to indirectly indicate the value of $K_1$ by indicating a value of $M_1$.

It should be understood that the foregoing enumerated signaling used to carry the second indication information is merely an example, and should not constitute any limitation on this application. Specific signaling that carries the second indication information is not limited in this application.

If the value of $T_1$ is indicated by the network device, optionally, the method further includes: The terminal device receives third indication information, where the third indication information is used to indicate the value of $T_1$. Correspondingly, the network device sends the third indication information.

Optionally, the third indication information is carried in higher layer signaling, for example, an RRC message.

If the value of $T_1$ is determined and reported by the terminal device, optionally, the method further includes: The terminal device sends third indication information, where the third indication information is used to indicate the value of $T_1$. Correspondingly, the network device receives the third indication information.

Optionally, the third indication information is carried in UCI, for example, CSI.

It should be understood that the foregoing enumerated signaling used for the third indication information is merely an example, and should not constitute any limitation on this application. Specific signaling that carries the third indication information is not limited in this application.

It should be further understood that the second indication information and the third indication information may be same information, or may be different information. This is not limited in this application.

After determining the values of $L_1$, $K_1$, and $T_1$, the terminal device may determine the $L_1$ beam vectors, the $K_1$ frequency domain vectors, and the $T_1$ space-frequency component matrices, to generate the first indication information.

Optionally, the first indication information is used to indicate $L_1$ beam vectors and $T_1$ space-frequency component matrices, and a weighted sum of the $T_1$ space-frequency component matrices is used to determine a precoding vector of one or more frequency domain units. The $L_1$ beam vectors and $K_1$ frequency domain vectors correspond to $M_1$ space-frequency component matrices, the $T_1$ space-frequency component matrices are a part of the $M_1$ space-frequency component matrices, each of the $M_1$ space-frequency component matrices is uniquely determined by one of the $L_1$ beam vectors and one of the $K_1$ frequency domain vectors, and $M_1 = L_1 \times K_1$; the $L_1$ beam vectors are a part of beam vectors in a beam vector set, and/or the $K_1$ frequency domain vectors are a part of frequency domain vectors in the frequency domain vector set; and $M_1$, $L_1$, $K_1$, and $T_1$ are all positive integers.

Optionally, the $K_1$ frequency domain vectors are preconfigured. For example, the $K_1$ frequency domain vectors may be all or a part of frequency domain vectors in the frequency domain vector set.

For example, $K_1 = K_0$ may be predefined in the protocol. That is, in the protocol, a universal set of the frequency domain vector set is used as the $K_1$ frequency domain vectors by default. For another example, the value of $K_1$ may be predefined in the protocol, and frequency domain vectors in the frequency domain vector set that are used as the $K_1$ frequency domain vectors may be specified in advance. For still another example, the value of $K_1$ may be predefined in the protocol, and the $K_1$ frequency domain vectors may be indicated by the network device in advance by using signaling.

In other words, it may be predefined in the protocol that the terminal device does not need to report the $K_1$ frequency domain vectors. The $K_1$ frequency domain vectors may be specified in advance, for example, defined in a protocol or configured by the network device. This is not limited in this application.

Optionally, it may also be predefined in the protocol that the terminal device determines, based on different values of parameters, a vector that needs to be reported.

As described above, $L_0 \geq L_1$, $K_0 \geq K_1$, and $L_0$, $L_1$, $K_0$, and $K_1$ do not satisfy $L_0 = L_1$ and $K_0 = K_1$ at the same time. The $L_1$ beam vectors may be a universal set of the beam vector set, or the $K_1$ frequency domain vectors may be a universal set of the frequency domain vector set. Optionally, the terminal device may determine, based on the values of $L_1$ and $K_1$, whether to select the universal set of the beam vector set or the universal set of the frequency domain vector set. When the $L_1$ beam vectors are the universal set of the beam vector set, the terminal device may not report the $L_1$ beam vectors. When the $K_1$ frequency domain vectors are the universal set of the frequency domain vector set, the terminal device may not report the $K_1$ frequency domain vectors.

In an implementation, the network device may configure the value of $K_1$ by using signaling, for example, the second indication information. When $K_1$ is configured to be equal to $K_0$, the terminal device may use the universal set of the frequency domain vector set as the $K_1$ frequency domain vectors by default. Alternatively, the network device may not indicate the value of $K_1$ by using additional signaling. For example, only the value of $L_1$ is indicated in the second indication information. In other words, optionally, the second indication information is used to indicate the value of $L_1$. This may be understood as that the network device implicitly indicates, by using the second indication information, that the value of $K_1$ is $K_0$.

The terminal device may determine, based on the received signaling, whether to report the $K_1$ frequency domain vectors. For example, when it is determined that $K_1 = K_0$, the $K_1$ frequency domain vectors may not be reported. Alternatively, when determining that $K_1 = K_0$, the network device may directly use frequency domain vectors in the frequency domain vector set as the $K_1$ frequency domain vectors.

In another implementation, the value of $K_1$ may be defined in a protocol as a fixed value. When the value of $K_1$ is defined as $K_0$, the terminal device may use the universal set of the frequency domain vector set as the $K_1$ frequency domain vectors by default, and does not need to report the $K_1$ frequency domain vectors.

Similarly, in an implementation, the network device may configure the value of $L_1$ by using signaling, for example, the second indication information. When $L_1$ is configured to be equal to $L_0$, the terminal device may use the universal set of the beam vector set as the $L_1$ beam vectors by default. Alternatively, the network device may not indicate the value of $L_1$ by using additional signaling. For example, only the value of $K_1$ is indicated in the second indication information. In other words, optionally, the second indication information is used to indicate the value of $K_1$. In this case, this may be understood as that the network device implicitly indicates, by using the second indication information, that the value of $L_1$ is $L_0$.

The terminal device may determine, based on the received signaling, whether to report the $L_1$ beam vectors. For example, when it is determined that $L_1 = L_0$, the $L_1$ beam vectors may not be reported. Alternatively, when determining that $L_1 = L_0$, the network device may directly use beam vectors in the beam vector set as the $L_1$ beam vectors.

In another implementation, the value of $L_1$ may be defined in a protocol as a fixed value. When the value of $L_1$ is defined as $L_0$, the terminal device may use the universal set of the beam vector set as the $L_1$ beam vectors by default, and does not need to report the $L_1$ beam vectors.

Further, when the values of $L_1$, $K_1$, and $T_1$ are all configured by the network device, the terminal device may determine, based on a parameter configured by the network device, a vector that needs to be reported. Optionally, it may alternatively be predefined in the protocol that the terminal device determines, based on different parameters configured by the network device, a vector that needs to be reported.

For example, if the network device indicates the values of $L_1$, $K_1$, and $T_1$ by using signaling, the terminal device may report the $L_1$ beam vectors, the $K_1$ frequency domain vectors, and the $T_1$ space-frequency vector pairs by default. If the network device indicates the values of $L_1$ and $T_1$ by using signaling, the terminal device may consider $K_1=K_0$ by default. To be specific, all $K_0$ frequency domain vectors in the frequency domain vector set may be used as the $K_1$ frequency domain vectors. The terminal device may report only the $L_1$ beam vectors and the $T_1$ space-frequency vector pairs. If the network device indicates the values of $K_1$ and $T_1$ by using signaling, the terminal device may consider $L_1=L_0$ by default. To be specific, all $L_0$ beam vectors in the beam vector set may be used as the $L_1$ beam vectors. The terminal device may report only the $K_1$ frequency domain vectors and the $T_1$ space-frequency vector pairs. If the network device indicates the values of $L_1$ and $K_1$ by using signaling, the terminal device may directly perform weighted summation on the $L_1$ beam vectors and the $K_1$ frequency domain vectors by default, may report only the $L_1$ beam vectors and the $K_1$ frequency domain vectors, and does not need to report the $T_1$ space-frequency vector pairs.

It should be understood that the foregoing lists vectors that need to be determined and reported by the terminal device when the network device configures different parameters. However, this should not constitute any limitation on this application.

The following uses an example in which $L_1 \neq L_0$ and $K_1 \neq K_0$ to describe in detail a specific method for determining and indicating, by the terminal device, the $T_1$ space-frequency component matrices and the weights of the space-frequency component matrices.

The terminal device may determine the $T_1$ space-frequency component matrices in a corresponding implementation based on a prestored vector set. For example, the terminal device may prestore a beam vector set and a frequency domain vector set, and determine the $T_1$ space-frequency vector pairs based on Implementation 1. Alternatively, the terminal device may prestore a space-frequency component matrix set, and determine the $T_1$ space-frequency component matrices based on Implementation 2.

It should be noted that the beam vector set and the frequency domain vector set may be converted into the space-frequency component matrix set, or vice versa. Any beam vector in the beam vector set and any frequency domain vector in the frequency domain vector set may be used to obtain one space-frequency component matrix in the space-frequency component matrix set. Any space-frequency component matrix in the space-frequency component matrix set may be uniquely determined by one beam vector in the beam vector set and one frequency domain vector in the frequency domain vector set.

Therefore, an index corresponding to each space-frequency vector matrix in the space-frequency vector matrix set may also be converted into an index of a beam vector in the beam vector set and an index of a frequency domain vector in the frequency domain vector set. In other words, any space-frequency component matrix in the space-frequency vector matrix set may be indicated jointly by using one beam vector in the beam vector set and one frequency domain vector in the frequency domain vector set.

In this embodiment, the terminal device may indicate the $T_1$ space-frequency component matrices by using at least the $L_1$ beam vectors in the beam vector set and the $K_1$ frequency domain vectors in the frequency domain vector set in either of the following implementations:

Implementation 1: The $T_1$ space-frequency component matrices may be determined by $M_1$ space-frequency vector pairs, and the $M_1$ space-frequency vector pairs may be obtained by combining the $L_1$ beam vectors and the $K_1$ frequency domain vectors. The terminal device may indicate, in the $M_1$ space-frequency vector pairs, $T_1$ space-frequency vector pairs used to generate the $T_1$ space-frequency component matrices.

Implementation 2: The $T_1$ space-frequency component matrices may be selected from $M_1$ space-frequency component matrices, and the $M_1$ space-frequency component matrices may be determined by the $L_1$ beam vectors and the $K_1$ frequency domain vectors. The terminal device may indicate the $T_1$ space-frequency component matrices in the $M_1$ space-frequency component matrices. It should be noted that manners of prestoring a vector set or a matrix set by the terminal device and the network device are not limited in this application. For example, both the terminal device and the network device may prestore the beam vector set and the frequency domain vector set. Alternatively, both the terminal device and the network device may prestore the space-frequency component matrix set. Alternatively, the terminal device may prestore the beam vector set and the frequency domain vector set, and the network device may prestore the space-frequency component matrix set. Alternatively, the terminal device may prestore the space-frequency component matrix set, and the network device may prestore the beam vector set and the frequency domain vector set.

Because the beam vector set and the frequency domain vector set may be converted into the space-frequency component matrix set, or vice versa, when the space-frequency component matrix set and the beam vector set are determined, the frequency domain vector set may be deduced; or when the space-frequency component matrix set and the frequency domain vector set are determined, the beam vector set may be deduced. Therefore, specific forms of the vector set prestored by the terminal device and the network device are not limited in this application.

For ease of understanding of the embodiments of this application, in the following descriptions, a specific process in which the terminal device generates the first indication information is described with reference to the specific form of the vector set or the matrix set and based on the two implementations listed above.

Implementation 1

The terminal device may determine the $M_1$ space-frequency vector pairs based on a prestored beam vector set, a prestored frequency domain vector set, and a predetermined space-frequency matrix, to determine the $T_1$ space-frequency component matrices.

It is assumed that precoding vectors of $N_f$ frequency domain units determined by the terminal device are denoted as $h_0, h_1, \ldots,$ and $h_{N_f-1}$. The precoding vectors of the $N_f$ frequency domain units may be used to construct a space-frequency matrix H, where $H \sqcup\!\sqcup [h_0\ h_1\ \ldots\ h_{N_f-1}]$, or $$H \sqcup\!\sqcup [h_0^T\ h_1^T\ \cdots\ h_{N_f-1}^T]^T.$$

It should be noted that the two forms of the space-frequency matrix listed above may be mutually converted. The terminal device may determine, based on a prestored vector set, a form of a space-frequency matrix that needs to be constructed, to generate a space-frequency matrix in a corresponding form. For example, when the terminal device prestores a beam vector set and a frequency domain vector set, a space-frequency matrix $H=[h_0\ h_1\ \ldots\ h_{N_f-1}]$ may be generated. When the terminal device prestores a space-frequency component matrix set, a space-frequency matrix $$H = \begin{bmatrix} h_0^T & h_1^T & \cdots & h_{N_f-1}^T \end{bmatrix}^T$$

may be generated.

In this embodiment, the terminal device may construct, based on the precoding vectors of the $N_f$ frequency domain units, the space-frequency matrix H having a dimension of $N_s \times N_f$, where $H = [h_0 \ h_1 \ \ldots \ h_{N_f-1}]$.

In a possible design, a beam vector set may include $N_s$ beam vectors. That is, $L_0 = N_s$. A dimension of each beam vector may be $N_s$, and each beam vector may be obtained from a two-dimensional (2 dimension, 2D)-DFT matrix. 2D may represent two different directions, for example, a horizontal direction and a vertical direction.

For example, the $N_s$ beam vectors may be denoted as $b_{s,0}$, $b_{s,1}$, ..., and $b_{s,N_s-1}$. A matrix $B_s$ may be constructed by using the $L_0$ beam vectors, where $B_s \sqcup [b_{s,0} \ b_{s,1} \ \ldots \ b_{s,N_s-1}]$.

In another possible design, a beam vector set may be extended to $O_s \times N_s$ beam vectors by using an oversampling factor $O_s$. In this case, the beam vector set may include $O_s$ subsets, and each subset may include $N_s$ beam vectors. That is, $L_0 = O_s \times N_s$. A dimension of each beam vector in the beam vector set may be $N_s$, and each beam vector may be obtained from an oversampled 2D-DFT matrix. The oversampling factor $O_s$ is a positive integer. Specifically, $O_s = O_1 \times O_2$, $O_1$ may be an oversampling factor in a horizontal direction, and $O_2$ may be an oversampling factor in a vertical direction. $O_1 \geq 1$, $O_2 \geq 1$, and $O_1$ and $O_2$ cannot be 1 at the same time and are both integers.

For example, $N_s$ beam vectors in an $o_s^{th}$ ($0 \leq o_s \leq O_s - 1$, and $o_s$ is an integer) subset of the beam vector set may be denoted as $b_{s,0}^{o_s}, b_{s,1}^{o_s}, \ldots,$ and $b_{s,N_s-1}^{o_s}$. In this case, a matrix $B_s^{o_s}$ may be constructed based on the $N_s$ beam vectors in the $o_s^{th}$ subset, where $B_s^{o_s} \sqcup [b_{s,0}^{o_s} \ b_{s,1}^{o_s} \ \ldots \ b_{s,N_s-1}^{o_s}]$.

In a possible design, a frequency domain vector set may include $N_f$ frequency domain vectors. That is, $K_0 = N_f$. A dimension of each frequency domain vector may be $N_f$, and each frequency domain vector may be obtained from a DFT matrix.

For example, the $N_f$ frequency domain vectors may be denoted as $b_{f,0}, b_{f,1}, \ldots,$ and $b_{f,N_f-1}$. A matrix $B_f$ may be constructed based on the $N_f$ frequency domain vectors, where $B_f \sqcup [b_{f,0} \ b_{f,1} \ \ldots \ b_{f,N_f-1}]$.

In another possible design, a frequency domain vector set may be extended to $O_f \times N_f$ frequency domain vectors by using an oversampling factor $O_f$. In this case, the frequency domain vector set may include $O_f$ subsets, and each subset may include $N_f$ frequency domain vectors. That is, $K_0 = O_f \times N_f$. A dimension of each frequency domain vector in the frequency domain vector set may be $N_f$, and each frequency domain vector may be obtained from an oversampled DFT matrix. The oversampling factor $O_f$ is a positive integer.

For example, $N_f$ frequency domain vectors in an $o_f^{th}$ ($0 \leq o_f \leq O_f - 1$, and $o_s$ is an integer) subset in the frequency domain vector set may be denoted as $b_{f,0}^{o_f}, b_{f,1}^{o_f}, \ldots,$ and $b_{f,N_f-1}^{o_f}$. In this case, a matrix $B_f^{o_f}$ may be constructed based on the $N_f$ beam vectors in the $o_f^{th}$ subset, where $B_f^{o_f} \sqcup [b_{f,0}^{o_f} \ b_{f,1}^{o_f} \ \ldots \ b_{f,N_f-1}^{o_f}]$.

The following separately describes specific methods for determining and indicating, by the terminal device, the $T_1$ space-frequency component matrices and the weighting coefficients of the space-frequency component matrices when an oversampling rate is considered and when the oversampling rate is not considered.

If the oversampling rate is not considered, the terminal device may determine the $T_1$ space-frequency component matrices and the weighting coefficients of the space-frequency component matrices by using step 1-i to step 1-v shown below.

Step 1-i: The terminal device may determine a weighting coefficient matrix based on the space-frequency matrix H, a matrix constructed based on the beam vector set, and a matrix constructed based on the frequency domain vector set.

If the oversampling rate is not considered, the beam vector set may include $N_s$ beam vectors, and the constructed matrix is $B_s$; the frequency domain vector set may include $N_f$ frequency domain vectors, and a constructed matrix is $B_f$. The terminal device may determine a matrix W by using $W = B_s^* H B_f$. The matrix W may be referred to as a weighting coefficient matrix, and a dimension of the weighting coefficient matrix may be $N_s \times N_f$. $N_s$ rows in the matrix W may correspond to the $N_s$ beam vectors in the beam vector set (or the matrix $B_s$ constructed by using the beam vector set). $N_f$ columns in the matrix W may correspond to the $N_f$ frequency domain vectors in the frequency domain vector set (or the matrix $B_f$ constructed based on the frequency domain vector set). Each coefficient in the matrix may correspond to one space-frequency vector pair.

Step 1-ii: The terminal device may select $L_1$ relatively strong beam vectors from the beam vector set, and select $K_1$ relatively strong frequency domain vectors from the frequency domain vector set.

The terminal device may separately perform modulo operations on the $N_s$ rows in the matrix W, and determine $L_1$ rows with relatively large moduli according to a modulus of each row. Row numbers of the $L_1$ rows in the matrix W may be sequence numbers of the $L_1$ relatively strong beam vectors in the beam vector set or column numbers of the $L_1$ relatively strong beam vectors in $B_s$. Further, the terminal device may separately perform modulo operations on the $N_f$ columns in the matrix W, and determine $K_1$ columns with relatively large moduli according to a modulus of each column. The column numbers of the $K_1$ columns in the matrix W may be sequence numbers of the $K_1$ relatively strong frequency domain vectors in the frequency domain vector set or column numbers of the $K_1$ relatively strong frequency domain vectors in $B_f$.

It should be understood that the foregoing described specific method used by the terminal device to determine the $L_1$ relatively strong rows in the beam vector set and the $K_1$ relatively strong columns in the frequency domain vector set is merely an example for ease of understanding, and should not constitute any limitation on this application. For a specific method used by the terminal device to determine the $L_1$ relatively strong rows in the beam vector set and the $K_1$ relatively strong columns in the frequency domain vector set, refer to the current technology. For brevity, details are not described herein.

It should be further understood that the foregoing method for determining the $L_1$ beam vectors and the $K_1$ frequency domain vectors by using the weighting coefficient matrix is merely a possible implementation shown for ease of understanding, but this does not indicate that the terminal device definitely generates the weighting coefficient matrix when determining the $L_1$ beam vectors and the $K_1$ frequency domain vectors. For example, a precoding vector of each frequency domain unit is separately projected to each beam vector in the beam vector set and each frequency domain vector in the frequency domain vector set, to obtain an array set including a plurality of projection values. Elements in the array set may be obtained by sequentially connecting elements in rows (or columns) in the foregoing weighting coefficient matrix.

Step 1-iii: The terminal device may obtain $M_1$ space-frequency vector pairs by combining the $L_1$ relatively strong beam vectors determined in the beam vector set and the $K_1$ relatively strong frequency domain vectors determined in the frequency domain vector set.

Each of the $M_1$ space-frequency vector pairs may include one beam vector and one frequency domain vector. The beam vector in each space-frequency vector pair may be obtained from the foregoing $L_1$ beam vectors, and the frequency domain vector in each space-frequency vector pair may be obtained from the foregoing $K_1$ frequency domain vectors. One of the $L_1$ beam vectors and one of the $K_1$ frequency domain vectors may be combined to obtain a unique space-frequency vector pair. In other words, each of the $M_1$ space-frequency vector pairs is uniquely determined by one of the $L_1$ beam vectors and one of the $K_1$ frequency domain vectors. Any two space-frequency vector pairs have a difference in at least one of included beam vectors and frequency domain vectors. Therefore, $L_1 \times K_1$ space-frequency vector pairs may be determined by the $L_1$ beam vectors and the $K_1$ frequency domain vectors. That is, $M_1 = L_1 \times K_1$.

On the other hand, the $N_s$ beam vectors in the beam vector set and the $N_f$ frequency domain vectors in the frequency domain vector set may be combined to obtain $N_s \times N_f$ space-frequency vector pairs. Therefore, the $M_1$ space-frequency vector pairs may be considered as a subset of the $N_s \times N_f$ space-frequency vector pairs, and $M_1 < N_s \times N_f$. In other words, the terminal device may determine, in a subset of a space-frequency vector pair set that is obtained by combining the beam vector set and the frequency domain vector set, $T_1$ space-frequency vector pairs used for linear weighting, that is, $T_1$ space-frequency vector pairs that need to be reported by the terminal device. In other words, the selected $T_1$ space-frequency vector pairs are selected from the $M_1$ space-frequency vector pairs obtained by combining the $L_1$ beam vectors and the $K_1$ frequency domain vectors.

Step 1-iv: The terminal device may determine the $T_1$ space-frequency vector pairs in the $M_1$ space-frequency vector pairs. The $T_1$ space-frequency vector pairs may be used to determine the $T_1$ space-frequency component matrices.

The terminal device may select $T_1$ relatively strong space-frequency vector pairs from the $M_1$ space-frequency vector pairs, to generate the $T_1$ space-frequency component matrices. The $T_1$ relatively strong space-frequency vector pairs may be space-frequency vector pairs whose weighting coefficients have relatively large moduli in the $M_1$ space-frequency vector pairs. That is, a modulus of a weighting coefficient of any one of the selected $T_1$ space-frequency vector pairs is greater than or equal to a modulus of a weighting coefficient of any one of remaining $M_1$-$T_1$ space-frequency vector pairs.

Based on the $L_1$ relatively strong rows and the $K_1$ relatively strong columns in the matrix W determined in the foregoing descriptions, the terminal device may determine $L_1 \times K_1$ (that is, $M_1$) weighting coefficients. The $M_1$ weighting coefficients may be in a one-to-one correspondence with the $M_1$ space-frequency vector pairs. The terminal device may determine $T_1$ weighting coefficients with relatively larger moduli in the $M_1$ weighting coefficients. A modulus of any one of the selected $T_1$ weighting coefficients is greater than or equal to a modulus of any one of remaining $M_1$-$T_1$ weighting coefficients. The $T_1$ weighting coefficients may be weighting coefficients of the $T_1$ space-frequency component matrices.

Locations of the $T_1$ weighting coefficients in the $L_1 \times K_1$ weighting coefficients may be used to determine $T_1$ beam vectors and $T_1$ frequency domain vectors included in the $T_1$ space-frequency vector pairs.

In an implementation, the terminal device may extract, from the matrix W, the $L_1$ rows with relatively large moduli and the $K_1$ columns with relatively large moduli, to obtain a matrix having a dimension of $L_1 \times K_1$. For ease of differentiation and description, the matrix having the dimension of $L_1 \times K_1$ is denoted as W'. The matrix W' may be considered as a submatrix of the matrix W. The terminal device may perform a modulo operation on each element in the matrix W', to select $T_1$ elements with relatively large moduli. Locations of the $T_1$ elements in the matrix W' may be used to determine locations, in the $L_1$ beam vectors, of the beam vectors included in the $T_1$ space-frequency vector pairs and locations, in the $K_1$ frequency domain vectors, of the frequency domain vectors included in the $T_1$ space-frequency vector pairs. Specifically, row numbers of the $T_1$ elements in the matrix W' may be sequence numbers of the selected $T_1$ beam vectors in the $L_1$ beam vectors, and column numbers of the $T_1$ elements in the matrix W' may be sequence numbers of the selected $T_1$ frequency domain vectors in the $K_1$ frequency domain vectors.

In another implementation, according to a predefined rule, for example, first rows and then columns or first columns and then rows, the terminal device may sequentially arrange the $L_1$ rows with relatively large moduli and the $K_1$ columns with relatively large moduli that are extracted from the matrix W, to obtain an array including the $L_1 \times K_1$ weighting coefficients. The terminal device may perform a modulo operation on each element in the array, to select $T_1$ elements with relatively large moduli. Locations of the $T_1$ elements in the array may be used to determine locations, in the $L_1$ beam vectors, of the beam vectors included in the $T_1$ space-frequency vector pairs and locations, in the $K_1$ frequency domain vectors, of the frequency domain vectors included in the $T_1$ space-frequency vector pairs.

The $T_1$ space-frequency vector pairs may be used to determine the $T_1$ space-frequency component matrices. It is assumed that the $T_1$ beam vectors in the $T_1$ space-frequency vector pairs selected by the terminal device in step 1-iv are denoted as $u_s^0, u_s^1, \ldots,$ and $u_s^{T_1-1}$, and that the $T_1$ frequency domain vectors in the $T_1$ space-frequency vector pairs are denoted as $u_f^0, u_f^1, \ldots,$ and $u_f^{T_1-1}$. A space-frequency component matrix may be $U_{t_1}$, where $U_{t_1} = u_s^{t_1}(u_f^{t_1})^*$ or $U_{t_1} = u_f^{t_1} \otimes u_s^{t_1}$, and $t_1 = 0, 1, \ldots, T_1-1$. $u_s^{t_1}(u_f^{t_1})^*$ may be a matrix having a dimension of $N_s \times N_f$, and $u_f^{t_1} \otimes u_s^{t_1}$ may be a vector having a length of $N_s \times N_f$.

It should be understood that the terminal device does not necessarily generate the $T_1$ space-frequency component matrices based on the $T_1$ space-frequency vector pairs described above. Herein, for ease of understanding only, several possible manners of conversion between a space-frequency vector pair and a space-frequency component matrix are shown.

Step 1-v: The terminal device generates the first indication information, to indicate the $L_1$ beam vectors, the $K_1$ frequency domain vectors, and the $T_1$ space-frequency vector pairs.

Based on the $L_1$ beam vectors, the $K_1$ frequency domain vectors, and the $T_1$ space-frequency vector pairs that are determined in step 1-i to step 1-iv, the first indication information may include location information of the $L_1$ beam vectors in the beam vector set, location information of the $K_1$ frequency domain vectors in the frequency domain vector set, and information used to indicate the $T_1$ space-frequency vector pairs.

Optionally, when the first indication information is used to indicate the $L_1$ beam vectors, the first indication information may be used to indicate an index of a combination of the $L_1$ beam vectors in the beam vector set. For example, a plurality of combinations of a plurality of beam vectors may be predefined in a protocol, and each combination may correspond to one index. The $L_1$ beam vectors may be one of the plurality of combinations, or close to one of the plurality of combinations. The first indication information may indicate the $L_1$ beam vectors by indicating an index of the combination. In other words, the location information of the $L_1$ beam vectors in the beam vector set may be an index of a combination of the $L_1$ beam vectors in the beam vector set. In this case, the terminal device may indicate the $L_1$ beam vectors in the beam vector set by using $\log_2 \lceil C_{N_s}^{L_1} \rceil$ bits. $\lceil \ \rceil$ represents rounding up.

Optionally, when the first indication information is used to indicate the $K_1$ frequency domain vectors, the first indication information may be used to indicate an index of a combination of the $K_1$ frequency domain vectors in the frequency domain vector set. For example, a plurality of combinations of a plurality of beam vectors may be predefined in a protocol, and each combination may correspond to one index. The $K_1$ frequency domain vectors may be one of the plurality of combinations, or close to one of the plurality of combinations. The first indication information may indicate the $K_1$ frequency domain vectors by indicating an index of the combination. In other words, the location information of the $K_1$ frequency domain vectors in the frequency domain vector set may be an index of a combination of the $K_1$ frequency domain vectors in the frequency domain vector set. In this case, the terminal device may indicate the $K_1$ frequency domain vectors in the frequency domain vector set by using $\log_2 \lceil C_{N_f}^{K_1} \rceil$ bits.

It should be understood that the method for indicating the $L_1$ beam vectors by indicating the index of the combination of the $L_1$ beam vectors and the method for indicating the $K_1$ frequency domain vectors by indicating the index of the combination of the $K_1$ frequency domain vectors are merely a possible implementation, and should not constitute any limitation on this application. For example, when the first indication information is used to indicate the $L_1$ beam vectors, the first indication information may also be used to indicate an index of each of the $L_1$ beam vectors in the beam vector set; or when the first indication information is used to indicate the $K_1$ frequency domain vectors, the first indication information may also be used to indicate an index of each of the $K_1$ frequency domain vectors in the frequency domain vector set. Specific manners of indicating the $L_1$ beam vectors and the $K_1$ frequency domain vectors are not limited in this application.

Optionally, the first indication information may be used to indicate the $T_1$ space-frequency vector pairs in any one of the following manners:

Manner 1: The $T_1$ space-frequency vector pairs in the $M_1$ space-frequency vector pairs are indicated by using a bitmap (bitmap).

Manner 2: An index of a combination of the $T_1$ space-frequency vector pairs in the $M_1$ space-frequency vector pairs is indicated.

Manner 3: A location, in the $L_1$ beam vectors, of a beam vector corresponding to each of the $T_1$ space-frequency vector pairs and a location, in the $K_1$ frequency domain vectors, of a frequency domain vector corresponding to each of the $T_1$ space-frequency vector pairs are indicated.

Manner 4: A location, in the $M_1$ space-frequency vector pairs, of each of the $T_1$ space-frequency vector pairs is indicated.

With reference to the foregoing four manners, the following describes in detail a specific method for indicating the $T_1$ space-frequency vector pairs by using the first indication information.

In the manner 1, the terminal device may indicate $T_1$ space-frequency vector pairs in the $M_1$ space-frequency vector pairs by using an $M_1$-bit bitmap. Each bit in the bitmap may correspond to one of the $M_1$ space-frequency vector pairs. Each bit may be used to indicate whether a corresponding space-frequency vector pair is selected as one of the $T_1$ space-frequency vector pairs. Alternatively, each bit may be used to indicate whether a corresponding space-frequency vector pair belongs to the $T_1$ space-frequency vector pairs. For example, when a bit is set to "0", it indicates that a corresponding space-frequency vector pair does not belong to the $T_1$ space-frequency vector pairs. When a bit is set to "1", it indicates that a corresponding space-frequency vector pair belongs to the $T_1$ space-frequency vector pairs.

A correspondence between the $M_1$ bits in the bitmap and the $M_1$ space-frequency vector pairs corresponds to a combination manner of a beam vector and a frequency domain vector in the $M_1$ space-frequency vector pairs. For example, the $M_1$ space-frequency vector pairs corresponding to the $M_1$ bits may be arranged in an order of first traversing the $K_1$ frequency domain vectors and then traversing the $L_1$ beam vectors, or may be arranged in an order of first traversing the $L_1$ beam vectors and then traversing the $K_1$ frequency domain vectors.

It is assumed that the selected $L_1$ beam vectors in the beam vector set are denoted as $v_s^0, v_s^1, \ldots,$ and $v_s^{L_1-1}$, and the selected $K_1$ frequency domain vectors in the frequency domain vector set are denoted as $v_f^0, v_f^1, \ldots,$ and $v_f^{K_1-1}$.

If the $K_1$ frequency domain vectors are first traversed and the $L_1$ beam vectors are then traversed, an arrangement order of the $M_1$ space-frequency vector pairs may be $(v_s^0, v_f^0)$, $(v_s^0, v_f^1), \ldots, (v_s^0, v_f^{K_1-1}), (v_s^1, v_f^0), (v_s^1, v_f^1), \ldots,$ and $(v_s^{L_1-1}, v_f^{K_1-1})$. There are a total of $M_1$ space-frequency vector pairs. For brevity, examples are not further listed one by one herein. The $M_1$ bits in the bitmap are in a one-to-one correspondence with the $M_1$ space-frequency vector pairs.

A $0^{th}$ bit to a $(K_1-1)^{th}$ bit in the $M_1$ bits in the bitmap are in a one-to-one correspondence with the space-frequency vector pairs $(v_s^0, v_f^0), (v_s^0, v_f^1), \ldots,$ and $(v_s^0, v_f^{K_1-1})$. A $K_1^{th}$ bit to a $(2K_1-1)^{th}$ bit are in one-to-one correspondence with the space-frequency vector pairs $(v_s^1, v_f^0), (v_s^1, v_f^1), \ldots,$ and $(v_s^1, v_f^{K_1-1})$. By analogy, an $[(L_1-1) \times K_1]^{th}$ bit to an $(L_1 \times K_1-1)^{th}$ bit are in a one-to-one correspondence with the space-frequency vector pairs $(v_s^{L_1-1}, v_f^0), (v_s^{L_1-1}, v_f^1), \ldots,$ and $(v_s^{L_1-1}, v_f^{K_1-1})$.

If the $L_1$ beam vectors are first traversed and the $K_1$ frequency domain vectors are then traversed, an arrangement order of the $M_1$ space-frequency vector pairs may be $(v_s^0, v_f^0), (v_s^1, v_f^0), \ldots, (v_s^{L_1-1}, v_f^0), (v_s^0, v_f^1), (v_s^1, v_f^1), \ldots,$ and $(v_s^{L_1-1}, v_f^{K_1-1})$. There are a total of $M_1$ space-frequency vector pairs. For brevity, examples are not listed herein one by one. The $M_1$ bits in the bitmap are in a one-to-one correspondence with the $M_1$ space-frequency vector pairs.

A $0^{th}$ bit to an $(L_1-1)^{th}$ bit in the $M_1$ bits in the bitmap are in a one-to-one correspondence with the space-frequency vector pairs $(v_s^0, v_f^0)$, $(v_s^1, v_f^0)$, ..., and $(v_s^{L_1-1}, v_f^0)$. An $L_1^{th}$ bit to an $(2L_1-1)^{th}$ bit are in a one-to-one correspondence with the space-frequency vector pairs $(v_s^0, v_f^1)$, $(v_s^1, v_f^1)$, ..., and $(v_s^{L_1-1}, v_f^1)$. By analogy, an $[L_1 \times (K_1-1)]^{th}$ bit to an $(L_1 \times K_1-1)^{th}$ bit are in one-to-one correspondence with the space-frequency vector pairs $(v_s^0, v_f^{K_1-1})$, $(v_s^1, v_f^{K_1-1})$, ..., and $(v_s^{L_1-1}, v_f^{K_1-1})$.

It should be understood that the foregoing enumerated one-to-one correspondence between the $M_1$ bits and the $M_1$ space-frequency vector pairs is merely an example, and should not constitute any limitation on this application. The correspondence between the $M_1$ bits and the $M_1$ space-frequency vector pairs is not limited in this application. In addition, an arrangement manner of the $M_1$ space-frequency vector pairs is not limited in this application. The foregoing shows two possible arrangement manners of the $M_1$ space-frequency vector pairs that are in the one-to-one correspondence with the $M_1$ bits, merely for ease of describing the one-to-one correspondence between the $M_1$ bits and the $M_1$ space-frequency vector pairs.

In the manner 2, the terminal device may indicate the $T_1$ space-frequency vector pairs by using the index of the combination of the $T_1$ space-frequency vector pairs in the $M_1$ space-frequency vector pairs. In other words, the terminal device may predetermine a plurality of combinations of a plurality of space-frequency vector pairs based on the $M_1$ space-frequency vector pairs obtained by combining the $L_1$ beam vectors and the $K_1$ frequency domain vectors. Each combination may correspond to one index. The $T_1$ space-frequency vector pairs may be one of the plurality of combinations, or may be close to one of the plurality of combinations. The first indication information may indicate the $T_1$ space-frequency vector pairs by indicating an index of the combination. Therefore, the terminal device may indicate the $T_1$ space-frequency vector pairs in the $M_1$ space-frequency vector pairs by using $\log_2 \lceil C_{M_1}^{T_1} \rceil$ bits.

In the manner 3, the terminal device may separately indicate the locations of the $T_1$ beam vectors in the $L_1$ beam vectors and the locations of the $T_1$ frequency domain vectors in the $K_1$ frequency domain vectors, where the $T_1$ beam vectors and the $T_1$ frequency domain vectors are combined to obtain the $T_1$ space-frequency vector pairs. The terminal device may indicate a location of each beam vector in the $L_1$ beam vectors by using $\lceil \log_2 L_1 \rceil$ bits, and the terminal device may indicate a location of each frequency domain vector in the $K_1$ frequency domain vectors by using $\lceil \log_2 K_1 \rceil$ bits.

In the manner 4, the terminal device may indicate the location of each of the $T_1$ space-frequency vector pairs in the $M_1$ space-frequency vector pairs. Herein, the location of each space-frequency vector pair in the $M_1$ space-frequency vector pairs may be understood as a relative location, or a local (local) location, of each space-frequency vector pair in the $M_1$ space-frequency vector pairs. For example, the terminal device may indicate an index of each space-frequency vector pair in the $M_1$ space-frequency vector pairs. In this case, the terminal device may indicate the index of the space-frequency vector pair in the $M_1$ space-frequency vector pairs by using $\lceil \log_2 M_1 \rceil$ bits.

In the several manners listed above, the space-frequency vector pair may be represented in a form of a space-frequency component matrix (including a matrix form or a vector form), or may be represented in a form of a vector pair obtained by combining a beam vector and a frequency domain vector. This is not limited in this application.

It can be learned that in the foregoing listed methods for indicating $T_1$ space-frequency vector pairs, the terminal device indicates the $T_1$ space-frequency vector pairs by using relative locations (for example, relative indexes or relative numbers) of the $T_1$ space-frequency vector pairs in the $M_1$ space-frequency vector pairs, or indicates the $T_1$ space-frequency vector pairs by using relative locations (for example, relative indexes or relative numbers) of the $T_1$ space-frequency vector pairs in the $L_1$ beam vectors and the $K_1$ frequency domain vectors. Because a selection range is narrowed, overheads caused by indicating the $T_1$ space-frequency vector pairs are also reduced.

It should be understood that the foregoing enumerated methods for indicating the $T_1$ space-frequency vector pairs are merely examples, and should not constitute any limitation on this application. For example, a quantity of space-frequency vector pairs corresponding to each beam vector is $K_1$; in $L_1 \times K_1$ space-frequency vector pairs corresponding to the $L_1$ beam vectors, the terminal device may report, based on each beam vector, a space-frequency component pair that is selected for weighted summation to determine a precoding vector. For example, if quantities of selected space-frequency vector pairs that are in the space-frequency vector pairs and that correspond to the beam vectors are the same, that is, are $T_1/L_1$, the terminal device may indicate, based on each beam vector, an index of a combination of the $T_1/L_1$ selected space-frequency vector pairs in the $K_1$ space-frequency vector pairs corresponding to the same beam vector. If quantities of selected space-frequency vector pairs that are in the $K_1$ space-frequency vector pairs and that correspond to the beam vectors are different from each other, the terminal device may report a quantity of selected space-frequency vector pairs based on each beam vector, and an index of a combination of the selected space-frequency vector pairs in the $K_1$ space-frequency vector pairs corresponding to the same beam vector.

It should be understood that the method for indicating the $T_1$ space-frequency vector pairs by the terminal device is not limited to the foregoing listed methods in this application. For brevity, examples are not further listed one by one herein. A specific method for indicating the $T_1$ space-frequency vector pairs by the terminal device is not limited in this application.

Optionally, the first indication information further includes quantization information of the weighting coefficients of the $T_1$ space-frequency vector pairs.

The terminal device may generate the quantization information of the weighting coefficients of the $T_1$ space-frequency vector pairs based on the weighting coefficients of the $T_1$ space-frequency vector pairs that are determined in step 1-iv.

Optionally, the terminal device may indicate, based on the weighting coefficients of the $T_1$ space-frequency vector pairs determined in step 1-iv, the $T_1$ weighting coefficients through normalization.

Specifically, the terminal device may determine a weighting coefficient (for example, denoted as a maximum weighting coefficient) with a maximum modulus in the $T_1$ weighting coefficients, and indicate a location of the maximum weighting coefficient in the matrix W'. Then, the terminal device may further indicate a relative value of each of remaining $T_1-1$ weighting coefficients relative to the maximum weighting coefficient. For example, the terminal device may indicate the remaining $T_1-1$ weighting coefficients by using an index of a quantized value of each relative value. For example, a one-to-one correspondence between a plurality of quantized values and a plurality of indexes may be predefined in a codebook, and the terminal device may feed back the relative values of the weighting coefficients relative to the maximum weighting coefficient to the network device based on the one-to-one correspondence. Therefore, the weighting coefficient fed back by the terminal device may be the same as or similar to the weighting coefficient determined in step 1-iv, and therefore is referred to as a quantized value of the weighting coefficient. Information used to indicate the quantized value of the weighting coefficient may be referred to as quantized information of the weighting coefficient. The quantized information may be, for example, the index of the quantized value.

It should be understood that indicating the weighting coefficients through normalization is merely a possible implementation, and should not constitute any limitation on this application. For a specific method for indicating the weighting coefficient by the terminal device, refer to a method in the current technology. For brevity, details are not described herein.

It should be noted that the normalization mentioned herein may be determining a maximum weighting coefficient based on each polarization direction, each transport layer, or all transport layers, so that normalization is performed in different ranges such as each polarization direction, each transport layer, or all transport layers.

It should be further understood that the foregoing methods for determining the $L_1$ beam vectors, the $K_1$ frequency domain vectors, the $T_1$ space-frequency vector pairs, and the weighting coefficients of the space-frequency vector pairs by the terminal device are merely examples, and should not constitute any limitation on this application.

For example, optionally, the terminal device may alternatively determine and feed back a wideband amplitude coefficient for each of the $L_1$ beam vectors. In this case, the first indication information may further include quantization information of wideband amplitude coefficients of the $L_1$ beam vectors.

Optionally, the terminal device may first select the $L_1$ beam vectors, then select $K_1$ frequency domain vectors for each beam vector, and further determine weighting coefficients corresponding to space-frequency vectors including each beam vector and a frequency domain vector corresponding to the beam vector. That is, there are a total of $L_1 \times K_1$ weighting coefficients.

In this case, the first indication information is specifically used to indicate each beam vector in the $L_1$ beam vectors and a frequency domain vector corresponding to each beam vector. The possible design may be applied to a scenario in which at least two of the selected $L_1$ beam vectors correspond to different frequency domain vectors, and particularly, may be applied to a scenario in which at least two of the selected $L_1$ beam vectors correspond to different frequency domain vectors and a relatively small quantity of beam vectors are selected, or in other words, a value of $L_1$ is relatively small (that is, spatial sparsity is relatively good). Optionally, the first indication information is further used to indicate a quantity of frequency domain vectors corresponding to each beam vector. Optionally, at least two beam vectors correspond to different quantities of frequency domain vectors.

If a frequency domain vector is selected for each beam vector, and frequency domain vectors selected for at least two beam vectors are different, after determining the $T_1$ space-frequency vector pairs in the $M_1$ space-frequency vector pairs, the terminal device may separately indicate the selected space-frequency vector pairs based on each beam vector. For example, based on each beam vector, the terminal device may use any one of the foregoing listed manner 1 to manner 4 for indication.

If at least two beam vectors correspond to different quantities of frequency domain vectors, when the terminal device uses the manner 2 for indication, the terminal device may further indicate the quantity of frequency domain vectors corresponding to each beam vector.

If quantities of selected space-frequency vector pairs in the space-frequency vector pairs corresponding to the at least two beam vectors are different, when the terminal device uses the manner 2 for indication, the terminal device may further indicate a quantity of selected space-frequency vector pairs in the space-frequency vector pairs corresponding to each beam vector.

Optionally, the terminal device may alternatively first select K frequency domain vectors, then select L beam vectors for each frequency domain vector, and further determine weighting coefficients corresponding to space-frequency vector pair including each frequency domain vector and a beam vector corresponding to the frequency domain vector. That is, there are a total of L×K weighting coefficients.

In this case, the first indication information is specifically used to indicate each frequency domain vector in the K frequency domain vectors and a beam vector corresponding to each frequency domain vector. The possible design may be applied to a scenario in which beam vectors corresponding to at least two of the selected K frequency domain vectors are different, and particularly, may be applied to a scenario in which beam vectors corresponding to at least two of the selected K frequency domain vectors are different and a relatively small quantity of frequency domain vectors are selected, or in other words, a value of K is relatively small (that is, frequency domain sparsity is relatively good). Optionally, the first indication information is further used to indicate a quantity of beam vectors corresponding to each frequency domain vector. Optionally, at least two frequency domain vectors correspond to different quantities of beam vectors.

If a beam vector is selected for each frequency domain vector, and beam vectors selected for at least two frequency domain vectors are different, after determining the $T_1$ space-frequency vector pairs in the $M_1$ space-frequency vector pairs, the terminal device may separately indicate the selected space-frequency vector pairs based on each frequency domain vector. For example, based on each frequency domain vector, the terminal device may use any one of the foregoing listed manner 1 to manner 4 for indication.

If at least two frequency domain vectors correspond to different quantities of beam vectors, when the terminal device uses the manner 2 for indication, the terminal device may further indicate the quantity of beam vectors corresponding to each frequency domain vector.

If quantities of selected space-frequency vector pairs in the space-frequency vector pairs corresponding to the at least two beam vectors are different, when the terminal device uses the manner 2 for indication, the terminal device may further indicate a quantity of selected space-frequency vector pairs in the space-frequency vector pairs corresponding to each beam vector.

In addition, as described above, the $L_1$ beam vectors may be some or all beam vectors in the beam vector set, that is, $L_1 \leq N_s$. The $K_1$ frequency domain vectors may be some or all frequency domain vectors in the frequency domain vector set, that is, $K_1 \leq N_f$. However, $L_1$, $K_1$, $N_s$, and $N_f$ do not satisfy $L_1 = N_s$ and $K_1 = N_f$ at the same time.

When $L_1 = N_s$, the first indication information may indicate only the $K_1$ frequency domain vectors and the $T_1$ space-frequency vector pairs, and does not indicate the $L_1$ beam vectors by using additional information. In other words, the first indication information is used to indicate the $K_1$ frequency domain vector pairs and the $T_1$ space-frequency vector pairs. When the network device receives the first indication information, it may be considered by default that the $L_1$ beam vectors are a universal set of the beam vector set.

When $K_1=N_f$, the first indication information may indicate only the $L_1$ beam vectors and the $T_1$ space-frequency vector pairs, and does not indicate the $K_1$ frequency domain vectors by using additional information. When the network device receives the first indication information, it may be considered by default that the $K_1$ frequency domain vectors are a universal set of the frequency domain vector set.

It should be further understood that the quantization information of the weighting coefficients of the $T_1$ space-frequency vector pairs may be carried in the first indication information, or may be carried in additional information. This is not limited in this application.

If the oversampling rate is considered, there may be the following three possible cases for vectors included in the beam vector set and the frequency domain vector set:

Case 1: The beam vector set is extended to $O_s \times N_s$ beam vectors by using an oversampling factor $O_s$, and the frequency domain vector set is extended to $O_f \times N_f$ frequency domain vectors by using an oversampling factor Of.

Case 2: The beam vector set is extended to $O_s \times N_s$ beam vectors by using an oversampling factor $O_s$, and the frequency domain vector set includes $N_f$ frequency domain vectors.

Case 3: The beam vector set includes $N_s$ beam vectors, and the frequency domain vector set is extended to $O_f \times N_f$ frequency domain vectors by using an oversampling factor Of.

For the foregoing three possible cases, processing manners of the terminal device may be the same. The following uses the case 1 as an example to describe in detail a specific process in which the terminal device determines the $T_1$ space-frequency component matrices and the weighting coefficients of the space-frequency component matrices.

The terminal device may specifically determine the $T_1$ space-frequency component matrices and the weighting coefficients of the space-frequency component matrices by using step 2-i to step 2-vi shown below.

Step 2-i: The terminal device may determine a weighting coefficient matrix based on the space-frequency matrix H, a matrix constructed based on the beam vector set, and a matrix constructed based on the frequency domain vector set.

If the beam vector set is extended to $O_s \times N_s$ beam vectors by using an oversampling factor $O_s$, and the frequency domain vector set is extended to $O_f \times N_f$ frequency domain vectors by using an oversampling factor $O_f$, the beam vector set may include $O_s$ subsets, and a matrix $B_s^{o_s}$, may be constructed based on an $o_s^{th}$ subset; the frequency domain vector set may include $O_f$ subsets, and a matrix $B_f^{o_f}$ may be constructed based on an $o_f^{th}$ subset. The terminal device may determine a matrix $W_{o_s, o_f}$ by using $w_{o_s, o_f}=(B_s^{o_s})^*HB_f^{o_f}$. The matrix $W_{o_s, o_f}$ may be considered as a weighting coefficient matrix corresponding to the $o_s^{th}$ subset and the $o_f^{th}$ subset, and a dimension of the matrix may be $N_s \times N_f$. The $N_s$ rows in the matrix $W_{o_s, o_f}$ may correspond to $N_s$ beam vectors in the $o_s^{th}$ subset (or a matrix $B_s^{o_s}$ constructed by the $o_s^{th}$ subset) in the beam vector set. The $N_f$ columns in the matrix $W_{o_s, o_f}$ may correspond to $N_f$ frequency domain vectors in the $o_f^{th}$ subset (or a matrix $B_f^{o_f}$ constructed based on the $o_f^{th}$ subset) in the frequency domain vector set. Each coefficient in the matrix $W_{o_s, o_f}$ may correspond to one space-frequency vector pair.

Step 2-ii: The terminal device may determine $O_s \times O_f$ groups of space-frequency vector pairs based on the $O_s$ subsets in the beam vector set and the $O_f$ subsets in the frequency domain vector set, where each group of space-frequency vector pairs includes $T_1$ space-frequency vector pairs.

Specifically, the terminal device may separately traverse 0 to $O_s-1$ for a value of $o_s$, traverse 0 to $O_f-1$ for a value of $o_f$, and repeatedly perform the following steps to determine the $O_s \times O_f$ groups of space-frequency vector pairs: determining $L_1$ relatively strong rows and $K_1$ relatively strong columns based on the matrix $W_{o_s, o_f}$, and determining $L_1$ relatively strong beam vectors in the $o_s^{th}$ subset and $K_1$ relatively strong frequency domain vectors in the $o_f^{th}$ subset. The $L_1$ beam vectors and the $K_1$ frequency domain vectors may be combined to obtain $M_1$ space-frequency vector pairs. Further, the terminal device may determine $T_1$ relatively strong space-frequency vector pairs based on $L_1 \times K_1$ that is determined based on the $L_1$ relatively strong rows and the $K_1$ relatively strong columns in the matrix $W_{o_s, o_f}$.

The specific process in which the terminal device determines the $L_1$ relatively strong beam vectors and the $K_1$ relatively strong frequency domain vectors based on the weighting coefficient matrix W, and then determines the $T_1$ relatively strong space-frequency vector pairs has been described in detail in the foregoing step 1-ii to step 1-v. For brevity, details are not described herein again.

Step 2-iii: The terminal device may select a strongest group of space-frequency vector pairs based on the weighting coefficients of the $O_s \times O_f$ groups of space-frequency vector pairs, to determine the $T_1$ space-frequency vector pairs and weighting coefficients of the space-frequency vector pairs.

The terminal device may determine the strongest group of space-frequency vector pairs based on the $O_s \times O_f$ groups of space-frequency vector pairs determined in step 2-ii, where $T_1$ space-frequency vector pairs in the strongest group of space-frequency vector pairs may be used to generate the $T_1$ space-frequency component matrices. For example, the terminal device may separately calculate a sum of moduli of weighting coefficients of each group of space-frequency vector pairs in the $O_s \times O_f$ groups of space-frequency vector pairs, and select a group of space-frequency vector pairs whose sum of moduli is the largest, to generate the $T_1$ space-frequency component matrices. Weighting coefficient of the group of space-frequency vector pairs are the weighting coefficients of the $T_1$ space-frequency component matrices.

The specific process in which the terminal device generates the $T_1$ space-frequency component matrices based on the $T_1$ space-frequency vectors has been described in detail in the foregoing step 1-v. For brevity, details are not described herein again.

Because the $T_1$ beam vectors included in the $T_1$ space-frequency vector pairs are from a same subset of the beam vector set, when determining the $T_1$ space-frequency vector pairs, the terminal device can also determine the subset to which the $T_1$ beam vectors belong. In this way, $L_1$ relatively strong beam vectors in the subset can be determined.

Likewise, because the $T_1$ frequency domain vectors included in the $T_1$ space-frequency vector pairs are from a same subset of the frequency domain vector set, when determining the $T_1$ space-frequency vector pairs, the terminal device can also determine the subset to which the $T_1$ frequency domain vectors belong. In this way, $K_1$ relatively strong frequency domain vectors in the subset can be determined.

It should be understood that the foregoing method for determining the $L_1$ beam vectors and the $K_1$ frequency domain vectors by using the weighting coefficient matrix is merely a possible implementation shown for ease of understanding, but this does not indicate that the terminal device definitely generates the weighting coefficient matrix when determining the $L_1$ beam vectors and the $K_1$ frequency domain vectors. For example, a precoding vector of each frequency domain unit is separately projected to each beam vector in any subset of the beam vector set and each frequency domain vector in any subset of the frequency domain vector set, to obtain an array set including a plurality of projection values. Elements in the array set may be obtained by sequentially connecting elements in rows (or columns) in the foregoing weighting coefficient matrix.

Step 2-iv: The terminal device generates the first indication information, to indicate the $L_1$ beam vectors, the $K_1$ frequency domain vectors, and the $T_1$ space-frequency vector pairs.

Based on the $L_1$ beam vectors, the $K_1$ frequency domain vectors, and the $T_1$ space-frequency vector pairs that are determined in step 2-i to step 2-iii, the first indication information may include location information of the $L_1$ beam vectors in the beam vector set, location information of the $K_1$ frequency domain vectors in the frequency domain vector set, and information used to indicate the $T_1$ space-frequency vector pairs.

Optionally, when the first indication information is used to indicate the $L_1$ beam vectors, the first indication information may be specifically used to indicate a subset to which the $L_1$ beam vectors belong and indexes of the $L_1$ beam vectors in the subset, or may be specifically used to indicate a subset to which the $L_1$ beam vectors belong and an index of a combination of the $L_1$ beam vectors in the subset.

Optionally, when the first indication information is used to indicate the $K_1$ frequency domain vectors, the first indication information may be specifically used to indicate a subset to which the $K_1$ frequency domain vectors belong and indexes of the $K_1$ frequency domain vectors in the subset, or may be specifically used to indicate a subset to which the $K_1$ frequency domain vectors belong and an index of a combination of the $K_1$ frequency domain vectors in the subset.

When the first indication information is used to indicate the $T_1$ space-frequency vector pairs, a specific indication manner may be any one of the manner 1 to the manner 4 described above. The foregoing has described the manner 1 to the manner 4 in detail. For brevity, details are not described herein again.

Optionally, the first indication information further includes quantization information of the weighting coefficients of the $T_1$ space-frequency vector pairs.

It should be understood that the quantization information of the weighting coefficients of the $T_1$ space-frequency vector pairs may be carried in the first indication information, or may be carried in additional information. This is not limited in this application.

In the case 2, because the beam vector set is extended to the $O_s \times N_s$ beam vectors by using the oversampling factor $O_s$, and the frequency domain vector set includes $N_f$ frequency domain vectors, the terminal device may construct a matrix $B_s^{o_s}$ ($o_s = 0, 1, \ldots, O_s - 1$) and a matrix $B_f$. Then, the terminal device may traverse 0 to $O_s - 1$ for a value of $o_s$, and determine the $T_1$ space-frequency component matrices and the weighting coefficients of the space-frequency component matrices by using $W_{o_s} = (B_s^{o_s})^* H B_f$.

In the case 3, because the beam vector set includes $N_f$ frequency domain vectors, and the frequency domain vector set is extended to the $O_f \times N_f$ frequency domain vectors by using the oversampling factor $O_f$, the terminal device may construct a matrix $B_s$ and a matrix $B_f^{o_f}$ ($o_f = 0, 1, \ldots, O_f - 1$). Then, the terminal device may traverse 0 to $O_f - 1$ for a value of $o_f$, and determine the $T_1$ space-frequency component matrices and the weighting coefficients of the space-frequency component matrices by using $W_{o_f} = (B_s)^* H B_f^{o_f}$.

Specific methods for determining, by the terminal device, the $T_1$ space-frequency component matrices and the weighting coefficients of the space-frequency component matrices in the case 2 and the case 3 are similar to the specific method described in the case 1. For brevity, details are not described herein again.

Based on the foregoing technical solutions, the terminal device may generate the first indication information, to indicate the $L_1$ beam vectors in the beam vector set, the $K_1$ frequency domain vectors in the frequency domain vector set, and the $T_1$ space-frequency component matrices.

It should be understood that foregoing methods for determining the $L_1$ beam vectors in the beam vector set, the $K_1$ frequency domain vectors in the frequency domain vector set, and the $T_1$ space-frequency component matrices are merely examples, and should not constitute any limitation on this application. As described above, the $L_1$ beam vectors may be some or all beam vectors in the beam vector set, that is, $L_1 \leq L_0$. The $K_1$ frequency domain vectors may be some or all frequency domain vectors in the frequency domain vector set, that is, $K_1 \leq K_0$. However, $L_1$, $K_1$, $L_0$, and $K_0$ do not satisfy $L_1 = L_0$ and $K_1 = K_0$ at the same time.

As described above, the $L_1$ beam vectors may be some or all beam vectors in the beam vector set, that is, $L_1 \leq L_0$. The $K_1$ frequency domain vectors may be some or all frequency domain vectors in the frequency domain vector set, that is, $K_1 \leq K_0$. However, $L_1$, $K_1$, $L_0$, and $K_0$ do not satisfy $L_1 = L_0$ and $K_1 = K_0$ at the same time.

When the beam vector set or the frequency domain vector set is oversampled, the $L_1$ beam vectors may be a subset (for example, an orthogonal group) of the beam vector set or some beam vectors in a subset of the beam vector set, and the $K_1$ frequency domain vectors may be a subset (for example, an orthogonal group) of the frequency domain vector set or some frequency domain vectors in a subset of the frequency domain vector set. However, $L_1$, $K_1$, $L_0$, and $K_0$ do not satisfy $L_1 = L_0$ and $K_1 = K_0$ at the same time.

Optionally, when the $L_1$ beam vectors are a subset of the beam vector set and the first indication information is used to indicate the $L_1$ beam vectors, the first indication information may be used to indicate only the selected subset of the beam vector set, and the $L_1$ beam vectors are not indicated by using additional information. When the network device receives the first indication information, it may be considered by default that the $L_1$ beam vectors are the selected subset of the beam vector set.

Optionally, when the $K_1$ frequency domain vectors are a subset of the frequency domain vector set and the first indication information is used to indicate the $K_1$ frequency domain vectors, the first indication information may be used to indicate only the selected subset of the frequency domain vector set, and the $K_1$ frequency domain vectors are not indicated by using additional information. When the network device receives the first indication information, it may be considered by default that the $K_1$ frequency domain vectors are the selected subset of the frequency domain vector set.

Optionally, when the $L_1$ beam vectors are a universal set of the beam vector set, that is, $L_1=L_0$, the first indication information may indicate only the $K_1$ frequency domain vectors and the $T_1$ space-frequency vector pairs, and does not indicate the $L_1$ beam vectors by using additional information. When the network device receives the first indication information, it may be considered by default that the $L_1$ beam vectors are all beam vectors in the beam vector set. Optionally, when the $K_1$ frequency domain vectors are a universal set of the frequency domain vector set, that is, $K_1=K_0$, the first indication information may indicate only the $L_1$ beam vectors and the $T_1$ space-frequency vector pairs, and does not indicate the $K_1$ frequency domain vectors by using additional information. When the network device receives the first indication information, it may be considered by default that the $K_1$ frequency domain vectors are all frequency domain vectors in the frequency domain vector set.

It should be understood that the foregoing enumerated specific content indicated by using the first indication information in different cases is merely an example, and should not constitute any limitation on this application. For example, the terminal device may not distinguish between the foregoing listed cases, but directly indicate the $L_1$ beam vectors, the $K_1$ frequency domain vectors, and the $T_1$ space-frequency vector pairs.

Implementation 2

The terminal device may determine the $M_1$ space-frequency component matrices based on a prestored space-frequency component matrix set and a predetermined space-frequency matrix, and further determine the $T_1$ space-frequency component matrices.

In this embodiment, each space-frequency component matrix in the space-frequency component matrix set prestored by the terminal device may be a matrix having a dimension of $N_s \times N_f$, or may be a vector having a length of $N_s \times N_f$. With reference to the two cases, the following separately describes in detail a specific process in which the terminal device determines the $T_1$ space-frequency component matrices.

Case A: Each space-frequency component matrix in the space-frequency component matrix set is a vector having a length of $N_s \times N_f$.

It is assumed that precoding vectors of $N_f$ frequency domain units determined by the terminal device are denoted as $h_0, h_1, \ldots,$ and $h_{N_f-1}$. In the case A, the terminal device may construct, based on the precoding vectors of the $N_f$ frequency domain units, a space-frequency matrix H having a length of $N_s \times N_f$, where $$H \sqcap [h_0^T \ h_1^T \ \cdots \ h_{N_f-1}^T]^T.$$

For ease of differentiation, the space-frequency matrix whose length is $N_s \times N_f$ is referred to as a space-frequency vector below.

The following describes the space-frequency component matrix set in detail.

In a possible design, the space-frequency component matrix set may include $N_s \times N_f$ space-frequency component matrices. Each space-frequency component matrix may be a vector having a length of $N_s \times N_f$. For ease of differentiation and description below, the space-frequency component matrix whose length is $N_s \times N_f$ is referred to as a space-frequency component vector. Correspondingly, the space-frequency component matrix set may be referred to as a space-frequency component vector set. A weighted sum of $T_1$ space-frequency component vectors selected from the space-frequency component vector set may be constructed to obtain a space-frequency vector. The space-frequency vector obtained through construction by using the weighted sum of the $T_1$ space-frequency component vectors may be the same as or similar to the foregoing space-frequency vector determined by the terminal device.

In this embodiment of this application, each space-frequency component vector in the space-frequency component vector set may be uniquely determined by one beam vector in the beam vector set and one frequency domain vector in the frequency domain vector set. In other words, any two space-frequency component vectors in the space-frequency component vector set are different, and any two space-frequency component vectors have a difference in at least one of corresponding beam vectors and frequency domain vectors.

Specifically, each space-frequency component vector in the space-frequency component vector set may be a Kronecker product of one beam vector in the beam vector set and one frequency domain vector in the frequency domain vector set, or may be a Kronecker product of one frequency domain vector in the frequency domain vector set and one beam vector in the beam vector set. To correspond to the space-frequency vector constructed above, each space-frequency component vector in the space-frequency component vector set may be uniquely determined by using a Kronecker product of a frequency domain vector and a beam vector.

As described above, if an oversampling rate is not considered, the beam vector set may include $N_s$ beam vectors, and the frequency domain vector set may include $N_f$ frequency domain vectors. In this case, the $N_s \times N_f$ space-frequency component vectors may be determined based on the beam vector set and the frequency domain vector set. That is, the space-frequency component vector set may include $N_s \times N_f$ space-frequency component vectors. Each space-frequency component vector may correspond to one beam vector and one frequency domain vector, or each space-frequency component vector may correspond to a space-frequency vector pair obtained by combining one beam vector and one frequency domain vector.

Each space-frequency component vector in the space-frequency component vector set may correspond to one index. The $N_s \times N_f$ space-frequency component vectors in the space-frequency component vector set may be indicated by using indexes in the space-frequency component vector set, or may be indicated by using indexes, in the beam vector set and the frequency domain vector set respectively, of beam vectors and frequency domain vectors that may be used to generate the space-frequency component vectors. Indexes of the $M_1$ space-frequency component vectors in the space-frequency component vector set may be considered as one-dimensional indexes of the $M_1$ space-frequency component vectors. Indexes, in the beam vector set and the frequency domain vector set respectively, of beam vectors and frequency domain vectors included in the $M_1$ space-frequency component vectors may be considered as two-dimensional indexes of the $M_1$ space-frequency component vectors. A one-dimensional index and a two-dimensional index may be mutually converted according to a predefined conversion rule.

Specifically, it is assumed that m is an index of a space-frequency component vector in the space-frequency component vector set, $0 \leq m \leq N_s \times N_f - 1$, and m is an integer. $n_s$ is an index of a beam vector in the beam vector set, $0 \leq n_s \leq N_s - 1$, and $n_s$ is an integer. $n_f$ is an index of a frequency domain vector in the frequency domain vector set, $0 \leq n_f \leq N_f - 1$, and $n_f$ is an integer.

For example, $N_f$ space-frequency component vectors determined by using Kronecker products of a $0^{th}$ beam vector in the $N_s$ beam vectors and a $0^{th}$ frequency domain vector to an $(N_f-1)^{th}$ frequency domain vector in the $N_f$ frequency domain vectors may correspond to one-dimensional indexes 0 to $N_f-1$. $N_f$ space-frequency component vectors determined by using Kronecker products of the $1^{st}$ beam vector in the $N_s$ beam vectors and the $0^{th}$ frequency domain vector to the $(N_f-1)^{th}$ frequency domain vector in the $N_f$ frequency domain vectors may correspond to one-dimensional indexes $N_f$ to $2N_f-1$. By analogy, $N_f$ space-frequency component vectors determined by using Kronecker products of an $n_s^{th}$ beam vector in the $N_s$ beam vectors and the $0^{th}$ frequency domain vector to the $(N_f-1)^{th}$ frequency domain vector in the $N_f$ frequency domain vectors may correspond to one-dimensional indexes $n_s \times N_f$ to $(n_s+1) \times N_f - 1$. For ease of differentiation and description, the numbering rule may be denoted as a rule 1.

Therefore, for the $N_s \times N_f$ space-frequency component vectors in the space-frequency component vector set, it is assumed that an $m^{th}$ space-frequency component vector may be indicated by using an $n_s$, beam vector in the beam vector set and an $n_f^{th}$ frequency domain vector in the frequency domain vector set. $n_f = \lfloor m/N_f \rfloor$, and $n_s = \text{mod}(m, N_f)$. $\lfloor \rfloor$ represents rounding down, and mod( ) represents a modulo operation.

For the $N_s$ beam vectors in the beam vector set and the $N_f$ frequency domain vectors in the frequency domain vector set, a space-frequency component vector constructed by using an $n_s^{th}$ beam vectors in the beam vector set and an $n_f^{th}$ frequency domain vector in the frequency domain vector set may be indicated by using an $m^{th}$ space-frequency component vector, where $m = n_f + n_s * N_f$. For another example, $N_s$ space-frequency component vectors determined by using Kronecker products of a $0^{th}$ frequency domain vector in the $N_f$ frequency domain vectors and a $0^{th}$ beam vector to an $(N_s-1)^{th}$ beam vector in the $N_s$ beam vectors may correspond to one-dimensional indexes 0 to $N_s-1$. $N_s$ space-frequency component vectors determined by using Kronecker products of a $1^{st}$ frequency domain vector in the $N_f$ frequency domain vectors and the $0^{th}$ beam vector to the $(N_s-1)^{th}$ beam vector in the $N_s$ beam vectors may correspond to one-dimensional indexes $N_s$ to $2N_s-1$. By analogy, $N_s$ space-frequency component vectors determined by using Kronecker products of an $n_f^{th}$ frequency domain vector in the $N_f$ frequency domain vectors and the $0^{th}$ beam vector to the $(N_s-1)^{th}$ beam vector in the $N_s$ beam vectors may correspond to one-dimensional indexes $n_f \times N_s$ to $(n_f+1) \times N_s - 1$. For ease of differentiation and description, the numbering rule may be denoted as a rule 2.

Therefore, for the $N_s \times N_f$ space-frequency component vectors in the space-frequency component vector set, an $m^{th}$ ($0 \leq m \leq N_s \times N_f - 1$) space-frequency component vector may be indicated by using an $n_s^{th}$ beam vector in the beam vector set and an $n_f^{th}$ frequency domain vector in the frequency domain vector set. $n_s \lfloor m/N_s \rfloor$, and $n_f = \text{mod}(m, N_s)$.

For the $N_s$ beam vectors in the beam vector set and the $N_s$ beam vectors in the frequency domain vector set, a space-frequency component vector constructed by using an $n_s^{th}$ beam vectors in the beam vector set and an $n_f^{th}$ frequency domain vector in the frequency domain vector set may be indicated by using an $m^{th}$ space-frequency component vector, where $m = n_s + n_f * N_s$.

It should be understood that the foregoing listed two manners of numbering the space-frequency component vectors in the space-frequency component vector set are merely examples, and should not constitute any limitation on this application. The terminal device and the network device may number each space-frequency component vector in the space-frequency component vector set according to a pre-agreed rule. A correspondence between each space-frequency component vector and an index defined by the network device is consistent with a correspondence between each space-frequency component vector and an index defined by the terminal device.

If the oversampling rate is considered, there may be the following three possible cases for vectors included in the space-frequency component vector set:

Case 1: The space-frequency component vector set is extended to $O_s \times N_s \times O_f \times N_f$ space-frequency component vectors by using oversampling factors $O_s$ and $O_f$. In this case, the space-frequency component vector set may include $O_s \times O_f$ subsets, and each subset may include $N_s \times N_f$ space-frequency component vectors.

Case 2: The space-frequency component vector set is extended to $O_s \times N_s \times N_f$ space-frequency component vectors by using an oversampling factor $O_s$. In this case, the space-frequency component vector set may include $O_s$ subsets, and each subset may include $N_s \times N_f$ space-frequency component vectors.

Case 3: The space-frequency component vector set is extended to $O_f \times N_s \times N_f$ space-frequency component vectors by using an oversampling factor $O_f$. In this case, the space-frequency component vector set may include $O_f$ subsets, and each subset may include $N_s \times N_f$ space-frequency component vectors.

In the foregoing three cases, the oversampling factor $O_s$ may be an oversampling factor of the beam vector set, and the oversampling factor $O_f$ may be an oversampling factor of the frequency domain vector set. If the oversampling factor of the space-frequency component vector set is denoted as $O_c$, $O_c = O_s \times O_f$, $O_c > 1$, and $O_c$ is a positive integer. If the oversampling rate exists, $O_s$ and $O_f$ are not set to 1 at the same time.

When the oversampling rate is considered, each subset of the beam vector set and each subset of the frequency domain vector set may be separately determined to obtain a plurality of groups of space-frequency component vectors, and each group of space-frequency component vectors include $N_s \times N_f$ space-frequency component vectors. A rule for numbering indexes of the $N_s \times N_f$ space-frequency component vectors in each group of space-frequency component vectors may be the same as the foregoing numbering rule used when the oversampling rate is not considered. For brevity, details are not described herein again.

The following separately describes specific methods for determining and indicating, by the terminal device, the $T_1$ space-frequency component vectors and the weighting coefficients of the space-frequency component vectors when an oversampling rate is considered and when the oversampling rate is not considered.

If the oversampling rate is not considered, the terminal device may determine the $T_1$ space-frequency component vectors and the weighting coefficients of the space-frequency component vectors by using step 3-i to step 3-iv shown below.

Step 3-i: The terminal device may determine a weighting coefficient matrix based on the foregoing space-frequency vector and space-frequency component vector set.

If the oversampling rate is not considered, the space-frequency component vector set may include $N_s \times N_f$ space-frequency component vectors. The terminal device may separately project the predetermined space-frequency vector to the $N_s \times N_f$ space-frequency component vectors. That is, a conjugate transpose of each of the $N_s \times N_f$ space-frequency component vectors is multiplied by the space-frequency vector, to obtain $N_s \times N_f$ projection values. An arrangement order of the $N_s \times N_f$ projection values is corresponding to an arrangement order of the $N_s \times N_f$ space-frequency component vectors in the space-frequency component vector set.

The terminal device may arrange the $N_s \times N_f$ projection values into a matrix whose dimension is $N_s \times N_f$ according to a pre-specified arrangement order and based on an arrangement order of the $N_s \times N_f$ space-frequency component vectors in the space-frequency component vector set.

Specifically, if indexes of the $N_s \times N_f$ space-frequency component vectors in the space-frequency component vector set are one-dimensional indexes, and a rule for numbering the indexes of the $N_s \times N_f$ space-frequency component vectors is determined based on the foregoing rule 1, starting from a first projection value in the $N_s \times N_f$ projection values, the terminal device may use every $N_f$ consecutive projection values as a row, to obtain $N_s$ rows, where each row includes $N_f$ projection values. The $N_s$ rows are arranged in order from top to bottom, and a matrix W whose dimension is $N_s \times N_f$ may be obtained.

If indexes of the $N_s \times N_f$ space-frequency component vectors in the space-frequency component vector set are one-dimensional indexes, and a rule for numbering the indexes of the $N_s \times N_f$ space-frequency component vectors is determined based on the foregoing rule 2, starting from a first projection value in the $N_s \times N_f$ projection values, the terminal device may use every $N_s$ consecutive projection values as a column, to obtain $N_f$ columns, where each column includes $N_s$ projection values. The $N_f$ columns are arranged in order from left to right, and a matrix W whose dimension is $N_s \times N_f$ may be obtained.

If indexes of the $N_s \times N_f$ space-frequency component vectors in the space-frequency component vector set are two-dimensional indexes, the terminal device may directly arrange the $N_s \times N_f$ space-frequency component vectors into a matrix form based on the two-dimensional indexes. For example, space-frequency component vectors that have a same index $n_s$ are arranged in a same row, and space-frequency component vectors that have a same index $n_f$ are arranged in a same column.

The matrix W whose dimension is $N_s \times N_f$ may be referred to as a weighting coefficient matrix. $N_s \times N_f$ weighting coefficients in the matrix W may correspond to $N_s \times N_f$ space-frequency component vectors in the space-frequency component vector set, and may represent a weighting coefficient of each of the $N_s \times N_f$ space-frequency component vectors.

Step 3-ii: The terminal device may determine $M_1$ relatively strong space-frequency component vectors based on the weighting coefficient matrix.

The terminal device may separately perform modulo operations on the $N_s$ rows in the matrix W, and determine $L_1$ rows with relatively large moduli according to a modulus of each row. The $L_1$ rows with relatively large moduli are relatively strong $L_1$ rows. Further, the terminal device may separately perform modulo operations on the $N_f$ columns in the matrix W, and determine $K_1$ columns with relatively large moduli according to a modulus of each column. The $K_1$ columns with relatively large moduli are relatively strong $K_1$ columns. The terminal device may determine the $M_1$ relatively strong space-frequency component vectors in the space-frequency component vector set based on locations of the $L_1$ relatively strong rows and the $K_1$ relatively strong columns in the matrix W and according to a predefined conversion rule.

Actually, each space-frequency component vector in the space-frequency component vector set may be determined by using each beam vector in the beam vector set and each frequency domain vector in the frequency domain vector set. The $M_1$ space-frequency component vectors may be determined based on the $L_1$ relatively strong beam vectors in the beam vector set and the $K_1$ relatively strong frequency domain vectors in the frequency domain vector set. Row numbers of the foregoing determined $L_1$ relatively strong rows in the matrix W may be sequence numbers of the $L_1$ relatively strong beam vectors in the beam vector set, and column numbers of the $K_1$ relatively strong columns in the matrix W may be sequence numbers of the $K_1$ relatively strong frequency domain vectors in the frequency domain vector set.

It should be understood that the foregoing described specific method for determining, by the terminal device, the $L_1$ relatively strong rows and the $K_1$ relatively strong columns based on the weighting coefficient matrix, to determine the $M_1$ relatively strong space-frequency component vectors is merely an example for ease of understanding, and should not constitute any limitation on this application. This application does not exclude a possibility that the terminal device determines the $M_1$ relatively strong space-frequency component vectors in another manner. Provided that the $M_1$ relatively strong space-frequency component vectors determined by the terminal device may be constructed by using the $L_1$ beam vectors and the $K_1$ frequency domain vectors, all manners should fall within the protection scope of this application.

Step 3-iii: The terminal device may determine $T_1$ relatively strong space-frequency component vectors in the $M_1$ relatively strong space-frequency component vectors.

The terminal device may determine the $T_1$ relatively strong space-frequency component vectors based on moduli of weighting coefficients of the $M_1$ space-frequency component vectors. For example, a modulus of a weighting coefficient of any one of the selected $T_1$ space-frequency component vectors is greater than or equal to a modulus of any one of remaining $M_1$-$T_1$ space-frequency component vectors. In addition, weighting coefficients of the $T_1$ space-frequency component vectors can also be determined.

Step 3-iv: The terminal device generates the first indication information, to indicate the $L_1$ beam vectors, the $K_1$ frequency domain vectors, and the $T_1$ space-frequency component vectors.

Based on the $M_1$ space-frequency component vectors and the $T_1$ space-frequency component vectors that are determined in the foregoing step 3-i to step 3-iii, the first indication information may include location information of the $M_1$ space-frequency component vectors in the space-frequency component vector set or a subset of the space-frequency component vector set, and information used to indicate the $T_1$ space-frequency component vectors.

Optionally, when the first indication information is used to indicate the $M_1$ space-frequency component vectors, the first indication information may be specifically used to indicate two-dimensional indexes of the $M_1$ space-frequency component vectors, that is, indexes, in the beam vector set, of the $L_1$ beam vectors included in the $M_1$ space-frequency component vectors and indexes, in the frequency domain vector set, of the $K_1$ frequency domain vectors included in the $M_1$ space-frequency component vectors.

The specific method for indicating the $L_1$ beam vectors and the $K_1$ frequency domain vectors by using the first indication information, and bit overheads have been described in detail in the foregoing Implementation 1. For brevity, details are not described herein again.

Optionally, when the first indication information is used to indicate the $M_1$ space-frequency component vectors, the first indication information may be specifically used to indicate indexes of the $M_1$ space-frequency component vectors in the space-frequency component vector set or a subset of the space-frequency component vector set. As described above, a rule for numbering indexes of a plurality of space-frequency component vectors may be predefined in a protocol, and the terminal device and the network device may determine an index of each space-frequency component vector in the space-frequency component vector set based on the same numbering rule. That is, location information of the $M_1$ space-frequency component vectors may be an index of each space-frequency component vector in the space-frequency component vector set. In this case, the terminal device may indicate each of the $M_1$ space-frequency component vectors by using $\log_2 \lceil N_s \times N_f \rceil$ bits.

Optionally, when the first indication information is used to indicate the $M_1$ space-frequency component vectors, the first indication information may be specifically used to indicate an index of a combination of the $M_1$ space-frequency component vectors in the space-frequency component vector set. For example, a plurality of combinations of a plurality of space-frequency component vectors may be predefined in a protocol, and each combination corresponds to one index. The $M_1$ space-frequency component vectors may be one of the plurality of combinations, or may be close to one of the plurality of combinations. The first indication information may indicate the $M_1$ space-frequency component vectors by indicating an index of the combination. That is, location information of the $M_1$ space-frequency component vectors may be the index of the combination of the $M_1$ space-frequency component vectors in the space-frequency component vector set. In this case, the terminal device may indicate the $M_1$ space-frequency component vectors in the space-frequency component vector set by using $\log_2 \lceil C_{N_s \times N_f}^{M_1} \rceil$ bits.

It should be noted that, because each space-frequency component vector in the space-frequency component vector set is uniquely determined by using one beam vector and one frequency domain vector, that the first indication information is used to indicate the locations of the $M_1$ space-frequency component vector in the space-frequency component vector set may also be understood as that the first indication information is used to indirectly indicate locations, in the beam vector set and in the frequency domain vector set respectively, of a beam vector and a frequency domain vector that correspond to each space-frequency component vector. In other words, the location information of the $M_1$ space-frequency component vectors may be mutually converted into the location information of the $L_1$ beam vectors and the location information of the $K_1$ frequency domain vectors, or vice versa. Alternatively, the location information of the $M_1$ space-frequency component vectors may be equivalent to the location information of the $L_1$ beam vectors and the location information of the $K_1$ frequency domain vectors. In other words, when the first indication information is used to indicate the $M_1$ space-frequency component vectors, the first indication information is used to indirectly indicate the $L_1$ beam vectors and the $K_1$ frequency domain vectors.

It should be understood that the foregoing enumerated two methods for indicating the $M_1$ space-frequency component vectors are merely examples, and should not constitute any limitation on this application. Alternatively, the first indication information may indicate the $M_1$ space-frequency component vectors in another manner.

Optionally, the first indication information may be used to indicate the $T_1$ space-frequency component vectors in any one of the following manners:

Manner 1: The $T_1$ space-frequency component vectors in the $M_1$ space-frequency component vectors are indicated by using a bitmap (bitmap).

Manner 2: An index of a combination of the $T_1$ space-frequency component vectors in the $M_1$ space-frequency component vectors is indicated.

Manner 3: Locations, in the $L_1$ beam vectors, of beam vectors corresponding to the $T_1$ space-frequency component vectors and locations, in the $K_1$ frequency domain vectors, of frequency domain vectors corresponding to the $T_1$ space-frequency component vectors are indicated.

Manner 4: A location, in the $M_1$ space-frequency vector pairs, of each of the $T_1$ space-frequency vector pairs is indicated.

The specific process of indicating the $T_1$ space-frequency vector pairs based on the manner 1, the manner 2, the manner 3, and the manner 4, and bit overheads separately caused by the manner 1, the manner 2, the manner 3, and the manner 4 have been described in detail above. For brevity, details are not described herein again.

Optionally, the first indication information further includes quantization information of the weighting coefficients of the $T_1$ space-frequency vector pairs.

The specific process in which the first indication information is used to indicate the weighting coefficients of the $T_1$ space-frequency component vectors has been described in detail in the foregoing Implementation 1. A specific manner that is in Implementation 2 and in which the first indication information is used to indicate the weighting coefficients of the $T_1$ space-frequency component vectors may be the same as the specific manner provided in Implementation 1. For brevity, details are not described herein again.

It should be understood that the quantization information of the weighting coefficients of the $T_1$ space-frequency vector pairs may be carried in the first indication information, or may be carried in additional information. This is not limited in this application.

If the oversampling rate is considered, the terminal device may specifically determine the $T_1$ space-frequency component vectors and the weighting coefficients of the space-frequency component vectors by using step 4-i to step 4-iv shown below.

Step 4-i: The terminal device may determine a plurality of weighting coefficient matrices based on the space-frequency vectors and each subset in the space-frequency component vector set.

If the space-frequency component vector set is extended to $O_c \times N_s \times N_f$ space-frequency component vectors by using an oversampling factor $O_c$, the space-frequency component vector set may include $O_c$ subsets. The terminal device may separately project the predetermined space-frequency vector to $N_s \times N_f$ space-frequency component vectors in each subset, to obtain $O_c$ groups of projection values, where each group of projection values includes $N_s \times N_f$ projection values. For each group of projection values, an arrangement order of the $N_s \times N_f$ projection values corresponds to an arrangement order of the $N_s \times N_f$ space-frequency component vectors in each subset of the space-frequency component vector set.

The terminal device may arrange the $N_s \times N_f$ projection values into a matrix whose dimension is $N_s \times N_f$ according to a pre-specified arrangement order and based on an arrangement order of the $N_s \times N_f$ space-frequency component vectors in each subset. Therefore, $O_c$ matrices corresponding to the $O_c$ subsets may be obtained, each matrix may correspond to one subset, and each matrix may be referred to as a weighting coefficient matrix corresponding to the subset. The foregoing has described in detail a specific method for constructing a matrix with reference to a rule for numbering indexes of space-frequency component vectors in a space-frequency component vector set. For brevity, details are not described herein again.

The $O_c$ weighting coefficient matrices corresponding to the $O_c$ subsets may be denoted as $o_c = 0, 1, \ldots,$ and $O_c - 1$. In the matrix $W_{o_c}$, $N_s \times N_f$ weighting coefficients may correspond to $N_s \times N_f$ space-frequency component vectors in an $o_c^{th}$ subset in the space-frequency component vector set, and may represent weighting coefficients of all space-frequency component vectors in the subset.

Step 4-ii: The terminal device may determine $O_c$ groups of space-frequency component vectors based on the $O_c$ subsets in the space-frequency component set, where each group of space-frequency component vectors may include $T_1$ space-frequency component vectors.

The terminal device may traverse 0 to $O_c - 1$ for a value of $o_c$, and repeatedly perform the following steps, to determine the $O_c$ group of space-frequency component vectors: determining $L_1$ relatively strong rows and $K_1$ relatively strong columns based on the matrix $W_{o_c}$, to determine $M_1$ relatively strong space-frequency component vectors in the $o_c^{th}$ subset. The terminal device may further determine $T_1$ relatively strong space-frequency component vectors in the $M_1$ space-frequency component vectors.

The foregoing specific processes in which the terminal device determines the $M_1$ relatively strong space-frequency component vectors based on the weighting coefficient matrix and determines the $T_1$ relatively strong space-frequency component vectors in the $M_1$ space-frequency component vectors have been described in detail in step 3-ii and step 3-iii. For brevity, details are not described herein again.

Step 4-iii: The terminal device may select a strongest group of space-frequency component vectors based on weighting coefficient of the $O_c$ groups of space-frequency component vectors, to determine the $T_1$ space-frequency component vectors.

The terminal device may determine the strongest group of space-frequency component vectors based on the $O_c$ group space-frequency component vectors determined in step 4-ii. For example, the terminal device may calculate a sum of moduli of weighting coefficients of each group of space-frequency component vectors in the $O_c$ groups of space-frequency component vectors, and determine a group of space-frequency component vectors whose sum of moduli is the largest as the strongest group of space-frequency component vectors. Therefore, the $T_1$ space-frequency component vectors and the weighting coefficients of the space-frequency component vectors can be determined.

Because the $T_1$ space-frequency component vectors are from a same subset, when determining the $T_1$ space-frequency component vectors, the terminal device can also determine a subset to which the $T_1$ space-frequency component vectors belong. In this way, the $M_1$ relatively strong space-frequency component vectors in the subset can be determined.

Step 4-iv: The terminal device generates the first indication information, to indicate the Lt beam vectors, the $K_1$ frequency domain vectors, and the $T_1$ space-frequency component vectors.

Based on the $M_1$ space-frequency component vectors and the $T_1$ space-frequency component vectors that are determined in the foregoing step 4-i to step 4-iii, the first indication information may include location information of the $M_1$ space-frequency component vectors in the space-frequency component vector set or a subset of the space-frequency component vector set, and information used to indicate the $T_1$ space-frequency vectors component.

Optionally, when the first indication information is used to indicate the $M_1$ space-frequency component vectors, the first indication information may be specifically used to indicate location information, in the beam vector set, of $L_1$ beam vectors included in the $M_1$ space-frequency component vectors and location information, in the frequency domain vector set, of $K_1$ frequency domain vectors included in the $M_1$ space-frequency component vectors, may be specifically used to indicate a subset to which the $M_1$ space-frequency component vectors belong and indexes of the $M_1$ space-frequency component vectors in the subset, or may be specifically used to indicate a subset to which the $M_1$ space-frequency component vectors belong and an index of a combination of the $M_1$ space-frequency component vectors in the subset.

The location information of the $L_1$ beam vectors in the beam vector set may be indexes of the $L_1$ beam vectors in the beam vector set, an index of a combination of the $L_1$ beam vectors in the beam vector set, an index of a subset to which the $L_1$ beam vectors belong and indexes of the $L_1$ beam vectors in the subset, or an index of a subset to which the $L_1$ beam vectors belong and an index of a combination of the $L_1$ beam vectors in the subset.

The location information of the $K_1$ frequency domain vectors in the frequency domain vector set may be an index of the $K_1$ frequency domain vectors in the frequency domain vector set, an index of a combination of the $K_1$ frequency domain vectors in the frequency domain vector set, an index of a subset to which the $K_1$ frequency domain vectors belong and indexes of the $K_1$ frequency domain vectors in the subset, or an index of a subset to which the $K_1$ frequency domain vectors belong and an index of a combination of the $K_1$ frequency domain vectors in the subset.

It should be noted that, because each space-frequency component vector in the space-frequency component vector set is uniquely determined by using one beam vector and one frequency domain vector, that the first indication information is used to indicate the locations of the $M_1$ space-frequency component vector in the space-frequency component vector set may also be understood as that the first indication information is used to indirectly indicate locations, in the beam vector set and in the frequency domain vector set respectively, of a beam vector and a frequency domain vector that correspond to each space-frequency component vector. In other words, the location information of the $M_1$ space-frequency component vectors may be mutually converted into the location information of the $L_1$ beam vectors and the location information of the $K_1$ frequency domain vectors, or vice versa. Alternatively, the location information of the $M_1$ space-frequency component vectors may be equivalent to the location information of the $L_1$ beam vectors and the location information of the $K_1$ frequency domain vectors. In other words, when the first indication information is used to indicate the $M_1$ space-frequency component vectors, the first indication information is used to indirectly indicate the Lt beam vectors and the $K_1$ frequency domain vectors.

When the first indication information is used to indicate the $T_1$ space-frequency component vectors, a specific indication manner may be any one of the manner 1 to the manner 4 described above. The specific process of indicating the $T_1$ space-frequency component vectors based on the manner 1, the manner 2, the manner 3, and the manner 4 separately, and bit overheads separately caused by the manner 1, the manner 2, the manner 3, and the manner 4 have been described in detail above. For brevity, details are not described herein again.

Optionally, the first indication information further includes quantization information of the weighting coefficients of the $T_1$ space-frequency component vectors.

The specific process in which the first indication information is used to indicate the weighting coefficients of the $T_1$ space-frequency component vectors has been described in detail in the foregoing Implementation 1. A specific manner that is in Implementation 2 and in which the first indication information is used to indicate the weighting coefficients of the $T_1$ space-frequency component vectors may be the same as the specific manner provided in Implementation 1. For brevity, details are not described herein again.

It should be understood that the quantization information of the weighting coefficients of the $T_1$ space-frequency component vectors may be carried in the first indication information, or may be carried in additional information. This is not limited in this application.

Case B: Each space-frequency component matrix in the space-frequency component matrix set is a matrix having a dimension of $N_s \times N_f$.

It is assumed that precoding vectors of $N_f$ frequency domain units determined by the terminal device are denoted as $h_0, h_1, \ldots,$ and $h_{N_f-1}$. In the case B, the terminal device may construct, based on the precoding vectors of the $N_f$ frequency domain units, a space-frequency matrix H having a dimension of $N_s \times N_f$, where $H \mathrel{||} [h_0\ h_1\ \ldots\ h_{N_f-1}]$.

The following describes the space-frequency component matrix set in detail.

In a possible design, the space-frequency component matrix set may include $N_s \times N_f$ space-frequency component matrices. Each space-frequency component matrix may be a matrix having a dimension of $N_s \times N_f$. A weighted sum of $T_1$ space-frequency component matrices selected from the space-frequency component matrix set may be used to construct a space-frequency matrix. The space-frequency matrix obtained through construction by using the weighted sum of the $T_1$ space-frequency component matrices may be the same as or similar to the foregoing space-frequency matrix determined by the terminal device.

In this embodiment of this application, each space-frequency component matrix in the space-frequency component matrix set may be uniquely determined by one beam matrix in the beam matrix set and one frequency domain matrix in the frequency domain matrix set. In other words, any two space-frequency component matrices in the space-frequency component matrix set are different, and any two space-frequency component matrices have a difference in at least one of corresponding beam matrices and frequency domain matrices. Specifically, each space-frequency component matrix in the space-frequency component matrix set may be a product of a beam vector in the beam vector set and a conjugate transpose of a frequency domain vector in the frequency domain vector set.

As described above, if the oversampling rate is not considered, the space-frequency component matrix set may include $N_s \times N_f$ space-frequency component matrices. Each space-frequency component matrix may correspond to one beam vector and one frequency domain vector, or each space-frequency component matrix may correspond to a space-frequency vector pair obtained by combining one beam vector and one frequency domain vector.

Each space-frequency component matrix in the space-frequency component matrix set may correspond to one one-dimensional index, or may correspond to one two-dimensional index. That is, the $N_s \times N_f$ space-frequency component matrices in the space-frequency component matrix set may be indicated by using indexes in the space-frequency component matrix set or the subsets of the space-frequency component matrix set, or may be indicated by using indexes, in the beam vector set and the frequency domain vector set respectively, of a beam vector and a frequency domain vector that may be used to generate a space-frequency component matrix. In the foregoing case A, a correspondence between each space-frequency component matrix and a one-dimensional index and a rule for conversion between a one-dimensional index and a two-dimensional index have been described in detail with reference to the numbering rule 1 and the numbering rule 2. For brevity, details are not described herein again.

If the oversampling rate is considered, the space-frequency component matrix set may be extended to $O_c \times N_s \times N_f$ space-frequency component matrices by using an oversampling factor $O_c$. The space-frequency component matrix set may include $O_c$ subsets, and each subset may include $N_s \times N_f$ space-frequency component matrices. A rule for numbering an index of a space-frequency component matrix in each subset may be the same as the numbering rule used when the oversampling rate is not considered. For brevity, details are not described herein again.

The following separately describes specific methods for determining and indicating, by the terminal device, the $T_1$ space-frequency component matrices and the weighting coefficients of the space-frequency component matrices when an oversampling rate is considered and when the oversampling rate is not considered.

If the oversampling rate is not considered, the terminal device may determine the $T_1$ space-frequency component matrices and the weighting coefficients of the space-frequency component matrices by using step 5-i to step 5-iv shown below.

Step 5-i: The terminal device may determine a weighting coefficient based on the space-frequency matrix and the space-frequency component matrix set.

If the oversampling rate is not considered, the space-frequency component matrix set may include $N_s \times N_f$ space-frequency component matrices, and a dimension of each space-frequency component matrix may be $N_s \times N_f$. The terminal device may determine $N_s \times N_f$ weighting coefficients based on the predetermined space-frequency matrix and the $N_s \times N_f$ space-frequency component matrices.

Specifically, the terminal device may separately sum a product of a conjugate of each element in each space-frequency component matrix and a corresponding element in the space-frequency matrix, to obtain $N_s \times N_f$ values corresponding to the $N_s \times N_f$ space-frequency component matrices. For example, an element in one space-frequency component matrix in the space-frequency component matrix set is denoted as $a_{p,q}$ (p=0, 1, ..., $N_s$-1, and q=0, 1, ..., $N_f$-1), and an element in the space-frequency matrix is denoted as $b_{p,q}$. Therefore, a sum of products of conjugates of elements in each space-frequency component matrix and corresponding elements in the space-frequency matrix may be represented as $$\sum_{q=0}^{N_f-1} \sum_{p=0}^{N_s-1} \bar{a}_{p,q} b_{p,q}.$$

$\bar{a}_{p,q}$ represents a conjugate of an element $a_{p,q}$. This step is repeatedly performed on $N_s \times N_f$ space-frequency component matrices in the space-frequency component matrix set, to obtain the $N_s \times N_f$ values. The $N_s \times N_f$ values may be considered as the $N_s \times N_f$ weighting coefficients.

The foregoing step may be implemented by performing a matrix operation. For example, the $N_s \times N_f$ values may be obtained by calculating a trace of a product of a conjugate transpose of each space-frequency component matrix and the space-frequency matrix.

Then, the terminal device may arrange the $N_s \times N_f$ values into a matrix whose dimension is $N_s \times N_f$ according to a pre-specified arrangement order and based on an arrangement order of the $N_s \times N_f$ space-frequency component matrices in the space-frequency component matrix set. A specific process in which the terminal device arranges the $N_s \times N_f$ values into the matrix whose dimension is $N_s \times N_f$ according to the pre-specified order has been described in detail in the foregoing case A. For brevity, details are not described herein again.

The matrix W whose dimension is $N_s \times N_f$ may be referred to as a weighting coefficient matrix. $N_s \times N_f$ weighting coefficients in the matrix W may correspond to $N_s \times N_f$ space-frequency component matrices in the space-frequency component matrix set, and may represent a weighting coefficient of each of the $N_s \times N_f$ space-frequency component matrices.

Step 5-ii: The terminal device may determine $M_1$ relatively strong space-frequency component matrices based on the weighting coefficient matrix.

A specific method used by the terminal device to determine the $M_1$ space-frequency component matrices based on the weighting coefficient matrix is the same as the specific method used by the terminal device to determine the $M_1$ relatively strong space-frequency component vectors based on the weighting coefficient matrix in step 3-ii in the foregoing case A. Because the specific method has described in detail above, for brevity, details are not described herein again.

Step 5-iii: The terminal device may determine $T_1$ relatively strong space-frequency component matrices in the $M_1$ space-frequency component matrices.

The terminal device may determine the $T_1$ relatively strong space-frequency component matrices based on moduli of weighting coefficients of the $M_1$ space-frequency component matrices. For example, a modulus of a weighting coefficient of any one of the selected $T_1$ space-frequency component matrices is greater than or equal to a modulus of any one of remaining $M_1$-$T_1$ space-frequency component matrices. In addition, weighting coefficients of the $T_1$ space-frequency component matrices can also be determined.

Step 5-iv: The terminal device generates the first indication information, to indicate the $L_1$ beam vectors, the $K_1$ frequency domain vectors, and the $T_1$ space-frequency component matrices.

Based on the $M_1$ space-frequency component matrices and the $T_1$ space-frequency component matrices that are determined in the foregoing step 5-i to step 5-iii, the first indication information may include location information of the $M_1$ space-frequency component matrices in the space-frequency component matrix set or a subset of the space-frequency component matrix set, and information used to indicate the $T_1$ space-frequency component matrices.

Optionally, the first indication information further includes quantization information of the weighting coefficients of the $T_1$ space-frequency component matrices.

In the foregoing case A, the specific method for indicating the $M_1$ space-frequency component matrices, the $T_1$ space-frequency component matrices, and the weighting coefficients of the space-frequency component matrices by using the first indication information, and bit overheads have been described in detail. Bit overheads and a specific method for indicating the $M_1$ space-frequency component matrices, the $T_1$ space-frequency component matrices, and the weighting coefficients of the space-frequency component matrices by using the first indication information in the case B are the same as the method shown in the case A. For brevity, details are not described herein again.

It should be noted that, because each space-frequency component matrix in the space-frequency component matrix set is uniquely determined by using one beam vector and one frequency domain vector, that the first indication information is used to indicate the locations of the $M_1$ space-frequency component matrix in the space-frequency component matrix set may also be understood as that the first indication information is used to indirectly indicate locations, in the beam vector set and in the frequency domain vector set respectively, of a beam vector and a frequency domain vector that correspond to each space-frequency component matrix. In other words, the location information of the $M_1$ space-frequency component matrices may be mutually converted into the location information of the $L_1$ beam vectors and the location information of the $K_1$ frequency domain vectors, or vice versa. Alternatively, the location information of the $M_1$ space-frequency component matrices may be equivalent to the location information of the $L_1$ beam vectors and the location information of the $K_1$ frequency domain vectors. In other words, when the first indication information is used to indicate the $M_1$ space-frequency component matrices, the first indication information is used to indirectly indicate the $L_1$ beam vectors and the $K_1$ frequency domain vectors.

It should be understood that the quantization information of the weighting coefficients of the $T_1$ space-frequency component matrices may be carried in the first indication information, or may be carried in additional information. This is not limited in this application.

If the oversampling rate is considered, the terminal device may specifically determine the $T_1$ space-frequency component matrices and the weighting coefficients of the space-frequency component matrices by using step 6-i to step 6-iv shown below.

Step 6-i: The terminal device may determine a plurality of weighting coefficient matrices based on the space-frequency vectors and each subset in the space-frequency component matrix set.

If the space-frequency component matrix set is extended to $O_c \times N_s \times N_f$ space-frequency component matrices by using an oversampling factor $O_c$, the space-frequency component matrix set may include $O_c$ subsets. The terminal device may determine $O_c$ groups of weighting coefficients based on the predetermined space-frequency matrix and the $O_c$ subsets, and each group of weighting coefficients includes $N_s \times N_f$ weighting coefficients. For a specific method for determining each group of weighting coefficients by the terminal device, refer to the foregoing implementation in step 5-i. For brevity, details are not described herein again. For each group of weighting coefficients, an arrangement order of the $N_s \times N_f$ values corresponds to an arrangement order of the $N_s \times N_f$ space-frequency component matrices in each subset of the space-frequency component matrix set.

The terminal device may arrange the $N_s \times N_f$ weighting coefficients into a matrix whose dimension is $N_s \times N_f$ according to a pre-specified arrangement order and based on an arrangement order of the $N_s \times N_f$ space-frequency component matrices in each subset. Therefore, $O_c$ matrices corresponding to the $O_c$ subsets may be obtained, each matrix may correspond to one subset, and each matrix may be referred to as a weighting coefficient matrix corresponding to the subset. The foregoing has described in detail a specific method for constructing a matrix with reference to a rule for numbering indexes of space-frequency component matrices in a space-frequency component matrix set. For brevity, details are not described herein again.

The $O_c$ weighting coefficient matrices corresponding to the $O_c$ subsets may be denoted as $o_c = 0, 1, \ldots,$ and $O_c - 1$. In the matrix $W_{o_c}$, $N_s \times N_f$ weighting coefficients may correspond to $N_s \times N_f$ space-frequency component matrices in an $o_c^{th}$ subset in the space-frequency component matrix set, and may represent weighting coefficients of all space-frequency component matrices in the subset.

Step 6-ii: The terminal device may determine $O_c$ groups of space-frequency component matrices based on the $O_c$ subsets in the space-frequency component set, where each group of space-frequency component matrices may include $T_1$ space-frequency component matrices.

The terminal device may traverse 0 to $O_c - 1$ for a value of $o_c$, and repeatedly perform the following steps, to determine the $O_c$ group of space-frequency component matrices: determining $L_1$ relatively strong rows and $K_1$ relatively strong columns based on the matrix $W_{o_c}$, to determine $M_1$ relatively strong space-frequency component matrices in the $o_c^{th}$ subset. The terminal device may further determine $T_1$ relatively strong space-frequency component matrices in the $M_1$ space-frequency component matrices.

The foregoing specific processes in which the terminal device determines the $M_1$ relatively strong space-frequency component matrices based on the weighting coefficient matrix and determines the $T_1$ relatively strong space-frequency component matrices in the $M_1$ space-frequency component matrices have been described in detail in step 3-ii and step 3-iii. For brevity, details are not described herein again.

Step 6-iii: The terminal device may select a strongest group of space-frequency component matrices based on weighting coefficient of the $O_c$ groups of space-frequency component matrices, to determine the $T_1$ space-frequency component matrices.

The terminal device may determine the strongest group of space-frequency component matrices based on the $O_c$ group space-frequency component matrices determined in step 6-ii. For example, the terminal device may calculate a sum of moduli of weighting coefficients of each group of space-frequency component matrices in the $O_c$ groups of space-frequency component matrices, and determine a group of space-frequency component matrices whose sum of moduli is the largest as the strongest group of space-frequency component matrices. Therefore, the $T_1$ space-frequency component matrices and the weighting coefficients of the space-frequency component matrices can be determined.

Because the $T_1$ space-frequency component matrices are from a same subset, when determining the $T_1$ space-frequency component matrices, the terminal device can also determine a subset to which the $T_1$ space-frequency component matrices belong. In this way, the $M_1$ relatively strong space-frequency component matrices in the subset can be determined.

Step 6-iv: The terminal device generates the first indication information, to indicate the $L_1$ beam vectors, the $K_1$ frequency domain vectors, and the $T_1$ space-frequency component matrices.

Based on the $M_1$ space-frequency component matrices and the $T_1$ space-frequency component matrices that are determined in the foregoing step 6-i to step 6-iii, the first indication information may include location information of the $M_1$ space-frequency component matrices in the space-frequency component matrix set or a subset of the space-frequency component matrix set, and information used to indicate the $T_1$ space-frequency component matrices.

Optionally, the first indication information further includes quantization information of the weighting coefficients of the $T_1$ space-frequency component matrices.

In the foregoing case A, the specific method for indicating the $M_1$ space-frequency component matrices, the $T_1$ space-frequency component matrices, and the weighting coefficients of the space-frequency component matrices by using the first indication information, and bit overheads have been described in detail. Bit overheads and a specific method for indicating the $M_1$ space-frequency component matrices, the $T_1$ space-frequency component matrices, and the weighting coefficients of the space-frequency component matrices by using the first indication information in the case B are the same as the method shown in the case A. For brevity, details are not described herein again.

It should be noted that, because each space-frequency component matrix in the space-frequency component matrix set is uniquely determined by using one beam vector and one frequency domain vector, that the first indication information is used to indicate the locations of the $M_1$ space-frequency component matrix in the space-frequency component matrix set may also be understood as that the first indication information is used to indirectly indicate locations, in the beam vector set and in the frequency domain vector set respectively, of a beam vector and a frequency domain vector that correspond to each space-frequency component matrix. In other words, the location information of the $M_1$ space-frequency component matrices may be mutually converted into the location information of the $L_1$ beam vectors and the location information of the $K_1$ frequency domain vectors, or vice versa. Alternatively, the location information of the $M_1$ space-frequency component matrices may be equivalent to the location information of the $L_1$ beam vectors and the location information of the $K_1$ frequency domain vectors. In other words, when the first indication information is used to indicate the $M_1$ space-frequency component matrices, the first indication information is used to indirectly indicate the $L_1$ beam vectors and the $K_1$ frequency domain vectors.

It should be understood that the quantization information of the weighting coefficients of the $T_1$ space-frequency component matrices may be carried in the first indication information, or may be carried in additional information. This is not limited in this application.

It should be further understood that the foregoing method for determining the $L_1$ relatively strong rows and the $K_1$ relatively strong columns by using the weighting coefficient matrix is merely a possible implementation shown for ease of understanding, but this does not indicate that the terminal device definitely generates the weighting coefficient matrix when determining the $L_1$ relatively strong rows and the $K_1$ relatively strong columns. For example, the terminal device may determine a plurality of weighting coefficients based on a precoding vector of each frequency domain unit and each space-frequency component matrix in the space-frequency component matrix set. The plurality of weighting coefficients may form an array set, and elements in the array set may be obtained by sequentially connecting elements in rows (or columns) in the foregoing weighting coefficient matrix.

For another example, for a method for obtaining the beam vector by the terminal device, refer to a type II codebook feedback manner defined in an NR protocol. A frequency domain vector is obtained by comparing at least one composition element (for example, but not limited to, a weighting coefficient that is of a beam vector and that constitutes a precoding vector) of the precoding vector of each frequency domain unit at a same transport layer in a same polarization direction, to obtain a change rule in frequency domain. A same group of frequency domain vectors may be used in different polarization directions.

It should be further understood that the foregoing enumerated specific method used by the terminal device to determine the $T_1$ relatively strong space-frequency component matrices in the $M_1$ space-frequency component matrices is merely an example, and should not constitute any limitation on this application. The terminal device may determine the $T_1$ relatively strong space-frequency component matrices in the $M_1$ space-frequency component matrices by referring to a method in the current technology. For brevity, details are not described herein.

It should be further understood that the foregoing listed specific method for determining and indicating the weighting coefficients of the $T_1$ space-frequency vector pairs (or the $T_1$ space-frequency component vectors, or the $T_1$ space-frequency component matrices) and the foregoing listed signaling are merely examples. Specific signaling and a specific method for determining and indicating the weighting coefficients of the $T_1$ space-frequency vector pairs (or the $T_1$ space-frequency component vectors, or the $T_1$ space-frequency component matrices) are not limited in this application, and may be the same as those in the current technology.

It should be noted that, because each space-frequency component matrix in the space-frequency component matrix set is uniquely determined by using one beam vector and one frequency domain vector, that the first indication information is used to indicate the locations of the $M_1$ space-frequency component matrix in the space-frequency component matrix set may also be understood as that the first indication information is used to indirectly indicate locations, in the beam vector set and in the frequency domain vector set respectively, of a beam vector and a frequency domain vector that correspond to each space-frequency component matrix. In other words, the location information of the $M_1$ space-frequency component matrices may be mutually converted into the location information of the $L_1$ beam vectors and the location information of the $K_1$ frequency domain vectors, or vice versa.

Based on the foregoing enumerated implementations of the terminal device in different cases, the terminal device may generate the first indication information, to indicate the $L_1$ beam vectors, the $K_1$ frequency domain vectors, and the $T_1$ space-frequency component matrices that are selected, and the weighting coefficients of the space-frequency component matrices.

In step 220, the terminal device sends the first indication information. Correspondingly, in step 220, the network device receives the first indication information.

Specifically, the first indication information may be a PMI, may be some information elements in a PMI, or may be other information. This is not limited in this application. The first indication information may be carried in one or more messages in the current technology and sent by the terminal device to the network device, or may be carried in one or more messages newly designed in this application and sent by the terminal device to the network device. For example, the terminal device may send the first indication information to the network device by using a physical uplink resource such as a physical uplink shared channel (physical uplink share channel, PUSCH) or a physical uplink control channel (physical uplink control channel, PUCCH), so that the network device restores the precoding vector based on the first indication information.

A specific method used by the terminal device to send the first indication information to the network device by using the physical uplink resource may be the same as that in the current technology. For brevity, detailed descriptions of a specific sending process are omitted herein.

In step 230, the network device determines a precoding vector of one or more frequency domain units based on the first indication information.

It has been described in step 210 that the terminal device may generate the first indication information based on two different implementations. In the implementations, in the first indication information, information used to indicate the $L_1$ beam vectors and information used to indicate the $K_1$ frequency domain vectors may be different, or may be the same. The following describes in detail a specific process in which the network device determines the precoding vector of the one or more frequency domain units based on the first indication information.

Optionally, the first indication information includes the location information of the $L_1$ beam vectors, the location information of the $K_1$ frequency domain vectors, and the information used to indicate the $T_1$ space-frequency component matrices.

First, the network device may determine the selected $L_1$ beam vectors and the selected $K_1$ frequency domain vectors based on the location information of the $L_1$ beam vectors and the location information of the $K_1$ frequency domain vectors.

For example, the network device may determine the selected $L_1$ beam vectors in the beam vector set based on the index, indicated by using the first indication information, of the combination of the $L_1$ beam vectors in the beam vector set, and a predefined correspondence between a beam vector combination and an index. Further, the network device may determine the selected $K_1$ frequency domain vectors in the frequency domain vector set based on the index, indicated by using the first indication information, of the combination of the $K_1$ frequency domain vectors in the frequency domain vector set, and a predefined correspondence between a frequency domain vector combination and an index. The $L_1$ beam vectors and the $K_1$ frequency domain vectors may be combined to obtain $M_1$ space-frequency vector pairs.

Then, the network device may determine the $T_1$ space-frequency component matrices in the $M_1$ space-frequency vector pairs based on the information used to indicate the $T_1$ space-frequency component matrices.

As described above, the first indication information may be used to indicate the $T_1$ space-frequency vector pairs to the network device in different manners. For example, in the manner 1, the first indication information is used to indicate the selected $T_1$ space-frequency vector pairs in the $M_1$ space-frequency vector pairs by using the bitmap, and the network device may determine the selected $T_1$ space-frequency vector pairs based on a one-to-one correspondence between bits in the bitmap and the $M_1$ space-frequency vector pairs. In the manner 2, the first indication information is used to indicate the $T_1$ space-frequency vector pairs by using the index of the combination of the $T_1$ space-frequency vector pairs in the $M_1$ space-frequency vector pairs, and the network device may determine the $T_1$ space-frequency vector pairs based on the predefined correspondence between a combination of space-frequency vector pairs and an index. In the manner 3, the first indication information is used to indicate the $T_1$ space-frequency vector pairs by using the location of the beam vector included in each of the $T_1$ space-frequency vector pairs and the location of the frequency domain vector included in each of the $T_1$ space-frequency vector pairs, and the network device may determine the $T_1$ beam vectors and the $T_1$ frequency domain vectors based on the location information of the beam vectors and the location information of the frequency domain vectors, and further combine the $T_1$ beam vectors and the $T_1$ frequency domain vectors to obtain the $T_1$ space-frequency vector pairs.

Then, the network device may determine a quantized value of a weighting coefficient of each space-frequency vector pair based on quantized information of the weighting coefficient of each space-frequency vector pair. As described above, the weighting coefficient of each space-frequency vector pair may be carried in the first indication information or other information. For example, the network device may determine the quantized value of the weighting coefficient of each space-frequency vector pair based on a predefined one-to-one correspondence between a plurality of quantized values and a plurality of indexes.

The space-frequency matrix is determined based on the $T_1$ space-frequency vector pairs and the quantized value of the weighting coefficient of each space-frequency vector pair. For example, the network device may determine the space-frequency matrix based on the following formula:

$$H = \sum_{t_1=0}^{T_1-1} a_{t_1} u_{s,t_1} u_{f,t_1}^+, \text{ or } H = \sum_{t_1=0}^{T_1-1} a_{t_1} u_{f,t_1} \otimes u_{s,t_1}.$$

$u_{s,t_1}$ represents a $t_1^{th}$ beam vector in the $T_1$ beam vectors, and $u_{f,t_1}$ represents a $t_1^{th}$ frequency domain vector in the $T_1$ frequency domain vectors. $a_{t_1}$ represents a weighting coefficient corresponding to a $t_1^{th}$ space-frequency component matrix. The space-frequency matrix H in the formula may be the same as or similar to the space-frequency matrix determined by the terminal device, and is a space-frequency matrix restored by the network device based on the first indication information. Because the space-frequency matrix may be obtained by constructing precoding vectors corresponding to the $N_f$ frequency domain units, the network device may determine, based on an $n_f^{th}$ column vector in the matrix H, a precoding vector corresponding to an $n_f^{th}$ frequency domain unit.

Alternatively, the network device may generate the $T_1$ space-frequency component matrices after determining the $T_1$ space-frequency vector pairs. For example, a $t_1^{th}$ space-frequency component matrix in the $T_1$ space-frequency component matrices may be denoted as $U_{t_1}$, where $U_{t_1} = u_{s,t_1} u_{f,t_1}^*$, $U_{t_1} = u_{f,t_1} \otimes u_{s,t_1}$, or the like.

Then, the network device may determine the space-frequency matrix based on the $T_1$ space-frequency component matrices and the quantized values of the weighting coefficients of the space-frequency component matrices. For example, the network device may determine the space-frequency matrix H based on the following formula:

$$H = \sum_{t_1=0}^{T_1-1} a_{t_1} U_{t_1}.$$

Parameters in the formula have been described in detail above. For brevity, details are not described herein again.

The network device may determine, based on the space-frequency matrix, a precoding vector corresponding to each frequency domain unit.

If the space-frequency matrix is a matrix whose dimension is $N_s \times N_f$, each column vector in the matrix may correspond to one frequency domain unit, and may be used to determine a precoding vector of the corresponding frequency domain unit. If the space-frequency matrix is a vector whose length is $N_s \times N_f$, a column vector obtained by sequentially connecting an $(n_f \times N_s)^{th}$ element to an $[(n_f+1) N_s-1]^{th}$ element in the vector may be a column vector corresponding to an $n_f^{th}$ frequency domain unit.

An $n_f^{th}$ column vector in the space-frequency matrix is used as an example. The network device may perform normalization processing on the $n_f^{th}$ column vector, to determine a precoding vector corresponding to the $n_f^{th}$ frequency domain unit. The normalization processing may be, for example, multiplying the $n_f^{th}$ column vector by a normalization coefficient, so that a sum of powers of elements in the column vector is equal to 1. A normalization coefficient may be, for example, a reciprocal of a square root of a sum of moduli of the elements in the column. A specific value of the normalization coefficient and a specific manner of the normalization processing are not limited in this application.

Optionally, the first indication information includes the location information of the $M_1$ space-frequency component matrices and the information used to indicate the $T_1$ space-frequency component matrices.

As described above, the location information of the $M_1$ space-frequency component matrices may be one-dimensional indexes of the $M_1$ space-frequency component matrices, or may be two-dimensional indexes of the $M_1$ space-frequency component matrices.

If the location information of the $M_1$ space-frequency component matrices is one-dimensional indexes of the $M_1$ space-frequency component matrices, and a vector set pre-stored by the network device is a space-frequency component matrix set, the network device may directly determine the $M_1$ space-frequency component matrices in the space-frequency component matrix set based on the one-dimensional indexes.

If the location information of the $M_1$ space-frequency component matrices is one-dimensional indexes of the $M_1$ space-frequency component matrices, and vector sets pre-stored by the network device are a beam vector set and a frequency domain vector set, the network device may determine, in the beam vector set and the frequency domain vector set based on a predefined rule for conversion between a one-dimensional index and a two-dimensional index, the $L_1$ beam vectors and the $K_1$ frequency domain vectors that are used to generate the $M_1$ space-frequency component matrices.

If the location information of the $M_1$ space-frequency component matrices is two-dimensional indexes of the $M_1$ space-frequency component matrices, and vector sets pre-stored by the network device are a beam vector set and a frequency domain vector set, the network device may directly determine, in the beam vector set and the frequency domain vector set based on the two-dimensional indexes, the $L_1$ beam vectors and the $K_1$ frequency domain vectors that are used to generate the $M_1$ space-frequency component matrices.

If the location information of the $M_1$ space-frequency component matrices is two-dimensional indexes of the $M_1$ space-frequency component matrices, and a vector set pre-stored by the network device is a space-frequency component matrix set, the network device may determine the $M_1$ space-frequency component matrices in the space-frequency component matrix set based on a predefined rule for conversion between a one-dimensional index and a two-dimensional index.

Then, the network device may further determine the $T_1$ space-frequency component matrices in the $M_1$ space-frequency component matrices, and may further determine the quantized values of the weighting coefficients of the space-frequency component matrices based on the quantized information of the weighting coefficients of the space-frequency component matrices.

A specific method for determining, by the network device, the space-frequency matrix based on the $T_1$ space-frequency component matrices and the quantized values of the weighting coefficients of the space-frequency component matrices has been described in detail above. For example, the network device may determine the space-frequency matrix based on a formula $$H = \sum_{t_1=0}^{T_1-1} a_{t_1} U_{t_1}.$$

Then, the network device may determine the precoding vector of the one or more frequency domain units. A specific method for determining, by the network device, the precoding vector based on the space-frequency matrix has described in detail above. For brevity, details are not described herein again.

It should be understood that the foregoing listed two specific methods for determining the precoding vector of each frequency domain unit are merely examples, and should not constitute any limitation on this application. The network device may not generate the space-frequency matrix, but directly determine the precoding vector of the one or more frequency domain units based on the $L_1$ beam vectors and the $K_1$ frequency domain vectors that are indicated by the terminal device.

For example, the network device may determine a precoding vector $w_{n_f}$ of an $n_f^{th}$ frequency domain unit based on the following formula:

$$w_{n_f} = \frac{1}{P_{n_f}} \left[ \sum_{t_1=0}^{T_1-1} u_{s,t_1} a_{t_1} \bar{u}_{f,t_1,n_f} \right].$$

$\frac{1}{P_{n_f}}$ is a normalization coefficient, $P_{n_f} > 0$, $u_{s,t_1}$ represents a $t_1^{th}$ beam vector in the selected $T_1$ beam vectors, $\bar{u}_{f,t,n_f}$ represents a conjugate of $u_{f,t,n_f}$, $u_{f,t,n_f}$ represents an $n_f^{th}$ element in a $t_1^{th}$ frequency domain vector $u_{f,t_1}$ in the selected $T_1$ frequency domain vectors, and $a_{t_1}$ represents a weighting coefficient corresponding to the $t_1^{th}$ beam vector $u_{s,t_1}$ and an $n_f^{th}$ element $\bar{u}_{f,t,n_f}$ in the $t_1^{th}$ frequency domain vector $u_{f,t_1}$, where the weighting coefficient may include, for example, an amplitude coefficient and a phase coefficient.

The foregoing formula may be further transformed into:

$$w_{n_f} = \frac{1}{P_{n_f}} \left[ \sum_{t_1=0}^{T_1-1} v_{s,t_1} c_{t_1} \bar{u}_{f,t_1,n_f} \right].$$

$v_{s,t_1}$ is determined by the $t_1^{th}$ beam vector in the selected $T_1$ beam vectors and the wideband amplitude coefficient, and the weighting coefficient $c_{t_1}$ may satisfy $a_{t_1} = p_{t_1} c_{t_1}$.

It should be noted that, as described above, the length $N_f$ of the frequency domain vector may be a quantity of frequency domain units included in a frequency domain occupation bandwidth of a CSI measurement resource configured for the terminal device, or a signaling length of a reporting band, or a quantity of to-be-reported frequency domain units. When the length of the frequency domain vector is the quantity of frequency domain units included in the frequency domain occupation bandwidth of the CSI measurement resource configured for the terminal device or the signaling length of the reporting band, the quantity of to-be-reported frequency domain units may be less than or equal to $N_f$. Therefore, the network device may determine a precoding vector of each frequency domain unit based on a location that is of a to-be-reported frequency domain unit and that is indicated by the reporting band or other signaling.

When the length of the frequency domain vector is determined based on the quantity of frequency domain units included in the frequency domain occupation bandwidth of the CSI measurement resource or the signaling length of the reporting band, a change rule of a channel in a plurality of consecutive frequency domain units may be reflected by using the frequency domain vector. Compared with the method in which the length of the frequency domain vector is determined based on the quantity of to-be-reported frequency domain units, this method ensures that the frequency domain vector determined based on the quantity of frequency domain units in the frequency domain occupation bandwidth of the CSI measurement resource or the signaling length of the reporting band can more accurately reflect a change rule of a channel in frequency domain, and a precoding vector restored based on feedback is also more adaptable to the channel.

It should be understood that the foregoing listed specific method in which the network device determines, based on the first indication information, the precoding vector corresponding to the $n_f^{th}$ frequency domain unit is merely an example, and should not constitute any limitation on this application. This application does not exclude a possibility that the network device determines, based on the first indication information in another manner, the precoding vector corresponding to the $n_f^{th}$ frequency domain unit.

Based on the foregoing technical solutions, the terminal device indicates a small quantity of beam vectors, frequency domain vectors, and space-frequency component matrices to the network device to help the network device restore a precoding vector. The frequency domain vector may be used to describe different change rules of a channel in frequency domain. The terminal device may simulate a change of a channel in frequency domain through linear superposition of one or more frequency domain vectors, so that a relationship between frequency domain units is fully explored, continuity of frequency domain is utilized, and a change rule on a plurality of frequency domain units is described by using a relatively small quantity of frequency domain vectors. Compared with the current technology, this application does not require that a weighting coefficient be independently reported based on each frequency domain unit, and an increase in frequency domain units does not cause multiplication of feedback overheads. Therefore, feedback overheads can be greatly reduced while feedback precision is ensured.

However, because the beam vector set may include a relatively large quantity of beam vectors, and the frequency domain vector set may include a relatively large quantity of frequency domain vectors, if a relatively small quantity of beam vectors and a relatively small quantity of frequency domain vectors are directly indicated in the beam vector set and the frequency domain vector set, relatively high bit overheads may be caused, or the terminal device and the network device need to predefine a large quantity of correspondences between beam vector combinations and indexes and a large quantity of correspondences between frequency domain vector combinations and indexes.

However, in this embodiment of this application, the terminal device narrows selection ranges of the beam vectors and the frequency domain vectors that are used for weighted summation to a range of the $M_1$ space-frequency component matrices constructed by using the $L_1$ beam vectors and the $K_1$ frequency domain vectors. That is, the terminal device first selects a relatively small range of vectors from an existing vector set, and then selects $T_1$ space-frequency component matrices from the range and indicates the $T_1$ space-frequency component matrices. On one hand, relatively high feedback overheads caused by directly indicating the $T_1$ space-frequency component matrices can be avoided. On the other hand, a large quantity of correspondences may not need to be stored on both the terminal device and the network device.

A specific process in which the terminal device indicates a precoding vector in one polarization direction at one transport layer and the network device determines the precoding vector is described above in detail with reference to FIG. 2. However, it should be understood that the method is not only applicable to a case in which there is one transport layer or one polarization direction, but also applicable to a case in which there are a plurality of transport layers or a plurality of polarization directions.

For a same transport layer, $T_1$ space-frequency component matrices (or $T_1$ space-frequency vector pairs) selected for a plurality of polarization directions may be the same. That is, same $T_1$ space-frequency component matrices (or $T_1$ space-frequency vector pairs) are shared in a plurality of polarization directions, or different space-frequency component matrices (or space-frequency vector pairs) may be separately used in a plurality of polarization directions.

For ease of description below, a case in which there are a plurality of polarization directions or a plurality of transport layers is described by using a space-frequency component matrix as an example. The space-frequency component matrix may include the foregoing listed matrix form or vector form. It may be understood that the space-frequency component matrix is merely a possible form, and may also be represented in a form of a space-frequency vector pair. In other words, the space-frequency component matrix in the following descriptions may also be replaced with a space-frequency vector pair.

Optionally, the first indication information is used to indicate a precoding vector of each frequency domain unit in one or more polarization directions.

When a plurality of polarization directions share same $T_1$ space-frequency component matrices, $L_1$ beam vectors and $K_1$ frequency domain vectors that are used to determine the $T_1$ space-frequency component matrices may also be shared in the plurality of polarization directions. In this case, in the plurality of pieces of first indication information corresponding to the plurality of polarization directions, information used to indicate the $L_1$ beam vectors, the $K_1$ frequency domain vectors, and the $T_1$ space-frequency component matrices may be shared. For example, the terminal device may use a bitmap whose length is $L_1 \times K_1$ to indicate $T_1$ space-frequency component matrices used in each of the plurality of polarization directions.

If the first indication information is used only to indicate the $L_1$ beam vectors, the $K_1$ frequency domain vectors, and the $T_1$ space-frequency component matrices, the terminal device may generate and send only one piece of first indication information for a plurality of polarization directions. If the first indication information is further used to indicate weighting coefficients of the $T_1$ space-frequency component matrices, the terminal device may send one piece of first indication information for each polarization direction. Because in the plurality of pieces of first indication information corresponding to the plurality of polarization directions, the information used to indicate the $L_1$ beam vectors, the $K_1$ frequency domain vectors, and the $T_1$ space-frequency component matrices may be shared, the terminal device may indicate the $L_1$ beam vectors, the $K_1$ frequency domain vectors, and the $T_1$ space-frequency component matrices only once, and weighting coefficients of space-frequency component matrices that correspond to different polarization directions may be separately indicated by using different first indication information. For brevity, descriptions of a same or similar case are omitted below.

The terminal device may use, in a plurality of polarization directions, $L_1$ beam vectors, $K_1$ frequency domain vectors, and $T_1$ space-frequency component matrices that are determined based on a polarization direction. A specific polarization direction based on which the terminal device determines the $L_1$ beam vectors, the $K_1$ frequency domain vectors, and the $T_1$ space-frequency component matrices may be predefined, for example, defined in a protocol. This is not limited in this application.

Alternatively, the terminal device may determine $T_1$ space-frequency component matrices based on each polarization direction, to obtain a plurality of groups of space-frequency component matrices. The terminal device selects a group of space-frequency component matrices from the plurality of groups of space-frequency component matrices for use in a plurality of polarization directions. A sum of moduli of weighting coefficients of the selected group of space-frequency component matrices may be greater than or equal to a sum of moduli of weighting coefficients of any group of space-frequency component matrices in one or more remaining groups of space-frequency component matrices.

When different space-frequency component matrices are separately used in a plurality of polarization directions, quantities of space-frequency component matrices used in the different polarization directions may be the same or may be different. Quantities of beam vectors used to determine space-frequency component matrices in all polarization directions may be the same or may be different, and quantities of frequency domain vectors used to determine the space-frequency component matrices in all the polarization directions may be the same or may be different. These are not limited in this application. In this case, in the plurality of pieces of first indication information corresponding to the plurality of polarization directions, information that is about beam vectors, frequency domain vectors, and space-frequency component matrices and that corresponds to different polarization directions may be different from each other. The terminal device may separately indicate, based on each polarization direction, a selected beam vector, a selected frequency domain vector, and a space-frequency component matrix used for weighted summation. A specific manner in which the terminal device determines, based on each polarization direction, the beam vector, the frequency domain vector, and the space-frequency component matrix used for weighted summation is the same as the foregoing specific manner in which the $L_1$ beam vectors, the $K_1$ frequency domain vectors, and the $T_1$ space-frequency component matrices are determined based on one polarization direction. For brevity, details are not described herein again.

Generally, same $L_1$ beam vectors, same $K_1$ frequency domain vectors, and same $T_1$ space-frequency component matrix may be shared in a plurality of polarization directions. An example in which a plurality of polarization directions share same $L_1$ beam vectors, same $K_1$ frequency domain vectors, and same $T_1$ space-frequency component matrices is used below for description.

It is assumed that a quantity of polarization directions is 2, and same $L_1$ beam vectors and same $K_1$ frequency domain vectors are shared in the two polarization directions. $T_1$ space-frequency component matrices used for weighted summation in the two polarization directions are also the same.

The network device may determine a precoding vector of an $n_f^{th}$ frequency domain unit based on the following formula:

$$w_{n_f} = \frac{1}{P_{n_f}} \begin{bmatrix} \sum_{t_1=0}^{T_1-1} u_{s,t_1} a_{t_1} \bar{u}_{f,t_1,n_f} \\ \sum_{t_1=0}^{T_1-1} u_{s,t_1} a_{t_1+T_1} \bar{u}_{f,t_1,n_f} \end{bmatrix}.$$

$a_{t_1}$ represents a weighting coefficient corresponding to a $t_1^{th}$ beam vector and an $n_f^{th}$ element in the $t_1^{th}$ frequency domain vector $u_{f,t_1}$ in a first polarization direction, and $a_{t_1+T_1}$ represents a weighting coefficient corresponding to the $t_1^{th}$ beam vector $u_{f,t_1}$ and an $n_f^{th}$ element $\bar{u}_{f,t_1,n_f}$ in the $t_1^{th}$ frequency domain vector $u_{f,t_1}$ in a second polarization direction.

The foregoing formula may be further transformed into:

$$w_{n_f} = \frac{1}{P_{n_f}} \begin{bmatrix} \sum_{t_1=0}^{T_1-1} v_{s,t_1} c_{t_1} \bar{u}_{f,t_1,n_f} \\ \sum_{t_1=0}^{T_1-1} v_{s,t_1+T} c_{t_1+T_1} \bar{u}_{f,t_1,n_f} \end{bmatrix}.$$

$v_{s,t_1}$ is determined based on the $t_1^{th}$ beam vector in the selected $T_1$ beam vectors in the first polarization direction and the wideband amplitude coefficient $p_{t_1}$, $v_{s,t_1+T}$ is determined based on the $t_i^{th}$ beam vector in the selected $T_1$ beam vectors in the second polarization direction and the wideband amplitude coefficient $p_{t_1+T}$, $a_{t_1}$ represents a weighting coefficient corresponding to $v_{s,t_1}$ and an $n_f^{th}$ element in the $t_1^{th}$ frequency domain vector $u_{f,t_1}$ in the first polarization direction, and $a_{t_1+T_1}$ represents a weighting coefficient corresponding to $v_{s,t_1+T}$ and an $n_f^{th}$ element $\bar{u}_{f,t_1,n_f}$ in the $t_1^{th}$ frequency domain vector $u_{f,t_1}$ in the second polarization direction.

Optionally, the two polarization directions share the same $L_1$ beam vectors, $K_1$ frequency domain vectors, and $T_1$ space-frequency component matrices. When the terminal device uses the bitmap in the manner 1 to indicate the $T_1$ space-frequency component matrices, specifically, a bitmap whose length is $L_1 \times K_1$ may be used for indication.

Optionally, the two polarization directions share the same $L_1$ beam vectors and $K_1$ frequency domain vectors. The terminal device may determine one or more space-frequency component matrices in each polarization direction based on the $L_1$ beam vectors and the $K_1$ frequency domain vectors. A total quantity of space-frequency component matrices determined in the two polarization directions may be denoted as, for example, $S_1$. A value of $S_1$ may be $2T_1$, and the terminal device may separately determine $T_1$ relatively strong space-frequency component matrices in each polarization direction. $T_1$ space-frequency component matrices in the first polarization direction in the two polarization directions may be the same as or different from $T_1$ space-frequency component matrices in the second polarization direction in the two polarization directions. This is not limited in this application. Alternatively, a value of $S_1$ may not be $2T_1$, and the terminal device may determine $S_1$ relatively strong space-frequency component matrices jointly based on the two polarization directions. When the terminal device determines the $S_1$ relatively strong space-frequency component matrices jointly based on the two polarization directions, a total quantity of space-frequency component matrices in the first polarization direction and the second polarization direction may be $S_1$. In addition, a quantity of space-frequency component matrices in the first polarization direction may be the same as or different from a quantity of space-frequency component matrices in the second polarization direction. This is not limited in this application.

When indicating the $S_1$ space-frequency component matrices, the terminal device may indicate the $S_1$ space-frequency component matrices still by using any one of the manner 1 to the manner 4 listed above. When the bitmap in the manner 1 is used for indication, a length of the bitmap may be $2L_1 \times K_1$ bits. Alternatively, bitmaps corresponding to two polarization directions may be separately used for indication.

Optionally, when the quantity of polarization directions is 2, the third indication information may also be used to indicate the value of $S_1$.

If the terminal device determines and reports space-frequency component matrices based on each polarization direction, $S_1$ may be an even number, for example, $2T_1$. If the terminal device determines and reports space-frequency component matrices jointly based on the two polarization directions, $S_1$ may be an odd number or an even number. This is not limited in this application.

Optionally, the two polarization directions share the same $L_1$ beam vectors, and the terminal device may determine the $K_1$ frequency domain vectors and the $T_1$ space-frequency component matrices based on each polarization direction.

Optionally, the two polarization directions share the same $L_1$ beam vectors, and the terminal device may determine the $K_1$ frequency domain vectors based on each polarization direction, and determine $2T_1$ relatively strong space-frequency component matrices jointly based on the two polarization directions.

Optionally, the $T_1$ space-frequency component matrices indicated by using the first indication information are associated with a first transport layer in the plurality of transport layers. In other words, the $T_1$ space-frequency component matrices indicated by using the first indication information may be used to determine a precoding vector of one or more frequency domain units at the first transport layer.

The first transport layer may be one transport layer, or may be a plurality of transport layers. This is not limited in this application. In other words, the first indication information may be used to determine a precoding vector of each frequency domain unit at the one or more transport layers.

In conclusion, the first indication information may be used to indicate one or more polarization directions and/or a precoding vector of each frequency domain unit at the one or more transport layers. To be specific, the first indication information may be used to determine a precoding vector of each frequency domain unit in the one or more polarization directions, may be used to determine a precoding vector of each frequency domain unit at the one or more transport layers, or may be used to determine a precoding vector of each frequency domain unit in the one or more polarization directions at each of the one or more transport layers.

Further, the method further includes: The terminal device generates fourth indication information, where the fourth indication information is used to indicate $L_2$ beam vectors in the beam vector set, $K_2$ frequency domain vectors in the frequency domain vector set, and $T_2$ space-frequency component matrices. A weighted sum of the $T_2$ space-frequency component matrices may be used to determine a precoding vector of one or more frequency domain units at a second transport layer. In other words, the $L_2$ beam vectors, the $K_2$ frequency domain vectors, and the $T_2$ space-frequency component matrices that are indicated by using the fourth indication information are associated with the second transport layer.

Optionally, the fourth indication information is used to indicate $L_2$ beam vectors and $T_2$ space-frequency component matrices, and a weighted sum of the $T_2$ space-frequency component matrices is used to determine a precoding vector of one or more frequency domain units. The $L_2$ beam vectors and the $K_2$ frequency domain vectors correspond to $M_2$ space-frequency component matrices, the $T_2$ space-frequency component matrices are a part of the $M_2$ space-frequency component matrices, each of the $M_2$ space-frequency component matrices is uniquely determined by one of the $L_2$ beam vectors and one of the $K_2$ frequency domain vectors, and $M_2=L_2 \times K_2$; the $L_2$ beam vectors are a part of beam vectors in the beam vector set, and/or the $K_2$ frequency domain vectors are a part of frequency domain vectors in the frequency domain vector set; and $M_2$, $L_2$, $K_2$, and $T_2$ are all positive integers.

Optionally, the $K_2$ frequency domain vectors are preconfigured. For example, the $K_2$ frequency domain vectors may be all or a part of frequency domain vectors in the frequency domain vector set.

For example, $K_2=K_0$ may be predefined in the protocol. That is, in the protocol, a universal set of the frequency domain vector set is used as the $K_2$ frequency domain vectors by default. For another example, the value of $K_2$ may be predefined in the protocol, and frequency domain vectors in the frequency domain vector set that are used as the $K_2$ frequency domain vectors may be specified in advance. For still another example, the value of $K_2$ may be predefined in the protocol, and the $K_2$ frequency domain vectors may be indicated by the network device in advance by using signaling.

In other words, it may be predefined that the terminal device does not need to report the $K_2$ frequency domain vectors. The $K_2$ frequency domain vectors may be specified in advance, for example, defined in a protocol or configured by the network device. This is not limited in this application.

Optionally, the $K_2$ frequency domain vectors are the same as the $K_1$ frequency domain vectors. Optionally, the $K_2$ frequency domain vectors are different from the $K_1$ frequency domain vectors.

Optionally, the $K_2$ frequency domain vectors are a subset of the $K_1$ frequency domain vectors.

The foregoing has described in detail, with reference to the first indication information, different parameter values and vectors reported by the terminal device when different parameters are configured. When generating and sending the fourth indication information, the terminal device may perform processing in a manner the same as that described above. For brevity, details are not described herein again.

Optionally, the second transport layer is one or more transport layers other than the first transport layer in a plurality of transport layers. In other words, the fourth indication information may be used to determine a precoding vector of each frequency domain unit at the one or more transport layers. Specifically, the fourth indication information may be used to indicate a precoding vector of each frequency domain unit in one or more polarization directions at each of the second transport layers.

In a possible design, $L_1=L_2$, $K_1=K_2$, and $T_1=T_2$. In other words, for a plurality of transport layers, quantities of beam vectors determined at any two transport layers are the same, quantities of frequency domain vectors determined at any two transport layers are the same, and quantities of space-frequency component matrices determined at any two transport layers are the same.

In this design, optionally, the transport layers may share the same $L_1$ beam vectors, the same $K_1$ frequency domain vectors, and the same $T_1$ space-frequency component matrices. In this case, the fourth indication information may be the same as the information that is used to indicate the $L_1$ beam vectors, the $K_1$ frequency domain vectors, and the $T_1$ space-frequency component matrices and that is in the first indication information. In this case, the first indication information and the fourth indication information may be same indication information.

In addition, when the foregoing information is shared by different transport layers and/or different polarization directions, only one piece of indication information may be generated and sent.

Optionally, the transport layers may share the same $L_1$ beam vectors and $K_1$ frequency domain vectors, but use respective $T_1$ space-frequency component matrices. In other words, the $T_1$ space-frequency component matrices at the first transport layer are different from the $T_1$ space-frequency component matrices at the second transport layer. In this case, the fourth indication information may be the same as the information used to indicate the $L_1$ beam vectors and the $K_1$ frequency domain vectors in the first indication information, and the first indication information and the fourth indication information may be used to indicate $T_1$ space-frequency component matrices at corresponding transport layers.

Optionally, each transport layer uses its own $L_1$ beam vectors, $K_1$ frequency domain vectors, or $T_1$ space-frequency component matrices. In other words, the $L_1$ beam vectors at the first transport layer are different from the $L_1$ beam vectors at the second transport layer, the $K_1$ frequency domain vectors at the first transport layer are different from the $K_1$ frequency domain vectors at the second transport layer, and the $T_1$ space-frequency component matrices at the first transport layer are different from the $T_1$ space-frequency component matrices at the second transport layer. In this case, the first indication information and the second indication information may be used to indicate the $L_1$ beam vectors, the $K_1$ frequency domain vectors, and the $T_1$ space-frequency component matrices that are at the corresponding transport layers.

Further, values of $L_1$, $K_1$, and $T_1$ may vary with an increase of the quantity of transport layers. For example, it may be predefined in a protocol that when the quantity of transport layers is greater than a preset threshold, at least one of $L_1$, $K_1$, and $T_1$ is decreased.

For example, when the quantity of transport layers is greater than 2, $T_1$ may be decreased. For example, $T_1$ may be decreased to $T_1/2$ or $T_1/3$.

For another example, when the quantity of transport layers is greater than 2, both $L_1$ and $T_1$ may be decreased. For example, $L_1$ may be decreased to $L_1/2$, and $T_1$ may be decreased to $T_1/2$; or $L_1$ may be decreased to $L_1/3$, and $T_1$ may be decreased to $T_1/3$.

For still another example, when the quantity of transport layers is greater than 2, both $K_1$ and $T_1$ may be decreased. For example, $K_1$ may be decreased to $K_1/2$, and $T_1$ may be decreased to $T_1/2$; or $K_1$ may be decreased to $K_1/3$, and $T_1$ may be decreased to $T_1/3$.

For yet another example, when the quantity of transport layers is greater than 2, all of $L_1$, $K_1$ and $T_1$ may be decreased. For example, $L_1$ may be decreased to $L_1/2$, $K_1$ may be decreased to $K_1/2$, and $T_1$ may be decreased to $T_1/2$; or $L_1$ may be decreased to $L_1/3$, $K_1$ may be decreased to $K_1/3$, and $T_1$ may be decreased to $T_1/3$.

It should be understood that the foregoing listed preset threshold is merely an example, and should not constitute any limitation on this application. It should be further understood that the foregoing listed methods for decreasing $L_1$, $K_1$, and $T_1$ are merely examples, and should not constitute any limitation on this application. The foregoing preset threshold and specific values obtained after $L_1$, $K_1$, and $T_1$ are decreased may be predefined in a protocol.

It should be noted that although values of $L_1$, $K_1$, and $T_1$ may vary with the quantity of transport layers, $L_1$, $K_1$, and $T_1$ that are obtained after a change and $L_2$, $K_2$, and $T_2$ that are obtained after a change may still satisfy $L_1=L_2$, $K_1=K_2$, and $T_1=T_2$.

It should be further understood that although the first transport layer and the second transport layer are used as examples above to describe value relationships between $L_1$ and $L_2$, $K_1$ and $K_2$, and $T_1$ and $T_2$ at different transport layers, this should not constitute any limitation on this application. The quantity of transport layers is not limited to 2, and may be greater than 2. For example, the quantity of transport layers is 3, 4, or the like. This is not limited in this application.

In another possible design, $L_1>L_2$, $K_1>K_2$, and $T_1>T_2$. In other words, for a plurality of transport layers, quantities of beam vectors determined at at least two transport layers are different, quantities of frequency domain vectors determined at at least two transport layers are different, or quantities of space-frequency component matrices determined at at least two transport layers are different.

Optionally, when the quantity of transport layers is greater than a preset threshold, at least one of a quantity of space-frequency component matrices, a quantity of beam vectors, and a quantity of frequency domain vectors at some transport layers may be decreased.

For example, when the quantity of transport layers is greater than the preset threshold, the quantity of space-frequency component matrices at the some transport layers may be halved. In other words, the quantity $T_1$ of the space-frequency component matrices at the first transport layer may be twice the quantity $T_2$ of the space-frequency component matrices at the second transport layer. The first transport layer may correspond to, for example, a precoding vector determined based on an eigenvector corresponding to a larger eigenvalue in an SVD process, and the second transport layer may correspond to, for example, a precoding vector determined based on an eigenvector corresponding to a smaller eigenvalue in the SVD process. The first transport layer may indicate one transport layer, or may indicate a plurality of transport layers with a same characteristic. The second transport layer may indicate one transport layer, or may indicate a plurality of transport layers with a same characteristic.

When the first transport layer indicates a plurality of transport layers, there may be a plurality of pieces of first indication information used to indicate precoding vectors of the first transport layers, to correspond to the plurality of transport layers. If the plurality of transport layers share a beam vector, a frequency domain vector, and a space-frequency component matrix, information used to indicate the beam vector, the frequency domain vector, and the space-frequency component matrix in the plurality of pieces of first indication information may be shared. In this case, only one piece of first indication information may be generated and sent.

Likewise, when the second transport layer indicates a plurality of transport layers, there may be a plurality of pieces of fourth indication information used to indicate precoding vectors of the second transport layers, to correspond to the plurality of transport layers. If the plurality of transport layers share a beam vector, a frequency domain vector, or a space-frequency component matrix, information used to indicate the beam vector, the frequency domain vector, or the space-frequency component matrix in the plurality of pieces of fourth indication information may be shared. In this case, only one piece of fourth indication information may be generated and sent.

The foregoing division of the transport layers based on the eigenvalue is merely a possible implementation, and should not constitute any limitation on this application. For example, another criterion for dividing the transport layers may be predefined in a protocol. This is not limited in this application.

For example, the quantity of transport layers is 4, and the preset threshold is 2. In this case, quantities of space-frequency component matrices at a $2^{nd}$ transport layer and a $3^{rd}$ transport layer in the four transport layers may be halved, and quantities of space-frequency component matrices at a $0^{th}$ transport layer and a $1^{st}$ transport layer remain unchanged. The $0^{th}$ transport layer and the $1^{st}$ transport layer may be two examples of the first transport layer, and the $2^{nd}$ transport layer and the $3^{rd}$ transport layer may be two examples of the second transport layer.

Based on the same manner, a quantity of beam vectors and/or a quantity of frequency domain vectors at some transport layers may also be decreased. For brevity, examples are not further listed one by one herein.

Still further, when the quantity of transport layers is greater than the preset threshold, and at least one of the quantity of space-frequency component matrices, the quantity of beam vectors, and the quantity of frequency domain vectors at some transport layers is decreased, the terminal device may use, at the second transport layer, some space-frequency component matrices that are at the first transport layer. In this case, the terminal device may indicate, in the fourth indication information by using, for example, a bitmap or an index of a space-frequency component matrix, only some space-frequency component matrices used at the second transport layer, and does not repeatedly indicate the selected beam vector and the selected frequency domain vector. Therefore, feedback overheads can be reduced. In this case, the terminal device may indicate a relative location, in space-frequency component matrices used at the first transport layer, of the some space-frequency component matrices used at the second transport layer, where the relative location is referred to as a local (local) location, such as a relative number or a relative index.

It may be understood that, when quantities of beam vectors at at least two transport layers are different, or quantities of frequency domain vectors determined at at least two transport layers are different, or quantities of space-frequency component matrices determined at at least two transport layers are different, the terminal device may separately indicate, by using the first indication information and the fourth indication information, selected beam vectors, selected frequency domain vectors, and selected space-frequency component matrices that are at the corresponding transport layer, and weighting coefficient of the space-frequency component matrices.

It should be understood that the foregoing methods may be used in combination. For example, the quantity of transport layers is 4, and both a $0^{th}$ transport layer and a $1^{st}$ transport layer may be first transport layers. The $0^{th}$ transport layer and the $1^{st}$ transport layer may share a same beam vector and a same frequency domain vector. When two pieces of first indication information corresponding to the $0^{th}$ transport layer and the $1^{st}$ transport layer are used to indicate beam vectors and frequency domain vectors at the $0^{th}$ transport layer and the $1^{st}$ transport layer, only indication information for indicating $L_1$ beam vectors once and indication information for indicating $K_1$ frequency domain vectors once may be generated. However, space-frequency component matrices used at the $0^{th}$ transport layer and the $1^{st}$ transport layer may be separately indicated by using different bitmaps. The first indication information corresponding to the $0^{th}$ transport layer may include a bitmap used to indicate the space-frequency component matrix that is for the $0^{th}$ transport layer. The first indication information corresponding to the $1^{st}$ transport layer may include a bitmap used to indicate the space-frequency component matrix that is for the $1^{st}$ transport layer.

Both the $2^{nd}$ transport layer and the $3^{rd}$ transport layer may be second transport layers. The $2^{nd}$ transport layer and the $3^{rd}$ transport layer may also share a same beam vector and a same frequency domain vector, beam vectors used at the $2^{nd}$ transport layer and the $3^{rd}$ transport layer may be a subset of the beam vectors used at the $0^{th}$ transport layer and the $1^{st}$ transport layer, and frequency domain vectors used at the $2^{nd}$ transport layer and the $3^{rd}$ transport layer may also be a subset of the frequency domain vectors used at the $0^{th}$ transport layer and the $1^{st}$ transport layer. Certainly, the beam vectors used at the $2^{nd}$ transport layer and the $3^{rd}$ transport layer may alternatively be determined by the terminal device based on the $2^{nd}$ transport layer and/or the $3^{rd}$ transport layer, and are not necessarily a subset of the beam vectors used at the $0^{th}$ transport layer and the $1^{st}$ transport layer. The frequency domain vectors used at the $2^{nd}$ transport layer and the $3^{rd}$ transport layer may alternatively be determined by the terminal device based on the $2^{nd}$ transport layer and/or the $3^{rd}$ transport layer, and are not necessarily a subset of the frequency domain vectors used at the $0^{th}$ transport layer and the $1^{st}$ transport layer. This is not limited in this application.

When the beam vectors used at the $2^{nd}$ transport layer and the $3^{rd}$ transport layer are a subset of the beam vectors used at the $0^{th}$ transport layer and the $1^{st}$ transport layer, and the frequency domain vectors used by the $2^{nd}$ transport layer and the $3^{rd}$ transport layer are a subset of the frequency domain vectors used at the $0^{th}$ transport layer and the $1^{st}$ transport layer; when two pieces of fourth indication information respectively corresponding to the $2^{nd}$ transport layer and the $3^{rd}$ transport layer are used to indicate the beam vectors and the frequency domain vectors of the $2^{nd}$ transport layer and the $3^{rd}$ transport layer, only indication information for indicating $L_2$ beam vectors and $K_2$ frequency domain vectors once may be generated. The $L_2$ beam vectors and the $K_2$ frequency domain vectors may be indicated in the $L_1$ beam vectors and the $K_1$ frequency domain vectors. For example, relative locations of the $L_2$ beam vectors in the $L_1$ beam vectors may be indicated, and relative locations of the $K_2$ frequency domain vectors in the $K_1$ frequency domain vectors may be indicated. However, space-frequency component matrices used at the $2^{nd}$ transport layer and the $3^{rd}$ transport layer may be separately indicated by using different bitmaps. The fourth indication information corresponding to the $2^{nd}$ transport layer may include a bitmap used to indicate the space-frequency component matrix that is for the $2^{nd}$ transport layer. The fourth indication information corresponding to the $3^{rd}$ transport layer may include a bitmap used to indicate the space-frequency component matrix that is for the $3^{rd}$ transport layer.

It should be noted that because the quantity of transport layers may be determined by the terminal device, when the network device indicates $L_1$, $K_1$, and $T_1$ by using higher layer signaling, the quantity of transport layers cannot be determined in advance. Therefore, the network device may separately indicate one value for at least two of $L_1$, $K_1$, and $T_1$, and the terminal device may determine, based on the quantity of transport layers and a predefined rule, whether a value of $L_1$, $K_1$, or $T_1$ needs to be changed.

It is assumed that a quantity of transport layers is R, and a quantity of polarization directions is 2. The network device may determine a precoding vector of an $n_f^{th}$ frequency domain unit at an $r^{th}$ transport layer based on the following formula:

$$w_{r,n_f} = \frac{1}{P_{r,n_f}} \begin{bmatrix} \sum_{t_1=0}^{T_1-1} u_{s,r,t_1} a_{r,t_1} \overline{u}_{f,r,t_1,n_f} \\ \sum_{t_1=0}^{T_1-1} u_{s,r,t_1} a_{r,t_1+T_1} \overline{u}_{f,r,t_1,n_f} \end{bmatrix}.$$

$$\frac{1}{P_{r,n_f}}$$

is a normalization coefficient corresponding to the $r^{th}$ transport layer, $P_{r,n_f} \geq 0$, $u_{s,r,t_1}$ is a $t_1^{th}$ beam vector at the $r^{th}$ transport layer, $\overline{u}_{f,r,t_1,n_f}$ is an $n_f^{th}$ element in a $t_1^{th}$ frequency domain vector $u_{f,r,t_1}$ at the $r^{th}$ transport layer, $a_{r,t_1}$ represents a weighting coefficient corresponding to a $t_1^{th}$ beam vector $u_{s,r,t_1}$ and an $n_f^{th}$ element $\overline{u}_{f,r,t_1,n_f}$ in a $t_1^{th}$ frequency domain vector $u_{f,r,t_1}$ in a first polarization direction at the $r^{th}$ transport layer, and $a_{r,t_1+T_1}$ represents a weighting coefficient corresponding to a $t_1^{th}$ beam vector $u_{s,r,t_1}$ and an $n_f^{th}$ element $\overline{u}_{f,r,t_1,n_f}$ in a $t_1^{th}$ frequency domain vector $u_{f,r,t_1}$ in a second polarization direction at the $r^{th}$ transport layer.

If the same $L_1$ beam vectors and $K_1$ frequency domain vectors are shared at each transport layer, the foregoing formula may be simplified as:

$$w_{r,n_f} = \frac{1}{P_{r,n_f}} \begin{bmatrix} \sum_{t_1=0}^{T_1-1} u_{s,t_1} a_{r,t_1} \overline{u}_{f,t_1,n_f} \\ \sum_{t_1=0}^{T_1-1} u_{s,t_1} a_{r,t_1+T_1} \overline{u}_{f,t_1,n_f} \end{bmatrix}.$$

Still further, the network device may determine a precoding matrix of an $n_f^{th}$ frequency domain unit based on the following formula:

$$W_{n_f} = \frac{1}{P_{n_f}} [w_{0,n_f} \quad L \quad w_{R-1,n_f}].$$

$w_{0,n_f}$ represents a precoding vector of an $n_f^{th}$ frequency domain unit at a $0^{th}$ transport layer, and $w_{0,n_f}$ represents a precoding vector of an $n_f^{th}$ frequency domain unit at an $(R-1)^{th}$ transport layer.

Based on the foregoing technical solutions, the terminal device may indicate the precoding matrix of the one or more frequency domain units at the one or more transport layers to the network device.

Therefore, the terminal device indicates a small quantity of beam vectors, frequency domain vectors, and space-frequency component matrices to the network device to help the network device restore a precoding vector. The frequency domain vector may be used to describe different change rules of a channel in frequency domain. The terminal device may simulate a change of a channel in frequency domain through linear superposition of one or more frequency domain vectors, so that a relationship between frequency domain units is fully explored, continuity of frequency domain is utilized, and a change rule on a plurality of frequency domain units is described by using a relatively small quantity of frequency domain vectors. Compared with the current technology, this application does not require that a weighting coefficient be independently reported based on each frequency domain unit, and an increase in frequency domain units does not cause multiplication of feedback overheads. Therefore, feedback overheads can be greatly reduced while feedback precision is ensured.

It should be understood that the method for indicating a precoding vector provided above is merely a possible implementation, and should not constitute any limitation on this application. For example, after determining the $L_1$ beam vectors and the $K_1$ frequency domain vectors, the terminal device may feed back weighting coefficients separately for the $M_1$ space-frequency component matrices corresponding to the $L_1$ beam vectors and the $K_1$ frequency domain vectors. The terminal device may use relatively high feedback precision for the weighting coefficients of the $T_1$ space-frequency component matrices in the $M_1$ space-frequency component matrices, and use relatively low feedback precision for weighting coefficients of the remaining $M_1$-$T_1$ space-frequency component matrices, to reduce feedback overheads. Specifically, a quantity of quantized bits of a weighting coefficient of any one of the $T_1$ space-frequency component matrices may be greater than a quantity of quantized bits of a weighting coefficient of any one of the remaining $M_1$-$T_1$ space-frequency component matrices. Although the caused feedback overheads are slightly higher than the feedback overheads caused by the method provided above, the precoding matrix restored by the network device may be closer to the precoding matrix determined by the terminal device. Therefore, approximation precision is higher.

It should be noted that the method for indicating and determining a precoding matrix provided above is particularly applicable to a case in which there are a large quantity of consecutive frequency domain units. In this method, correlation between the frequency domain units can be fully used, and feedback overheads can be reduced, thereby reducing huge overheads caused by independent feedback of a plurality of frequency domain units.

However, in some cases, there are a few of frequency domain unit, or frequency domain units are inconsecutive. If an existing manner of independently feeding back each frequency domain unit is used to indicate a precoding vector of each frequency domain unit, relatively low feedback overheads may be caused. In addition, in a case in which the frequency domain units are inconsecutive, relatively high approximate precision can be ensured through independent feedback of each frequency domain unit. Therefore, this application further provides a PMI feedback method, so that a precoding vector can be fed back in a feedback mode with reference to different scenarios, thereby ensuring approximate precision and reducing feedback overheads.

Figure 3:
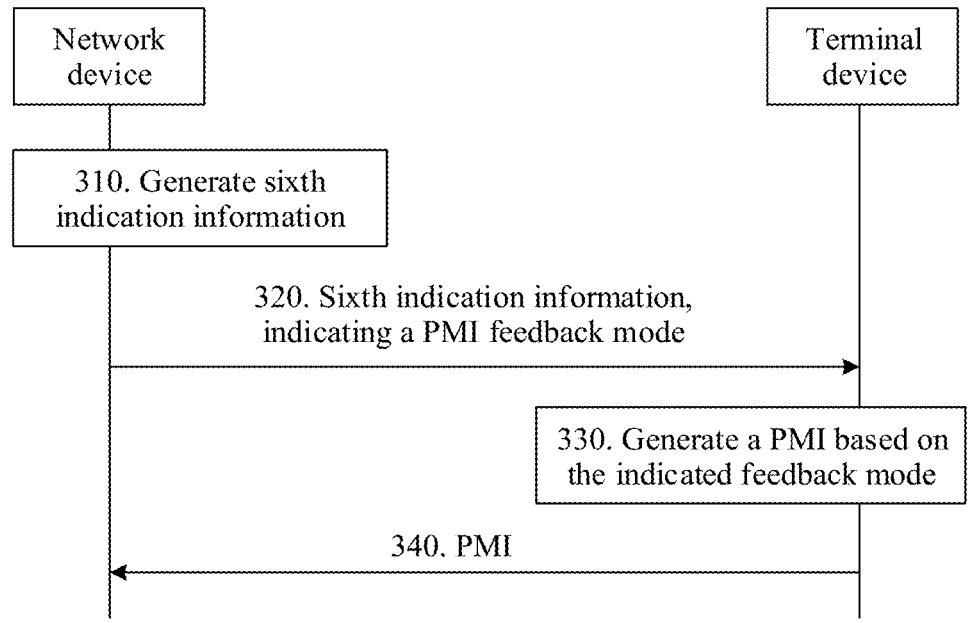
FIG. 3 is a schematic flowchart of a method for feeding back a precoding matrix indicator (precoding matrix indicator, PMI) according to another embodiment of this application.

The following describes in detail a PMI feedback method according to another embodiment of this application with reference to FIG. 3.

FIG. 3 is a schematic flowchart of a PMI feedback method 300 from a device interaction perspective according to another embodiment of this application. As shown in the figure, the method 300 may include step 310 to step 340. The following describes each step in the method 300 in detail.

It should be noted that, in this embodiment, a terminal device may indicate a precoding matrix to a network device by using a PMI. The PMI may include the first indication information and/or the fourth indication information in the foregoing method 200, and may further include other information that is used to indicate a precoding matrix and that is different from the first indication information and the fourth indication information. This is not limited in this application. In addition, the PMI is merely a name of information used to indicate a precoding matrix, and should not constitute any limitation on this application. This application does not exclude a possibility that another name is defined in a future protocol to represent a function that is the same as or similar to that of the PMI.

In step 310, the network device generates sixth indication information, where the sixth indication information is used to indicate a PMI feedback mode.

In this embodiment, the PMI feedback mode may be the feedback mode provided above, or may be another feedback mode. Specifically, the PMI feedback mode may be a first feedback mode or a second feedback mode. The first feedback mode may be a mode in which a PMI is fed back based on only a beam vector set. The second feedback mode may be a mode in which a PMI is fed back based on a beam vector set and a frequency domain vector set, or may be a mode in which a PMI is fed back based on a space-frequency component matrix set.

Because the space-frequency component matrix set is associated with the beam vector set and the frequency domain vector set, in the second feedback mode, feeding back the PMI based on the beam vector set and the frequency domain vector set may be considered as being equivalent to feeding back the PMI based on the space-frequency component matrix set. In addition, because the beam vector set and the frequency domain vector set may be converted into the space-frequency component matrix set, or vice versa, it may be further considered that the second feedback mode is feeding back the PMI based on the beam vector set and the space-frequency component matrix set, or feeding back the PMI based on the frequency domain vector set and the space-frequency component matrix set. This is not limited in this application.

That the PMI is fed back only based on the beam vector set in the first feedback mode is relative to the second feedback mode. Compared with the second feedback mode, the first feedback mode ensures that the PMI may be fed back based on only the beam vector set, and no additional vector set or matrix set needs to be provided. In other words, a difference between the first feedback mode and the second feedback mode lies in that the first feedback mode is not based on a frequency domain vector set, but the second feedback mode is based on a frequency domain vector set.

From another perspective, the first feedback mode may be a frequency-domain-unit-independent feedback mode, and the second feedback mode may be a frequency-domain-unit-joint feedback mode.

In a possible implementation, for example, for the first feedback mode, refer to a feedback mode in which a PMI is fed back based on a type II codebook and that is defined in the NR protocol TS38.214 R15. The second feedback mode may be, for example, the feedback mode described above with reference to the method 200. Compared with the first feedback mode, the second feedback mode may be understood as a frequency-domain-unit-joint feedback mode. It can be learned from the foregoing descriptions that, in the second feedback mode, based on continuity in frequency domain, a plurality of frequency domain units are jointly fed back by using a relationship between the frequency domain units, to reduce frequency domain feedback overheads. Especially when there are a relatively large quantity of to-be-reported frequency domain units, compared with the first feedback mode, the second feedback mode can greatly reduce feedback overheads.

In this embodiment, the sixth indication information may be used to explicitly indicate the feedback mode. For example, an indication bit or an indication field may be used to indicate the feedback mode. For example, when the indication bit is set to "0", it indicates that the first feedback mode is used; when the indication bit is set to "1", it indicates that the second feedback mode is used. Alternatively, when the indication bit is set to "1", it indicates that the first feedback mode is used; when the indication bit is set to "0", it indicates that the second feedback mode is used. This is not limited in this application.

The sixth indication information may also be used to implicitly indicate the feedback mode by using other information. For example, when the network device indicates a length of a frequency domain vector to the terminal device, it may be considered that the network device requests the terminal device to feed back a precoding vector based on the second feedback mode. In this case, the foregoing fifth indication information used to indicate the length of the frequency domain vector may be understood as an example of the sixth indication information.

It should be noted that a length of a space-frequency component vector may be determined by both a length of a frequency domain vector and a length of a beam vector. Therefore, when the network device indicates the length of the frequency domain vector to the terminal device, the terminal device may feed back the PMI based on a port selection vector and the frequency domain vector, or may feed back the PMI based on the space-frequency vector. This is not limited in this application.

In step 320, the network device sends the sixth indication information. Correspondingly, the terminal device receives the sixth indication information.

Optionally, the sixth indication information is carried in an RRC message.

A specific method for sending the sixth indication information by the network device to the terminal device may be the same as a manner of sending signaling by the network device to the terminal device in the current technology. For brevity, detailed descriptions of a specific process of the sending method are omitted herein.

In step 330, the terminal device generates a PMI based on the feedback mode indicated by the sixth indication information.

The terminal device may generate the PMI based on the feedback mode indicated by the sixth indication information. When the terminal device generates the PMI based on the first feedback mode, a specific process in which the terminal device generates the PMI may be the same as that in the current technology. For brevity, details are not described herein. When the terminal device generates the PMI based on the second feedback mode, a specific implementation process has been described in detail in the foregoing method 200. For brevity, details are not described herein again.

In step 340, the terminal device sends the PMI. Correspondingly, the network device receives the PMI.

The terminal device may send the PMI to the network device, so that the network device determines a precoding matrix. The network device may be the foregoing network device that sends the sixth indication information, or may be another network device. This is not limited in this application. It should be understood that the step of sending the PMI by the terminal device to the network device shown in the figure is merely an example, and should not constitute any limitation on this application.

Then, the network device may determine the precoding matrix based on the PMI, to determine a precoding matrix used for data transmission. The network device may determine the precoding matrix based on the PMI by using different feedback modes. When the terminal device generates the PMI based on the first feedback mode, a specific process in which the network device determines the precoding matrix based on the PMI may be the same as that in the current technology. For brevity, details are not described herein. When the terminal device generates the PMI based on the second feedback mode, a specific process in which the network device determines the precoding matrix based on the PMI has been described in detail in the foregoing method 200. For brevity, details are not described herein again.

Based on the foregoing method, the terminal device may feed back, according to an indication of the network device, the PMI by using a corresponding feedback mode. Different measurement cases may be used by introducing a plurality of feedback modes, and both feedback precision and feedback overheads may be considered, thereby achieving a balance between them.

It should be understood that sequence numbers of the processes do not mean execution sequences in the foregoing embodiments. The execution sequences of the processes should be determined according to functions and internal logic of the processes, and should not be construed as any limitation on the implementation processes of the embodiments of this application.

With reference to FIG. 2 and FIG. 3, the foregoing describes in detail the methods for indicating and determining a precoding vector provided in the embodiments of this application. The following describes in detail a communications apparatus in the embodiments of this application with reference to FIG. 4 to FIG. 6.

Figure 4:
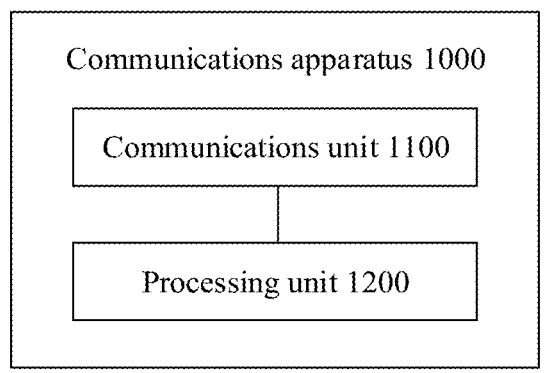
FIG. 4 is a schematic block diagram of a communications apparatus according to an embodiment of this application.

FIG. 4 is a schematic block diagram of a communications apparatus according to an embodiment of this application. As shown in the figure, the communications apparatus 1000 may include a communications unit 1100 and a processing unit 1200.

In a possible design, the communications apparatus 1000 may correspond to the terminal device in the foregoing method embodiments, for example, may be a terminal device, or may be a chip disposed in a terminal device.

Specifically, the communications apparatus 1000 may correspond to the terminal device in the method 200 or the method 300 in the embodiments of this application. The communications apparatus 1000 may include units configured to perform the method 200 in FIG. 2 or the method 300 in FIG. 3 performed by the terminal device. In addition, the units in the communications apparatus 1000 and the foregoing other operations and/or functions are separately intended to implement corresponding procedures of the method 200 in FIG. 2 or the method 300 in FIG. 3.

When the communications apparatus 1000 is configured to perform the method 200 in FIG. 2, the communications unit 1100 may be configured to perform step 220 in the method 200, and the processing unit 1200 may be configured to perform step 210 in the method 200.

Specifically, the processing unit 1200 may be configured to generate first indication information, where the first indication information is used to indicate $L_1$ beam vectors in a beam vector set, $K_1$ frequency domain vectors in a frequency domain vector set, and $T_1$ space-frequency component matrices, and a weighted sum of the $T_1$ space-frequency component matrices is used to determine a precoding vector of one or more frequency domain units. The $L_1$ beam vectors and the $K_1$ frequency domain vectors correspond to $M_1$ space-frequency component matrices, the $T_1$ space-frequency component matrices are a part of the $M_1$ space-frequency component matrices, each of the $M_1$ space-frequency component matrices is uniquely determined by one of the $L_1$ beam vectors and one of the $K_1$ frequency domain vectors, and $M_1 = L_1 \times K_1$. The $L_1$ beam vectors are a part of beam vectors in the beam vector set, and/or the $K_1$ frequency domain vectors are a part of frequency domain vectors in the frequency domain vector set. $M_1$, $L_1$, $K_1$, and $T_1$ are all positive integers. The communications unit 1100 may be configured to send the first indication information.

Optionally, the communications unit 1100 is further configured to receive second indication information, where the second indication information is used to indicate a value or values of one or more of $M_1$, $L_1$, and $K_1$.

Optionally, the communications unit 1100 is further configured to receive third indication information, where the third indication information is used to indicate a value of $T_1$.

Optionally, the $M_1$ space-frequency component matrices are selected from a space-frequency component matrix set or a subset of a space-frequency component matrix set, the space-frequency component matrices are determined by beam vectors in the beam vector set and frequency domain vectors in the frequency domain vector set, and each space-frequency component matrix in the space-frequency component matrix set is uniquely determined by one beam vector in the beam vector set and one frequency domain vector in the frequency domain vector set.

The first indication information includes location information of the $M_1$ space-frequency component matrices in the space-frequency component matrix set or location information of the $M_1$ space-frequency component matrices in the subset of the space-frequency component matrix set.

Optionally, each of the $M_1$ space-frequency component matrices is determined by a product of one of the $L_1$ beam vectors and a conjugate transpose of one of the $K_1$ frequency domain vectors.

Optionally, each of the $M_1$ space-frequency component matrices is determined by a Kronecker product of one of the $K_1$ frequency domain vectors and one of the $L_1$ beam vectors.

Optionally, the weighted sum of the $T_1$ space-frequency component matrices is used to determine a precoding vector of one or more frequency domain units at a first transport layer.

Optionally, the processing unit 1200 is further configured to generate fourth indication information, where the fourth indication information is used to indicate $L_2$ beam vectors in the beam vector set, $K_2$ frequency domain vectors in the frequency domain vector set, and $T_2$ space-frequency component matrices, and a weighted sum of the $T_2$ space-frequency component matrices is used to determine a precoding vector of one or more frequency domain units at a second transport layer. The $L_2$ beam vectors and the $K_2$ frequency domain vectors correspond to $M_2$ space-frequency component matrices, the $T_2$ space-frequency component matrices are a part of the $M_2$ space-frequency component matrices, each of the $M_2$ space-frequency component matrices is uniquely determined by one of the $L_2$ beam vectors and one of the $K_2$ frequency domain vectors, and $M_2 = L_2 \times K_2$; the $L_2$ beam vectors are a part of beam vectors in the beam vector set, and/or the $K_2$ frequency domain vectors are a part of frequency domain vectors in the frequency domain vector set; and $M_2$, $L_2$, $K_2$, and $T_2$ are all positive integers. The communications unit 1100 is further configured to send the fourth indication information.

Optionally, $L_1 = L_2$, $K_1 = K_2$, and $T_1 = T_2$.

Optionally, $L_1 > L_2$, $K_1 > K_2$, or $T_1 > T_2$.

When the communications apparatus 1000 is configured to perform the method 300 in FIG. 3, the communications unit 1100 may be configured to perform step 320 and step 340 in the method 300, and the processing unit 1200 may be configured to perform step 330 in the method 300.

It should be understood that a specific process in which each unit performs the foregoing corresponding steps is described in detail in the foregoing method embodiment, and for brevity, details are not described herein.

Figure 5:
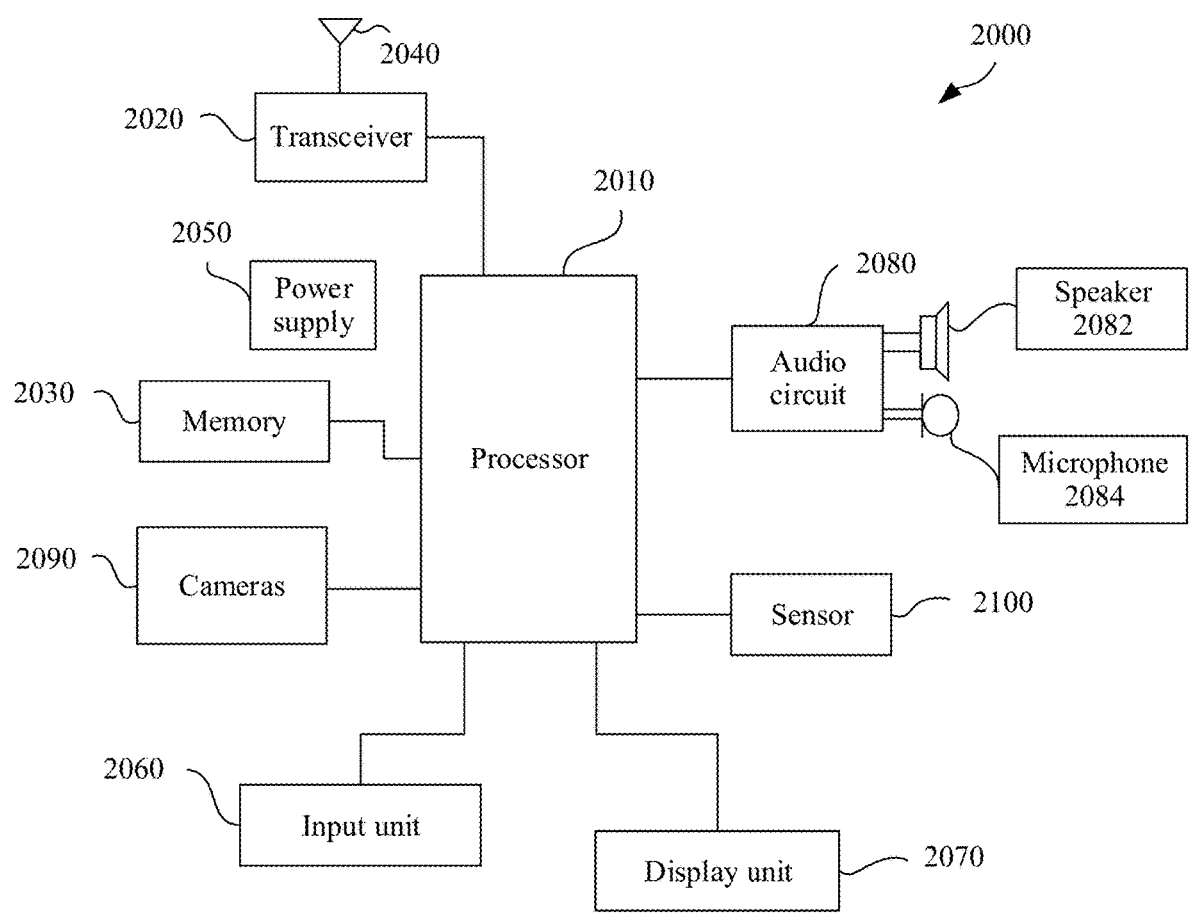
FIG. 5 is a schematic structural diagram of a terminal device according to an embodiment of this application.

It should be further understood that, when the communications apparatus 1000 is a terminal device, the communications unit 1100 in the communications apparatus 1000 may correspond to a transceiver 2020 in a terminal device 2000 shown in FIG. 5, and the processing unit 1200 in the communications apparatus 1000 may correspond to a processor 2010 in the terminal device 2000 shown in FIG. 5.

It should be further understood that when the communications apparatus 1000 is a chip disposed in a terminal device, the communications unit 1100 in the communications apparatus 1000 may be an input/output interface.

In another possible design, the communications apparatus 1000 may correspond to the network device in the foregoing method embodiments, for example, may be a network device, or may be a chip disposed in a network device.

Specifically, the communications apparatus 1000 may correspond to the network device in the method 200 or the method 300 in the embodiments of this application. The communications apparatus 1000 may include units configured to perform the method 200 in FIG. 2 or the method 300 in FIG. 3 performed by the network device. In addition, the units in the communications apparatus 1000 and the foregoing other operations and/or functions are separately intended to implement corresponding procedures of the method 200 in FIG. 2 or the method 300 in FIG. 3.

When the communications apparatus 1000 is configured to perform the method 300 in FIG. 3, the communications unit 1100 may be configured to perform step 220 in the method 200, and the processing unit 1200 may be configured to perform step 230 in the method 200.

Specifically, the communications unit 1100 may be configured to receive first indication information, where the first indication information is used to indicate $L_1$ beam vectors in a beam vector set, $K_1$ frequency domain vectors in a frequency domain vector set, and $T_1$ space-frequency component matrices, and a weighted sum of the $T_1$ space-frequency component matrices is used to determine a precoding vector of one or more frequency domain units. The $L_1$ beam vectors and the $K_1$ frequency domain vectors correspond to $M_1$ space-frequency component matrices, the $T_1$ space-frequency component matrices are a part of the $M_1$ space-frequency component matrices, each of the $M_1$ space-frequency component matrices is uniquely determined by one of the $L_1$ beam vectors and one of the $K_1$ frequency domain vectors, and $M_1 = L_1 \times K_1$. The $L_1$ beam vectors are a part of beam vectors in the beam vector set, and/or the $K_1$ frequency domain vectors are a part of frequency domain vectors in the frequency domain vector set. $M_1$, $L_1$, $K_1$, and $T_1$ are all positive integers.

The processing unit 1200 may be configured to determine a precoding vector of one or more frequency domain units based on the first indication information.

Optionally, the communications unit 1100 is further configured to send second indication information, where the second indication information is used to indicate a value or values of one or more of $M_1$, $L_1$, and $K_1$.

Optionally, the communications unit 1100 is further configured to send third indication information, where the third indication information is used to indicate a value of $T_1$.

Optionally, the $M_1$ space-frequency component matrices are selected from a space-frequency component matrix set or a subset of a space-frequency component matrix set, the space-frequency component matrices are determined by beam vectors in the beam vector set and frequency domain vectors in the frequency domain vector set, and each space-frequency component matrix in the space-frequency component matrix set is uniquely determined by one beam vector in the beam vector set and one frequency domain vector in the frequency domain vector set.

The first indication information includes location information of the $M_1$ space-frequency component matrices in the space-frequency component matrix set or location information of the $M_1$ space-frequency component matrices in the subset of the space-frequency component matrix set.

Optionally, each of the $M_1$ space-frequency component matrices is determined by a product of one of the $L_1$ beam vectors and a conjugate transpose of one of the $K_1$ frequency domain vectors.

Optionally, each of the $M_1$ space-frequency component matrices is determined by a Kronecker product of one of the $K_1$ frequency domain vectors and one of the $L_1$ beam vectors.

Optionally, the weighted sum of the $T_1$ space-frequency component matrices is used to determine a precoding vector of one or more frequency domain units at a first transport layer.

Optionally, the communications unit 1100 is further configured to receive fourth indication information, where the fourth indication information is used to indicate $L_2$ beam vectors in the beam vector set, $K_2$ frequency domain vectors in the frequency domain vector set, and $T_2$ space-frequency component matrices, and a weighted sum of the $T_2$ space-frequency component matrices is used to determine a precoding vector of one or more frequency domain units at a second transport layer. The $L_2$ beam vectors and the $K_2$ frequency domain vectors correspond to $M_2$ space-frequency component matrices, the $T_2$ space-frequency component matrices are a part of the $M_2$ space-frequency component matrices, each of the $M_2$ space-frequency component matrices is uniquely determined by one of the $L_2$ beam vectors and one of the $K_2$ frequency domain vectors, and $M_2 = L_2 \times K_2$; the $L_2$ beam vectors are a part of beam vectors in the beam vector set, and/or the $K_2$ frequency domain vectors are a part of frequency domain vectors in the frequency domain vector set; and $M_2$, $L_2$, $K_2$, and $T_2$ are all positive integers. The processing unit 1200 is further configured to determine a precoding vector of one or more frequency domain units at a second transport layer based on the fourth indication information.

Optionally, $L_1 = L_2$, $K_1 = K_2$, and $T_1 = T_2$.

Optionally, $L_1 > L_2$, $K_1 > K_2$, or $T_1 > T_2$.

When the communications apparatus 1000 is configured to perform the method 300 in FIG. 3, the communications unit 1100 may be configured to perform step 320 and step 340 in the method 300, and the processing unit 1200 may be configured to perform step 310 in the method 300.

Figure 6:
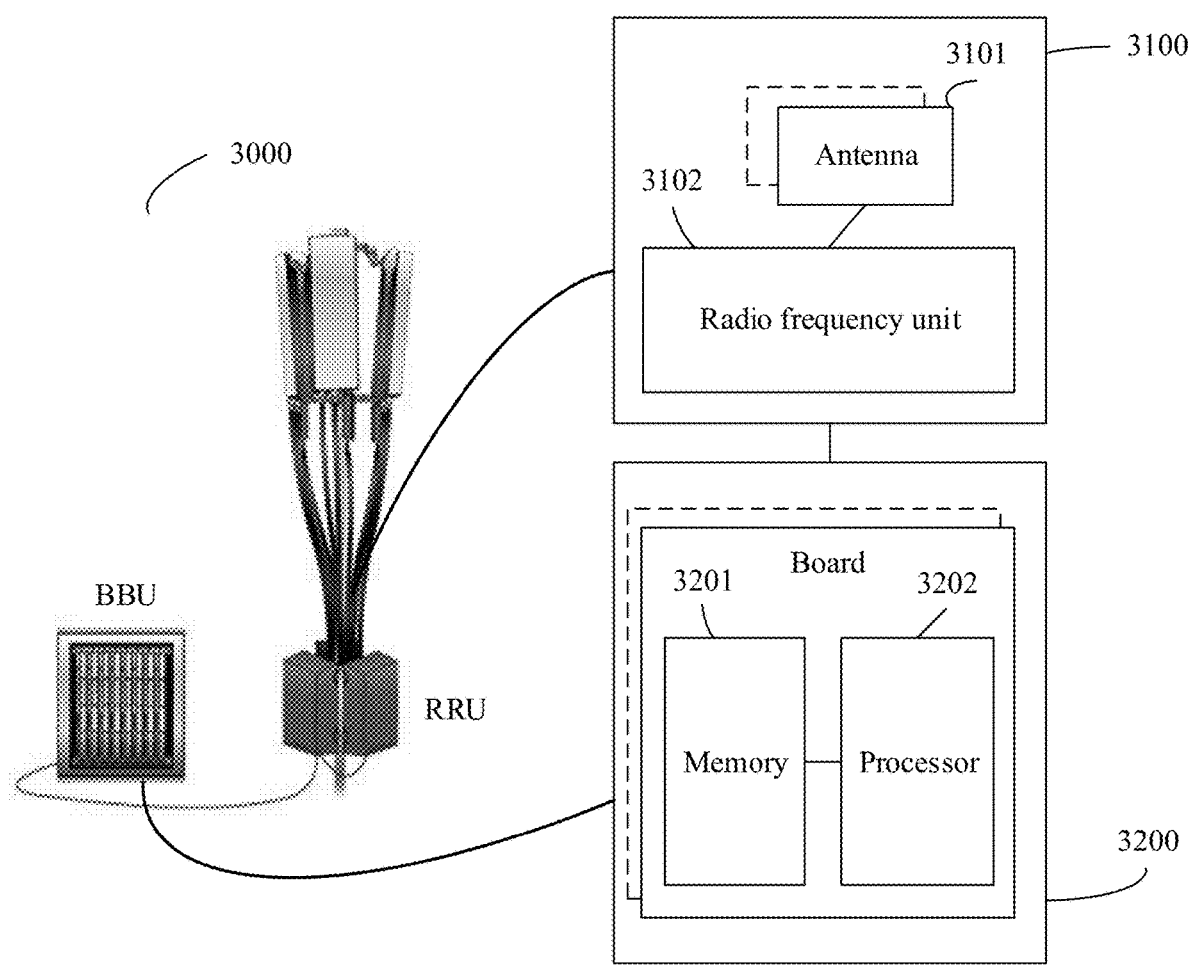
FIG. 6 is a schematic structural diagram of a network device according to an embodiment of this application.

It should be further understood that, when the communications apparatus 1000 is a network device, the communications unit in the communications apparatus 1000 may correspond to a transceiver 3200 in a network device 3000 shown in FIG. 6, and the processing unit 1200 in the communications apparatus 1000 may correspond to a processor 3100 in the network device 3000 shown in FIG. 6.

It should be further understood that when the communications apparatus 1000 is a chip disposed in a network device, the communications unit 1100 in the communications apparatus 1000 may be an input/output interface.

FIG. 5 is a schematic structural diagram of the terminal device 2000 according to an embodiment of this application. The terminal device 2000 may be applied to the system shown in FIG. 1, and perform a function of the terminal device in the foregoing method embodiments. As shown in the figure, the terminal device 2000 includes the processor 2010 and the transceiver 2020. Optionally, the terminal device 2000 further includes a memory 2030. The processor 2010, the transceiver 2020, and the memory 2030 may communicate with each other by using an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may also be integrated into the processor 2010, or may be independent of the processor 2010. The processor 2010 may correspond to the processing unit in FIG. 4.

The transceiver 2020 may correspond to the communications unit in FIG. 4, and may also be referred to as a transceiver unit. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that, the terminal device 2000 shown in FIG. 5 can implement each process performed by the terminal device in the method embodiment in FIG. 2. The operations and/or the functions of the modules in the terminal device 2000 are intended to implement corresponding procedures in the foregoing method embodiment. For details, refer to the descriptions in the foregoing method embodiment. To avoid repetition, detailed descriptions are properly omitted herein.

The processor 2010 may be configured to perform an action that is implemented inside the terminal device and that is described in the foregoing method embodiment. The transceiver 2020 may be configured to perform an action that is of sending information by the terminal device to the network device or receiving information by the terminal device from the network device and that is described in the foregoing method embodiment. For details, refer to the descriptions in the foregoing method embodiment. Details are not described herein again.

Optionally, the terminal device 2000 may further include a power supply 2050, configured to supply power to various components or circuits in the terminal device.

In addition, to make functions of the terminal device more perfect, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 6 is a schematic structural diagram of a network device according to an embodiment of this application, for example, may be a schematic structural diagram of a base station. The base station 3000 may be applied to the system shown in FIG. 1, and perform a function of the network device in the foregoing method embodiment. As shown in the figure, the base station 3000 may include one or more remote radio units (remote radio unit, RRU) 3100, and one or more baseband units (BBU) (which may also be referred to as distributed units (DU)) 3200. The RRU 3100 may be referred to as a transceiver unit, and corresponds to the communications unit 1200 in FIG. 4. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a transmission unit. The receiving unit may correspond to a receiver (or referred to as a receiver or a receiver circuit), and the transmission unit may correspond to a transmitter (or referred to as a transmitter or a transmitter circuit). The RRU 3100 is mainly configured to receive and send a radio frequency signal and perform conversion between a radio frequency signal and a baseband signal, for example, configured to send indication information to a terminal device. The BBU 3200 is mainly configured to: perform baseband processing, control the base station, and so on. The RRU 3100 and the BBU 3200 may be physically disposed together, or may be physically disposed separately, where to be specific, the base station is a distributed base station.

The BBU 3200 is a control center of the base station, or may be referred to as a processing unit. The BBU may correspond to the processing unit 1100 in FIG. 4, and is mainly configured to implement a baseband processing function, for example, channel coding, multiplexing, modulation, or spreading. For example, the BBU (the processing unit) may be configured to control the base station to perform an operation procedure related to the network device in the foregoing method embodiment, for example, generate the foregoing indication information.

In an example, the BBU 3200 may include one or more boards, and a plurality of boards may jointly support a radio access network (for example, an LTE network) having a single access standard, or may separately support radio access networks (for example, an LTE network, a 5G network, or another network) having different access standards. The BBU 3200 further includes a memory 3201 and a processor 3202. The memory 3201 is configured to store a necessary instruction and necessary data. The processor 3202 is configured to control the base station to perform a necessary action, for example, configured to control the base station to perform the operation procedure related to the network device in the foregoing method embodiment. The memory 3201 and the processor 3202 may serve one or more boards. In other words, the memory and the processor may be independently disposed on each board. Alternatively, the plurality of boards may share a same memory and a same processor. In addition, each board may further be provided with a necessary circuit.

It should be understood that the base station 3000 shown in FIG. 6 can implement processes related to the network device in the method embodiment in FIG. 2. The operations and/or the functions of the modules in the base station 3000 are intended to implement corresponding procedures in the foregoing method embodiment. For details, refer to the descriptions in the foregoing method embodiment. To avoid repetition, detailed descriptions are properly omitted herein.

The BBU 3200 may be configured to perform an action that is implemented inside the network device and that is described in the foregoing method embodiment. The RRU 3100 may be configured to perform an action that is of sending information by the network device to the terminal device or receiving information by the network device from the terminal device and that is described in the foregoing method embodiment. For details, refer to the descriptions in the foregoing method embodiment. Details are not described herein again.

An embodiment of this application further provides a processing apparatus, including a processor and an interface. The processor is configured to perform the method in any foregoing method embodiment.

It should be understood that the processing apparatus may be one or more chips. For example, the processing apparatus may be a field programmable gate array (field programmable gate array, FPGA), an application-specific integrated chip (application specific integrated circuit, ASIC), a system on chip (system on chip, SoC), a central processing unit (central processor unit, CPU), a network processor (network processor, NP), a digital signal processing circuit (digital signal processor, DSP), a microcontroller unit (micro controller unit, MCU), a programmable controller (programmable logic device, PLD), or another integrated chip.

In an implementation process, steps in the foregoing methods can be implemented by using a hardware integrated logic circuit in the processor, or by using instructions in a form of software. The steps of the methods disclosed with reference to the embodiments of this application may be directly performed by a hardware processor, or may be performed by a combination of hardware and software modules in the processor. The software module may be located in a mature storage medium in the field, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor. To avoid repetition, details are not described herein again.

It should be noted that, the processor in the embodiments of this application may be an integrated circuit chip, and has a signal processing capability. In an implementation process, the steps in the foregoing method embodiments may be completed through a hardware integrated logical circuit in the processor or an instruction in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, steps, and logical block diagrams that are disclosed in the embodiments of this application may be implemented or performed. The general-purpose processor may be a microprocessor, or the processor may be any conventional processor or the like. The steps of the method disclosed with reference to the embodiments of this application may be directly executed and completed by a hardware decoding processor, or may be executed and completed by a combination of hardware and software modules in the decoding processor. The software module may be located in a mature storage medium in the field, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor.

It may be understood that the memory in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Through example description but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

Based on the method provided in the embodiments of this application, this application further provides a computer program product. The computer program product includes computer program code. When the computer program code is run on a computer, the computer is enabled to perform the method in any one of the embodiments shown in FIG. 2.

According to the method provided in the embodiments of this application, this application further provides a computer-readable medium. The computer-readable medium stores program code. When the program code is run on a computer, the computer is enabled to perform the method in any one of the embodiments shown in FIG. 2.

According to the method provided in the embodiments of this application, this application further provides a system. The system includes the foregoing one or more terminal devices and one or more network devices.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disc, SSD)), or the like.

The network device and the terminal device in the foregoing apparatus embodiments are corresponding to the network device or the terminal device in the method embodiments, and a corresponding module or unit performs a corresponding step. For example, a communications unit (a transceiver) performs a receiving step or a sending step in the method embodiments, and a processing unit (a processor) may perform steps other than the sending or receiving step. For a function of a specific unit, refer to a corresponding method embodiment. There may be one or more processors.

The terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application running on a computing device may be components. One or more components may reside within a process and/or an execution thread, and a component may be located on one computer and/or distributed between two or more computers. In addition, these components may be executed from various computer readable media that store various data structures. For example, the components may communicate by using a local and/or remote process and according to, for example, a signal having one or more data packets (for example, data from two components interacting with another component in a local system, a distributed system, and/or across a network such as the internet interacting with another system by using the signal).

A person of ordinary skill in the art may be aware that, in combination with various illustrative logical blocks (illustrative logical block) and steps (step) described in the embodiments disclosed in this specification may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that such an implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the embodiments provided in this application, it should be understood that the disclosed system, apparatus, and methods may be implemented in another manner. For example, the described apparatus embodiments are merely examples. For example, the division of units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

In the foregoing embodiments, all or some of the functions of the functional units may be implemented by software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for instructing a computer device (which may be a personal computer, a server, or a network device) to perform all or some of the steps of the method described in the embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
receiving, from a terminal device, first indication information, wherein the first indication information indicates $L_1$ space domain vectors in a space domain vector set, $K_1$ frequency domain vectors in a frequency domain vector set, and $T_1$ space-frequency component matrices, wherein a precoding vector of one or more frequency domain units is determined by a weighted sum of the $T_1$ space-frequency component matrices, wherein the $L_1$ space domain vectors and the $K_1$ frequency domain vectors correspond to $M_1$ space-frequency component matrices that comprise the $T_1$ space-frequency component matrices, wherein each of the $M_1$ space-frequency component matrices is determined by a different combination of one of the $L_1$ space domain vectors and one of the $K_1$ frequency domain vectors, and wherein $M_1=L_1 \times K_1$, $M_1$, $L_1$, $K_1$, and $T_1$ are positive integers, and $T_1$ is less than $M_1$; and determining the precoding vector of the one or more frequency domain units based on the first indication information.

2. The method according to claim 1, wherein the method further comprises:

sending second indication information, wherein the second indication information indicates one or more values of one or more of $M_1$, $L_1$, and $K_1$.

3. The method according to claim 1, wherein $K_1$ is smaller when a quantity of transport layers is greater than a preset threshold.

4. The method according to claim 1, wherein the first indication information comprises location information of the $L_1$ space domain vectors in the space domain vector set and location information of the $K_1$ frequency domain vectors in the frequency domain vector set.

5. The method according to claim 1, wherein the $M_1$ space-frequency component matrices are selected from a space-frequency component matrix set, wherein each space-frequency component matrix in the space-frequency component matrix set is determined by a different combination of one space domain vector in the space domain vector set and one frequency domain vector in the frequency domain vector set, and wherein the first indication information comprises location information of the $M_1$ space-frequency component matrices in the space-frequency component matrix set.

6. The method according to claim 1, wherein each of the $M_1$ space-frequency component matrices is determined by a product of one of the $L_1$ space domain vectors and a conjugate transpose of one of the $K_1$ frequency domain vectors.

7. The method according to claim 1, wherein the precoding vector is determined for a transport layer.

8. The method according to claim 1, wherein a length of the frequency domain vector is a quantity of frequency domain units to be reported, wherein the frequency domain units to be reported are included in a frequency domain occupation bandwidth of a channel state information (CSI) measurement resource configured for the terminal device.

9. The method according to claim 1, wherein the $M_1$ space-frequency component matrices correspond to $M_1$ bits, and wherein the $T_1$ space-frequency component matrices are indicated by bits in the $M_1$ bits with values of 1.

10. The method according to claim 9, wherein the $M_1$ bits corresponding to the $M_1$ space-frequency component matrices are sorted based on an order of sequentially traversing the $L_1$ space domain vectors and the $K_1$ frequency domain vectors according to: $(v_s^0, v_f^0), (v_s^1, v_f^0), \ldots, (v_s^{L_1-1}, v_f^0)$, $(v_s^0, v_f^1), (v_s^1, v_f^1), \ldots, (v_s^{L_1-1}, v_f^{K_1-1})$, where $v_s^0, v_s^1, \ldots, v_s^{L_1-1}$ represent the $L_1$ spatial domain vectors, $v_f^0, v_f^1, \ldots, v_f^{K_1-1}$ represent the $K_1$ frequency domain vectors.

11. The method according to claim 1, wherein the first indication information further indicates quantization information of weighting coefficients of the $T_1$ space-frequency component matrices.

12. The method according to claim 11, wherein the weighting coefficients of the $T_1$ space-frequency component matrices are indicated based on a normalization process.

13. The method according to claim 12, wherein the normalization process comprises:

indicating a weighting coefficient with a maximum modulus by indicating a location of the weighting coefficient in $T_1$ weighting coefficients in a matrix W'; and indicating quantization information of remaining $T_1-1$ weight coefficients of the $T_1$ weighting coefficients based on an index of a quantized relative value of each of the remaining $T_1-1$ weighting coefficients relative to the weighting coefficient with the maximum modulus, wherein a dimension of the matrix W' is $L_1 \times K_1$.

14. The method of claim 13, wherein the weighting coefficient with the maximum modulus is determined based on a polarization direction or a transport layer.

15. A communications apparatus, comprising at least one processor, and one or more memories coupled to the at least one processor and storing programming instructions for execution by the at least one processor to perform operations comprising:

receiving, from a terminal apparatus, first indication information, wherein the first indication information indicates $L_1$ space domain vectors in a space domain vector set, $K_1$ frequency domain vectors in a frequency domain vector set, and $T_1$ space-frequency component matrices, wherein a precoding vector of one or more frequency domain units is determined by a weighted sum of the $T_1$ space-frequency component matrices, wherein the $L_1$ space domain vectors and the $K_1$ frequency domain vectors correspond to $M_1$ space-frequency component matrices that comprise the $T_1$ space-frequency component matrices, wherein each of the $M_1$ space-frequency component matrices is determined by a different combination of one of the $L_1$ space domain vectors and one of the $K_1$ frequency domain vectors, and wherein $M_1=L_1 \times K_1$, $M_1$, $L_1$, $K_1$, and $T_1$ are positive integers, and $T_1$ is less than $M_1$; and determining the precoding vector of the one or more frequency domain units based on the first indication information.

16. The apparatus according to claim 15, the operations further comprising sending second indication information, wherein the second indication information indicates one or more values of one or more of $M_1$, $L_1$, and $K_1$.

17. The apparatus according to claim 15, wherein $K_1$ is smaller when a quantity of transport layers is greater than a preset threshold.

18. The apparatus according to claim 15, wherein the first indication information comprises location information of the $L_1$ space domain vectors in the space domain vector set and location information of the $K_1$ frequency domain vectors in the frequency domain vector set.

19. The apparatus according to claim 15, wherein the $M_1$ space-frequency component matrices are selected from a space-frequency component matrix set, wherein each space-frequency component matrix in the space-frequency component matrix set is determined by a different combination of one space domain vector in the space domain vector set and one frequency domain vector in the frequency domain vector set, and wherein the first indication information comprises location information of the $M_1$ space-frequency component matrices in the space-frequency component matrix set.

20. The apparatus according to claim 15, wherein each of the $M_1$ space-frequency component matrices is determined by a product of one of the $L_1$ space domain vectors and a conjugate transpose of one of the $K_1$ frequency domain vectors.

21. The apparatus according to claim 15, wherein the precoding vector is determined for a transport layer.

22. The apparatus according to claim 15, wherein a length of the frequency domain vector is a quantity of frequency domain units to be reported, wherein the frequency domain units to be reported are included in a frequency domain occupation bandwidth of a channel state information (CSI) measurement resource configured for the terminal device.

23. The apparatus according to claim 15, wherein the $M_1$ space-frequency component matrices correspond to $M_1$ bits, and wherein the $T_1$ space-frequency component matrices are indicated by bits in the $M_1$ bits with values of 1.

24. The apparatus according to claim 23, wherein the $M_1$ bits corresponding to the $M_1$ space-frequency component matrices are sorted based on an order of sequentially traversing the $L_1$ space domain vectors and the $K_1$ frequency domain vectors according to: $(v_s^0, v_f^0), (v_s^1, v_f^0), \ldots, (v_s^{L_1-1}, v_f^0), (v_s^0, v_f^1), (v_s^1, v_f^1), \ldots, (v_s^{L_1-1}, v_f^{K_1-1})$, where $v_s^0, v_s^1, \ldots, v_s^{L_1-1}$ represent the $L_1$ spatial domain vectors, $v_f^0, v_f^1, \ldots, v_f^{K_1-1}$ represent the $K_1$ frequency domain vectors.

25. The apparatus according to claim 15, wherein the first indication information further indicates quantization information of weighting coefficients of the $T_1$ space-frequency component matrices.

26. The apparatus according to claim 25, wherein the weighting coefficients of the $T_1$ space-frequency component matrices are indicated based on a normalization process.

27. The apparatus according to claim 26, wherein the normalization process comprises:
indicating a weighting coefficient with a maximum modulus by indicating a location of the weighting coefficient in $T_1$ weighting coefficients in a matrix W'; and
indicating quantization information of remaining $T_1-1$ weight coefficients of the $T_1$ weighting coefficients based on an index of a quantized relative value of each of the remaining $T_1-1$ weighting coefficients relative to the weighting coefficient with the maximum modulus, wherein a dimension of the matrix W' is $L_1 \times K_1$.

28. The apparatus according to claim 27, wherein the weighting coefficient with the maximum modulus is determined based on a polarization direction or a transport layer.

29. The apparatus according to claim 15, wherein the apparatus is a device or a chip.

30. A non-transitory computer-readable storage medium storing programming instructions for being executed by at least one processor to perform operations comprising:
receiving, from a terminal device, first indication information, wherein the first indication information indicates $L_1$ space domain vectors in a space domain vector set, $K_1$ frequency domain vectors in a frequency domain vector set, and $T_1$ space-frequency component matrices, wherein a precoding vector of one or more frequency domain units is determined by a weighted sum of the $T_1$ space-frequency component matrices, wherein the $L_1$ space domain vectors and the $K_1$ frequency domain vectors correspond to $M_1$ space-frequency component matrices that comprise the $T_1$ space-frequency component matrices, wherein each of the $M_1$ space-frequency component matrices is determined by a different combination of one of the $L_1$ space domain vectors and one of the $K_1$ frequency domain vectors, and wherein $M_1 = L_1 \times K_1$, $M_1$, $L_1$, $K_1$, and $T_1$ are positive integers, and $T_1$ is less than $M_1$; and
determining the precoding vector of the one or more frequency domain units based on the first indication information.

31. The non-transitory computer-readable storage medium according to claim 30, wherein the operations further comprises:
sending second indication information, wherein the second indication information indicates one or more values of one or more of $M_1$, $L_1$, and $K_1$.

32. The non-transitory computer-readable storage medium according to claim 30, wherein $K_1$ is smaller when a quantity of transport layers is greater than a preset threshold.

33. The non-transitory computer-readable storage medium according to claim 30, wherein the first indication information comprises location information of the $L_1$ space domain vectors in the space domain vector set and location information of the $K_1$ frequency domain vectors in the frequency domain vector set.

34. The non-transitory computer-readable storage medium according to claim 30, wherein the $M_1$ space-frequency component matrices are selected from a space-frequency component matrix set, wherein each space-frequency component matrix in the space-frequency component matrix set is determined by a different combination of one space domain vector in the space domain vector set and one frequency domain vector in the frequency domain vector set, and wherein the first indication information comprises location information of the $M_1$ space-frequency component matrices in the space-frequency component matrix set.

35. The non-transitory computer-readable storage medium according to claim 30, wherein each of the $M_1$ space-frequency component matrices is determined by a product of one of the $L_1$ space domain vectors and a conjugate transpose of one of the $K_1$ frequency domain vectors.

36. The non-transitory computer-readable storage medium according to claim 30, wherein the precoding vector is determined for a transport layer.

37. The non-transitory computer-readable storage medium according to claim 30, wherein a length of the frequency domain vector is a quantity of frequency domain units to be reported, wherein the frequency domain units to be reported are included in a frequency domain occupation bandwidth of a channel state information (CSI) measurement resource configured for the terminal device.

38. The non-transitory computer-readable storage medium according to claim 30, wherein the $M_1$ space-frequency component matrices correspond to $M_1$ bits, and wherein the $T_1$ space-frequency component matrices are indicated by bits in the $M_1$ bits with values of 1.

39. The non-transitory computer-readable storage medium according to claim 38, wherein the $M_1$ bits corresponding to the $M_1$ space-frequency component matrices are sorted based on an order of sequentially traversing the $L_1$ space domain vectors and the $K_1$ frequency domain vectors according to: $(v_s^0, v_f^0), (v_s^1, v_f^0), \ldots, (v_s^{L_1-1}, v_f^0), (v_s^0, v_f^1), (v_s^1, v_f^1), \ldots, (v_s^{L_1-1}, v_f^{K_1-1})$, where $v_s^0, v_s^1, \ldots, v_s^{L_1-1}$ represent the $L_1$ spatial domain vectors, $v_f^0, v_f^1, \ldots, v_f^{K_1-1}$ represent the $K_1$ frequency domain vectors.

40. The non-transitory computer-readable storage medium according to claim 30, wherein the first indication information further indicates quantization information of weighting coefficients of the $T_1$ space-frequency component matrices.

41. The non-transitory computer-readable storage medium according to claim 40, wherein the weighting coefficients of the $T_1$ space-frequency component matrices are indicated based on a normalization process.

42. The non-transitory computer-readable storage medium according to claim 41, wherein the normalization process comprises:
   indicating a weighting coefficient with a maximum modulus by indicating a location of the weighting coefficient in $T_1$ weighting coefficients in a matrix W'; and
   indicating quantization information of remaining $T_1-1$ weight coefficients of the $T_1$ weighting coefficients based on an index of a quantized relative value of each of the remaining $T_1-1$ weighting coefficients relative to the weighting coefficient with the maximum modulus, wherein a dimension of the matrix W' is $L_1 \times K_1$.

43. The non-transitory computer-readable storage medium of claim 42, wherein the weighting coefficient with the maximum modulus is determined based on a polarization direction or a transport layer.

* * * * *